United States Patent
Maejima et al.

[11] Patent Number: 5,117,382
[45] Date of Patent: May 26, 1992

[54] SEMICONDUCTOR INTEGRATED CIRCUIT FOR PERFORMING AN ARITHMETIC OPERATION INCLUDING BIPOLAR AND MOS TRANSISTORS

[75] Inventors: Hideo Maejima; Takashi Hotta; Ikuro Masuda; Masahiro Iwamura; Kouzaburou Kurita; Masahiro Ueno, all of Hitachi, Japan

[73] Assignee: Hitachi, Ltd., Tokyo, Japan

[21] Appl. No.: 618,114

[22] Filed: Nov. 26, 1990

Related U.S. Application Data

[60] Continuation of Ser. No. 233,326, Aug. 17, 1988, abandoned, which is a division of Ser. No. 703,171, Feb. 19, 1985, Pat. No. 4,789,958.

[30] Foreign Application Priority Data

Feb. 20, 1984 [JP] Japan ............................. 59-31257
Jan. 11, 1985 [JP] Japan ............................. 60-2020

[51] Int. Cl.[5] ............................................ G06F 7/48
[52] U.S. Cl. ................................. 364/736; 365/177
[58] Field of Search ............... 364/736; 365/177, 203; 307/446

[56] References Cited
U.S. PATENT DOCUMENTS

| | | | |
|---|---|---|---|
| 3,919,536 | 11/1975 | Cochran et al. | 364/782 |
| 4,276,616 | 6/1981 | Hennig | 365/177 |
| 4,437,171 | 3/1984 | Hudson | 365/177 |
| 4,563,751 | 1/1986 | Barker | 364/786 |
| 4,665,505 | 5/1987 | Miyakawa et al. | 365/177 |
| 4,694,202 | 9/1987 | Iwamura et al. | 307/446 |
| 4,713,796 | 12/1987 | Ogive et al. | 307/446 |
| 4,769,561 | 9/1988 | Iwamura et al. | 307/446 |

OTHER PUBLICATIONS

Mov et al., "High Speed Microprocessors", *1983 IEEE International Solid State Circuits Conference*, pp. 28–29, Feb. 23, 1983.

Primary Examiner—David H. Malzahn
Attorney, Agent, or Firm—Antonelli, Terry, Stout & Kraus

[57] ABSTRACT

A semiconductor integrated circuit is provided for performing an arithmetic operation using an arithmetic operation circuit. The integrated circuit includes a read bus for connecting the arithmetic operation circuit with a plurality of registers which store input data and/or output data of said arithmetic operation circuit. A precharge and sense circuit connects said arithmetic operation circuit to said read bus. The precharge and sense circuit includes a precharge circuit to precharge the read bus to a first level before the read operation, and a sense circuit to detect that the level of the read bus has discharged to a second, lower level after the read operation begins. In this way, the integrated circuit can detect very slight potential variations on said read bus.

22 Claims, 43 Drawing Sheets

FIG. 17(a)   FIG. 17(b)   FIG. 17(c)   FIG. 17(d)
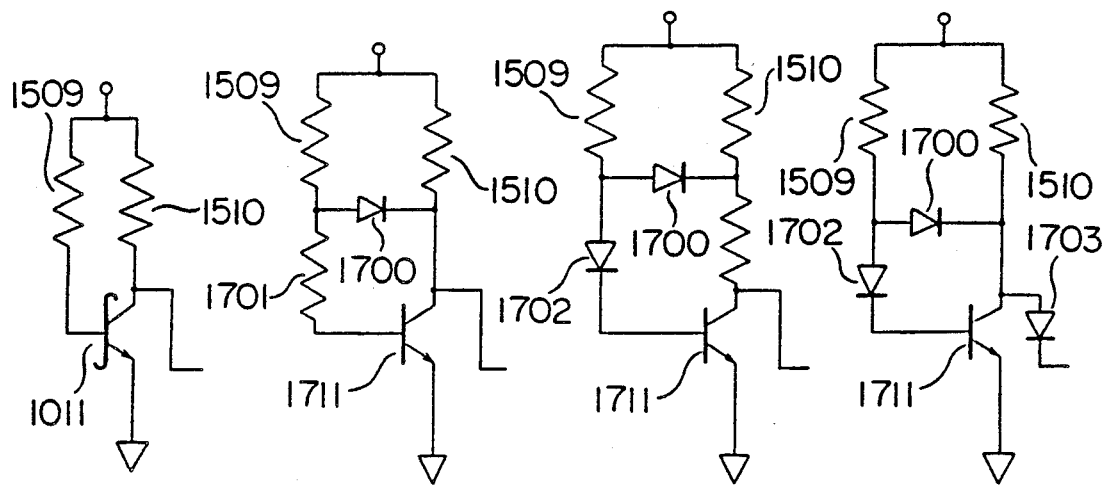
FIG. 18(a)   FIG. 18(b)
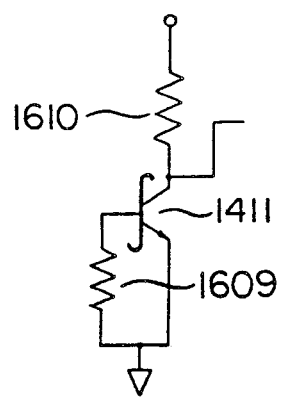 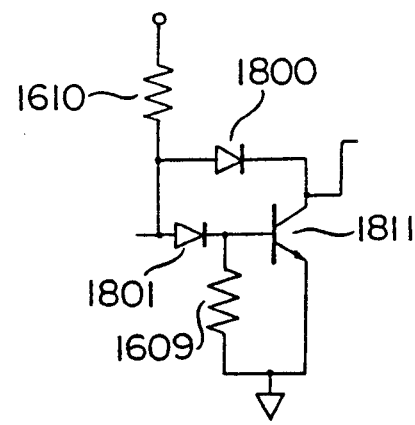

FIG. 49
| OPERATION | DATA LENGTH | DESCRIPTION |
|---|---|---|
| ARITHMETIC SHIFT TO THE LEFT | 8 | 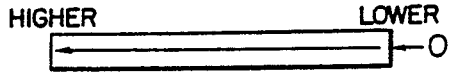 |
| | 16 | |
| | 32 | |
| ARITHMETIC SHIFT TO THE RIGHT | 8 | 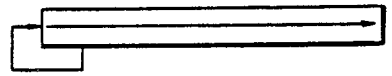 |
| | 16 | |
| | 32 | |
| LOGICAL SHIFT TO THE LEFT | 8 | 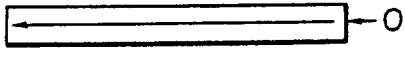 |
| | 16 | |
| | 32 | |
| LOGICAL SHIFT TO THE RIGHT | 8 | 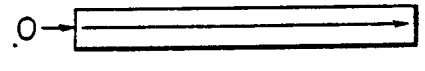 |
| | 16 | |
| | 32 | |
| ROTATION TO THE LEFT | 8 | 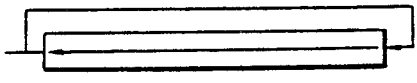 |
| | 16 | |
| | 32 | |
| ROTATION TO THE RIGHT | 8 | 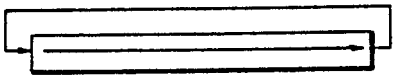 |
| | 16 | |
| | 32 | |
| ROTATION TO THE LEFT INCLUDING FLAG | 8 | 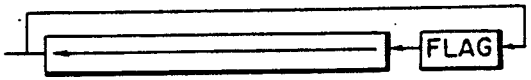 |
| | 16 | |
| | 32 | |
| ROTATION TO THE RIGHT INCLUDING FLAG | 8 | 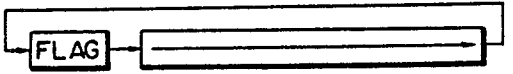 |
| | 16 | |
| | 32 | |

FIG. 55

| OPERATION | DATA LENGTH | C0 | C1 | C2 | C3 | C4 | C5 | C6 |
|---|---|---|---|---|---|---|---|---|
| ARITHMETIC SHIFT TO THE LEFT | 8 | 0 | 0 | 0 | 1 | 0 | 1 | 0 |
| | 16 | 0 | 0 | 0 | 1 | 0 | 1 | 0 |
| | 32 | 0 | 0 | 0 | 1 | 0 | 1 | 0 |
| ARITHMETIC SHIFT TO THE RIGHT | 8 | 0 | 0 | 0 | 1 | 0 | 1 | 0 |
| | 16 | 0 | 0 | 0 | 1 | 0 | 1 | 0 |
| | 32 | 0 | 0 | 0 | 1 | 0 | 1 | 0 |
| LOGICAL SHIFT TO THE LEFT | 8 | 0 | 0 | 0 | 1 | 0 | 1 | 0 |
| | 16 | 0 | 0 | 0 | 1 | 0 | 1 | 0 |
| | 32 | 0 | 0 | 0 | 1 | 0 | 1 | 0 |
| LOGICAL SHIFT TO THE RIGHT | 8 | 0 | 0 | 0 | 0 | 0 | 0 | 0 |
| | 16 | 0 | 0 | 0 | 1 | 0 | 0 | 0 |
| | 32 | 0 | 0 | 0 | 1 | 0 | 1 | 0 |
| ROTATION TO THE LEFT | 8 | 0 | 1 | 1 | 0 | 0 | 0 | 0 |
| | 16 | 0 | 1 | 0 | 1 | 1 | 0 | 0 |
| | 32 | 0 | 1 | 0 | 1 | 0 | 1 | 1 |
| ROTATION TO THE RIGHT | 8 | 0 | 1 | 1 | 0 | 0 | 0 | 0 |
| | 16 | 0 | 1 | 0 | 1 | 1 | 0 | 0 |
| | 32 | 0 | 1 | 0 | 1 | 0 | 1 | 1 |
| ROTATION TO THE LEFT INCLUDING FLAG | 8 | 1 | 0 | 1 | 0 | 0 | 0 | 0 |
| | 16 | 1 | 0 | 0 | 1 | 1 | 0 | 0 |
| | 32 | 1 | 0 | 0 | 1 | 0 | 1 | 1 |
| ROTATION TO THE RIGHT INCLUDING FLAG | 8 | 1 | 0 | 1 | 0 | 0 | 0 | 0 |
| | 16 | 1 | 0 | 0 | 1 | 1 | 0 | 0 |
| | 32 | 1 | 0 | 0 | 1 | 0 | 1 | 1 |

SEMICONDUCTOR INTEGRATED CIRCUIT FOR PERFORMING AN ARITHMETIC OPERATION INCLUDING BIPOLAR AND MOS TRANSISTORS

This is a continuation of application Ser. No. 233,326, filed Aug. 17, 1988, now abandoned, which is a divisional of application Ser. No. 703,171, filed Feb. 19, 1985, now U.S. Pat. No. 4,789,958.

The present invention relates to an arithmetic operation unit and an arithmetic operation circuit and, more particularly, to an arithmetic operation unit and an arithmetic operation circuit which are suitable for use in a super high speed microprocessor or the like.

In a logic (V) LSI such as a microprocessor in which high integration is required, a field effect transistors, particularly, MOS transistors are primarily used. (For example, see "A 16b Microprocessor with On-Chip Memory Protection", Jim Slager, et al, ISSCC 83, Feb. 23, 1983). However, since MOS transistors are of the voltage drive type, the signal is turned on or off between a power source potential and the earth potential. Such a theoretical phenomenon causes a critical path in each portion in the super high speed field. On the other hand, a microprocessor using the bipolar transistor technology (for instance, "A 16b Microprocessor for Realtime Applications", Shai Mor, et al, ISSCC 83, Feb. 23, 1983) is of the current drive type, so that the signal can be turned on or off due to the voltage operation of a small amplitude. However, since base current has to be supplied to the bipolar transistors, it is difficult to realize a high integrated logic LSI in terms of electric power consumption.

It is the first object of the present invention to eliminate the foregoing drawback and to provide an arithmetic operation unit and an arithmetic operation circuit with a high operating speed.

The second object of the invention is to provide a high integrated arithmetic operation unit and an arithmetic operation circuit.

The third object of the invention is to provide an arithmetic operation unit and an arithmetic operation circuit with a low electric power consumption.

The fourth object of the invention is to provide a three-state circuit with a high operating speed and a low electric power consumption.

The first feature of a arithmetic operation unit of the present invention is that in an arithmetic operation unit comprising at least registers and an arithmetic operation circuit, bipolar transistors and field effect transistors mixedly exist.

In a preferred aspect of the present invention, at least one combinational logic circuit is constituted by a composite logic circuit in which bipolar transistors and field effect transistors mixedly exist. Further, in a preferred aspect of the invention, at least one combinational logic circuit constituting an output buffer is constituted by a composite logic circuit in which bipolar transistors and field effect transistors mixedly exist.

The second feature of the arithemtic operation unit of the present invention is that in an arithmetic operation unit having read buses for connecting a register constituting registers with an arithmetic operation circuit, a sense circuit to sense the information in the above-mentioned register is connected to the read bus.

In a preferred aspect of the arithmetic operation unit of the invention, the foregoing sense circuit is a sense & precharge circuit to precharge the read bus.

In a preferred aspect of the arithmetic operation unit of the invention, the sense & precharge circuit is constituted by bipolar transistors and field effect transistors which mixedly exist.

In a further preferred aspect of the arithemtic operation unit of the invention, the sense & precharge circuit comprises at least one bipolar transistor to precharge the read bus and a field effect transistor to control a current of this bipolar transistor and determines a precharge voltage of the read bus in dependence upon a threshold value of the field effect transistor.

In a further preferred aspect of the arithemtic operation unit of the invention, one bit of the register is constituted by a multiport RAM connected to two read buses.

In a further preferred aspect of the arithmetic operation unit of the invention, two sense & precharge circuits are symmetrically arranged with respect to a point in the direction where the register and arithmetic operation circuit are arranged in parallel.

In a further preferred aspect of the arithmetic operation unit of the invention, the read bus is connected to an address register through an amplifier.

In a further preferred aspect of the arithmetic operation unit of the invention, the field effect transistor is a MOS transistor.

In a further preferred aspect of the arithmetic operation unit of the invention, the arithemtic operation unit connects a shift output circuit with the read bus and has a shift circuit for performing the shift due to the sense & precharge circuit similarly to the readout of the register.

A feature of an arithmetic operation circuit of the present invention is that in an arithmetic operation circuit of $(k \times N)$ bits having a carry propagation circuit, the carry propagation circuit is constituted by bipolar transistors and field effect transistors which mixedly exist.

In a preferred aspect of the arithmetic operation circuit of the invention, the carry propagation circuit has k N-bit block carry look ahead circuits in which bipolar transistors and field effect transistors mixedly exist.

In a further preferred aspect of the arithmetic operation circuit of the invention, bipolar transistors are provided in the connecting portions of the k N-bit block carry look ahead circuits.

In a further preferred aspect of the arithmetic operation circuit of the invention, the carry propagation circuit has a carry propagation circuit in N bits constituted by a field effect transistor for performing the carry propagation in $(N-1)$ bits.

In a further preferred aspect of the arithmetic operation circuit of the invention, the field effect transistor is a MOS transistor.

A feature of the three-state circuit of the present invention is that it comprises:

(1) an input terminal and an output terminal;

(2) first and second control terminals of complementary inputs;

(3) first and second potential terminals;

(4) a first bipolar transistor in which a collector of one conductivity type is connected to the foregoing first potential terminal and an emitter of the one conductivity type is connected to the foregoing output terminal;

(5) a second bipolar transistor in which a collector of one conductivity type is connected to the foregoing output terminal and an emitter of the one conductivity type is connected to the foregoing second potential terminal;

(6) first and second field effect transistors of the other conductivity type in which one gate is connected to the foregoing input terminal and the other gate is connected to the foregoing first control terminal, respectively, and a source and a drain are connected in series to the foregoing first potential terminal and to a base of the other conductivity type of the first bipolar transistor;

(7) first and second field effect transistors of one conductivity type in which one gate is connected to the foregoing input terminal and the other gate is connected to the foregoing second control terminal, respectively, and a drain and a source are connected in series to the foregoing output terminal and to a base of the other conductivity type of the second bipolar transistor;

(8) a third field effect transistor in which a source and a drain are connected to the base of the first bipolar transistor and to the foregoing output terminal and a gate is connected to the foregoing first control terminal or to the foregoing second control terminal;

(9) a fourth field effect transistor in which a source and a drain are connected to the base of the second bipolar transistor and to the foregoing second potential terminal and a gate is connected to the foregoing first control terminal or to the foregoing second control terminal;

(10) a first resistive element provided between the base of the first bipolar transistor and the foregoing output terminal; and

(11) a second resistive element provided between the base of the second bipolar transistor and the foregoing second potential terminal.

In a preferred aspect of the three-state circuit of the present invention, the field effect transistor is a MOS transistor.

In a further preferred aspect of the three-state circuit of the invention, the resistive element is a resistor.

Other objects and features of the present invention will become apparent from the following description of an embodiment.

Figure 4:
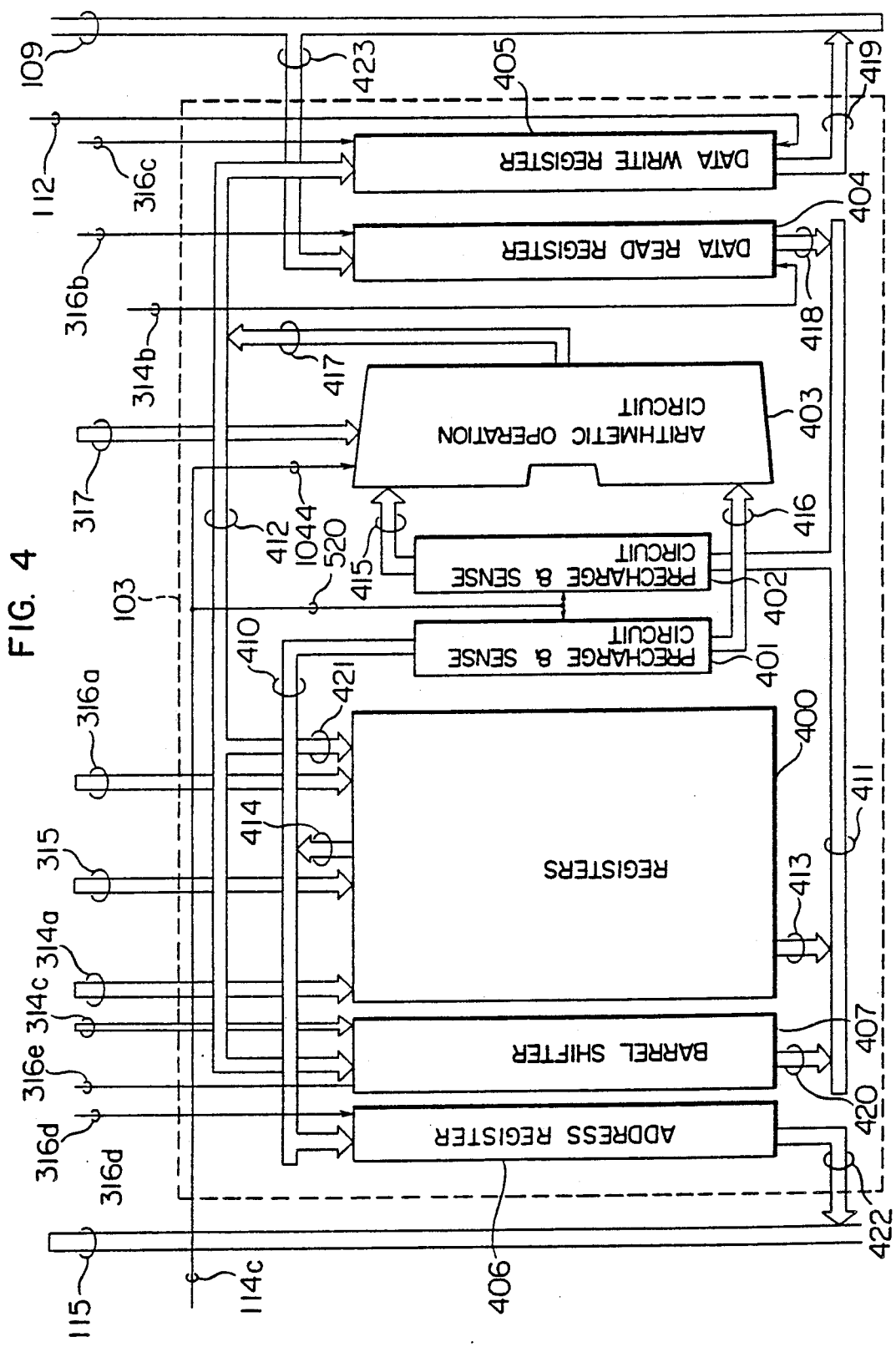
FIG. 4 is block diagram showing a first embodiment of an arithmetic operation unit 103 of FIG. 1.
Figure 5:
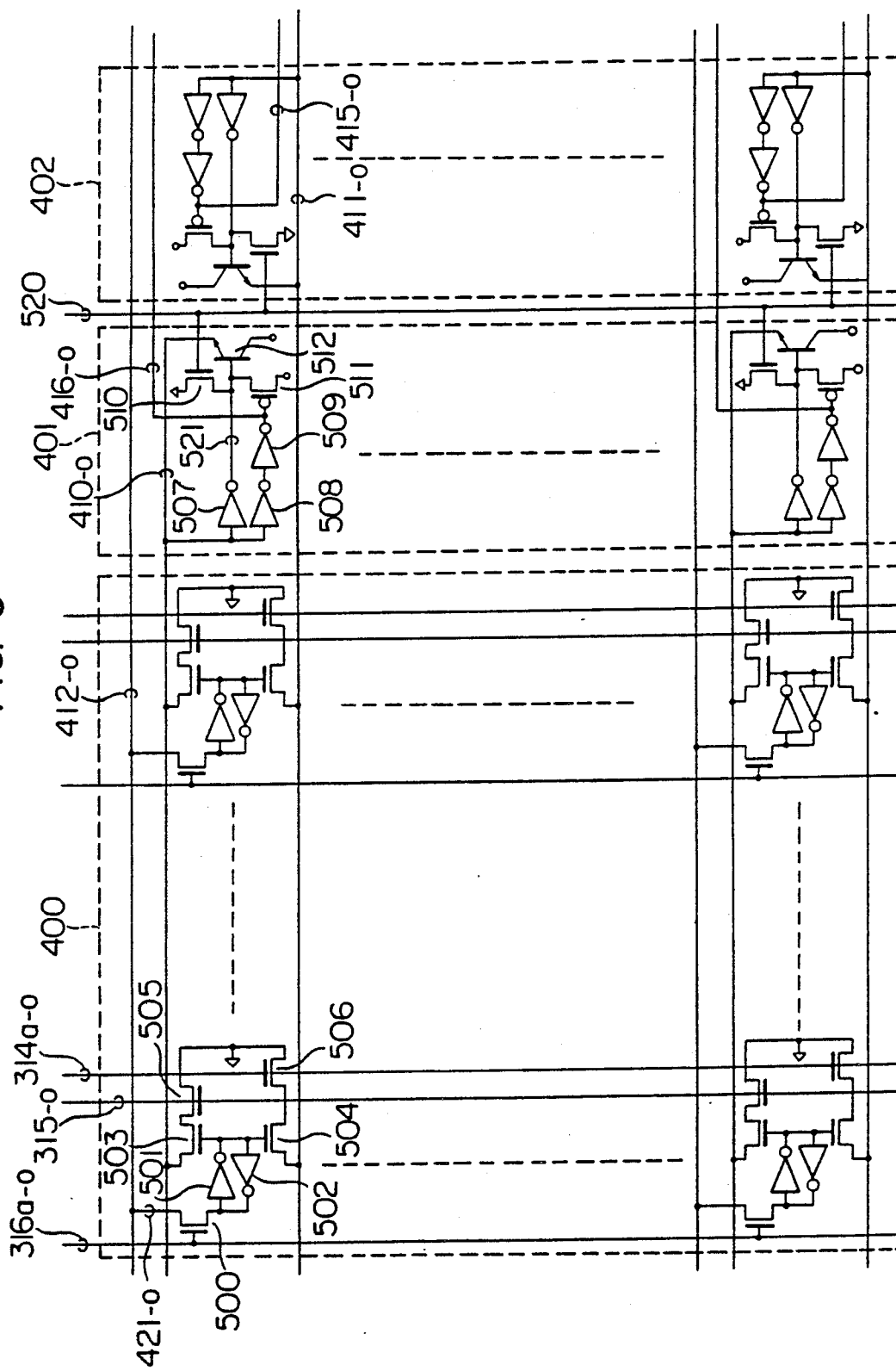
Figure 6:
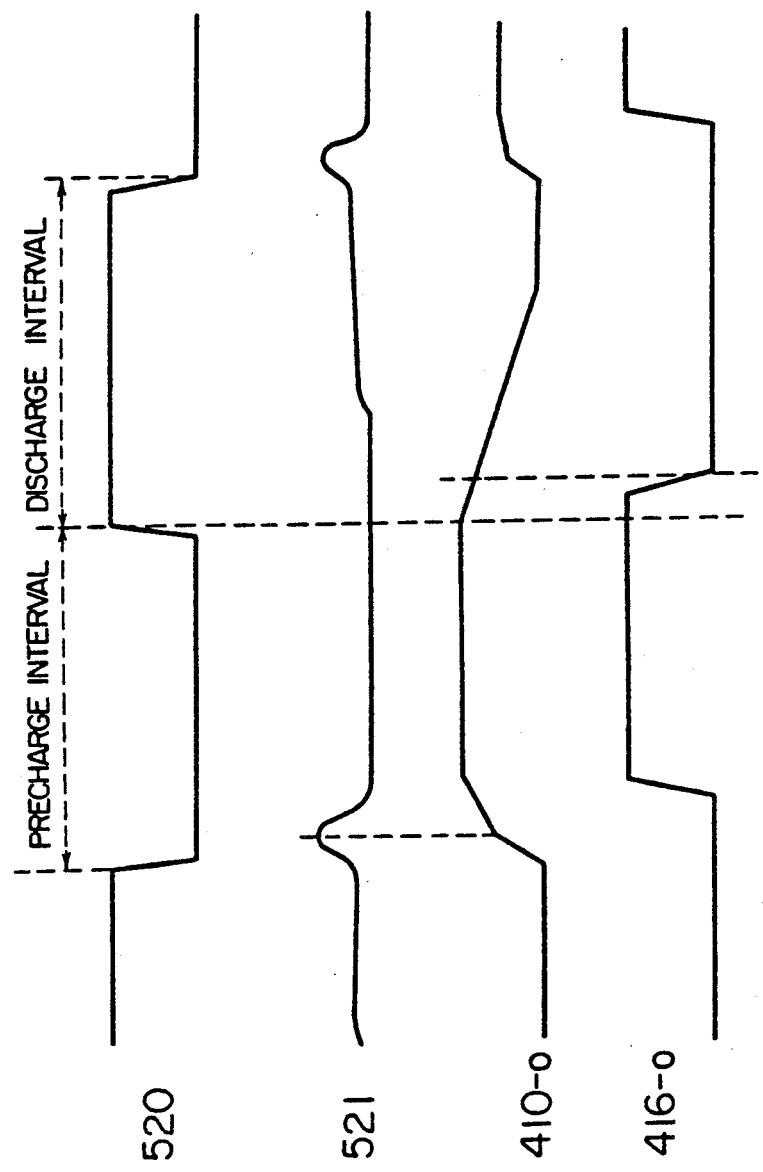
Figure 7:
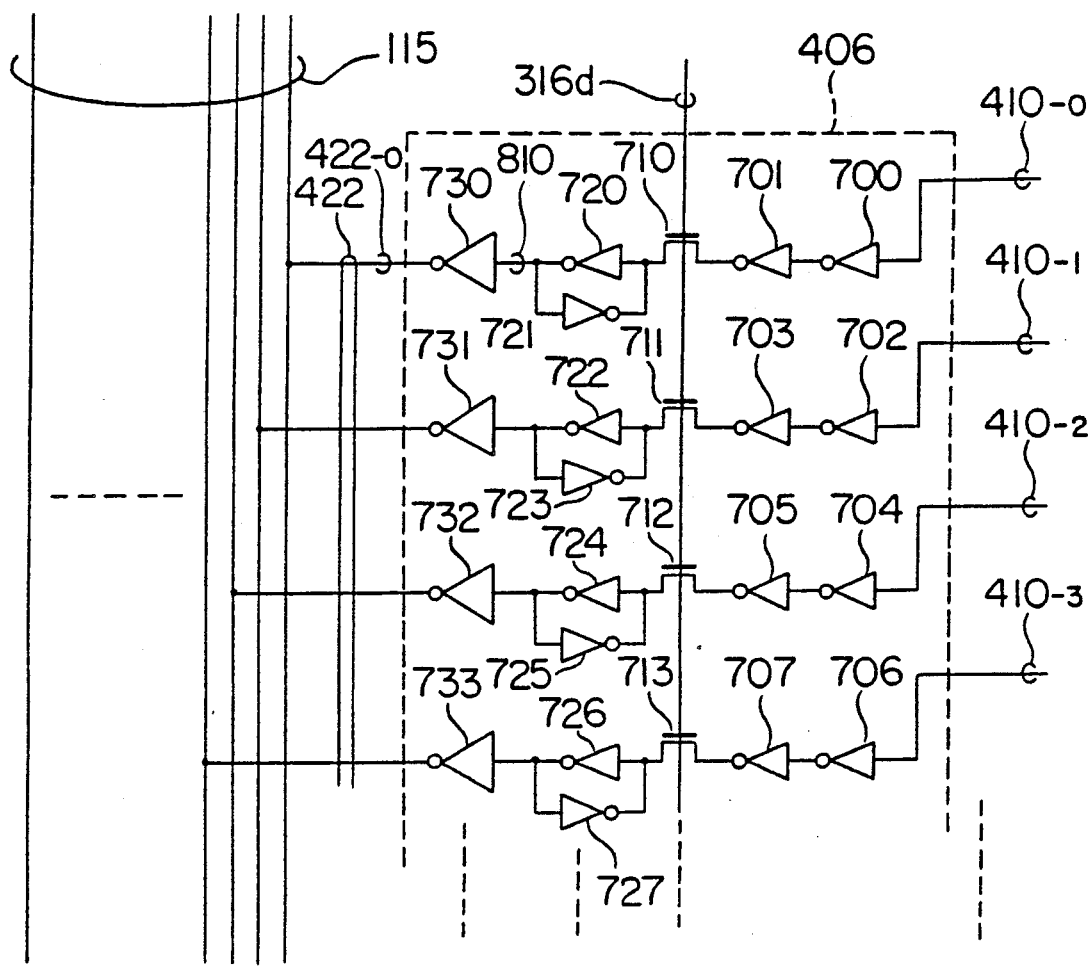
Figure 8:
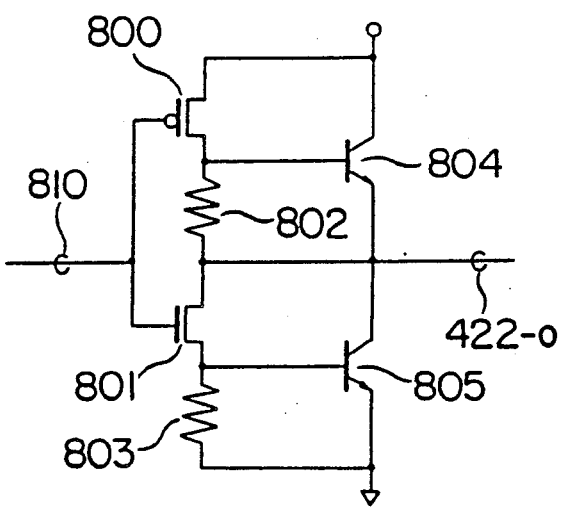
Figure 9:
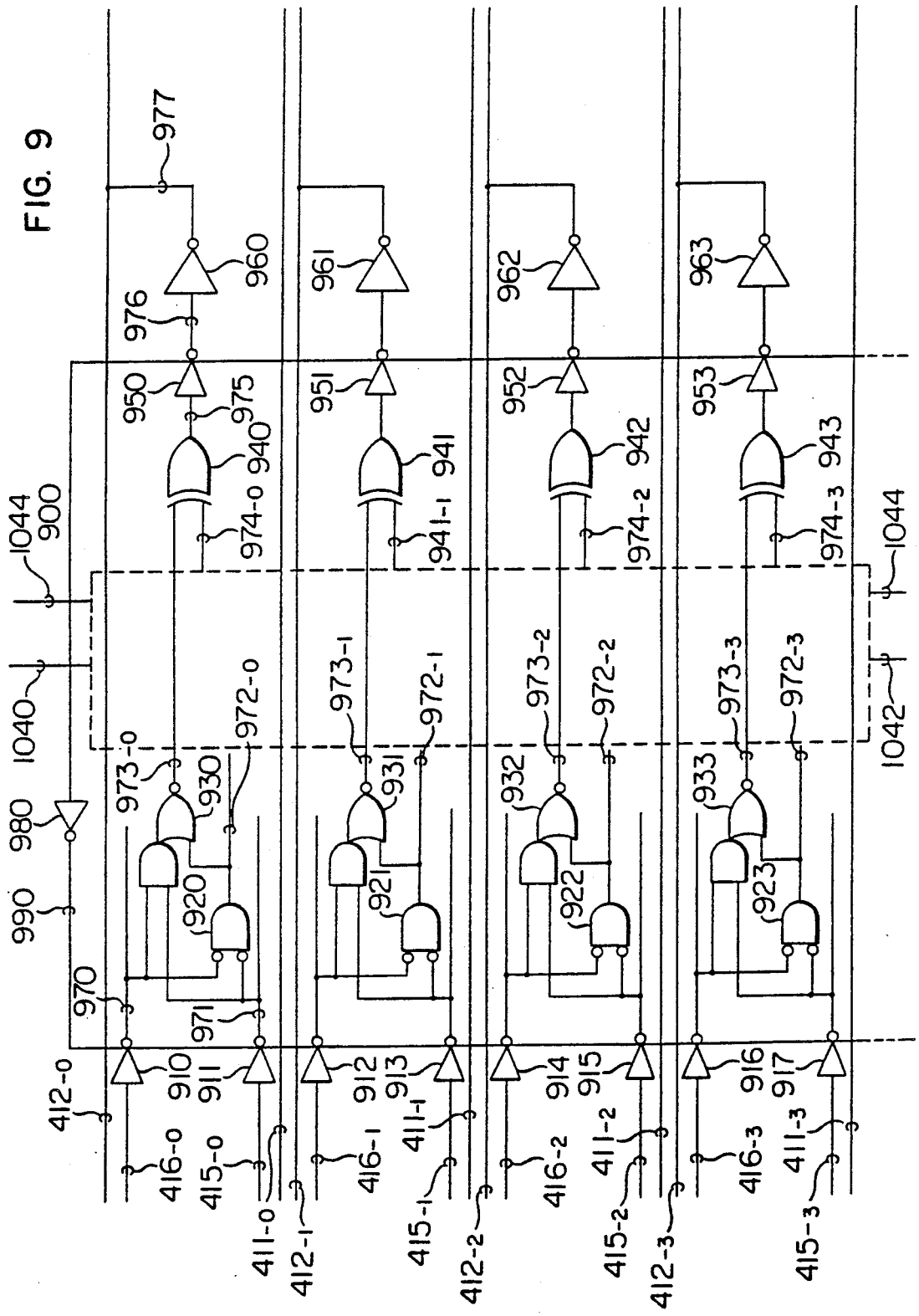
Figure 10:
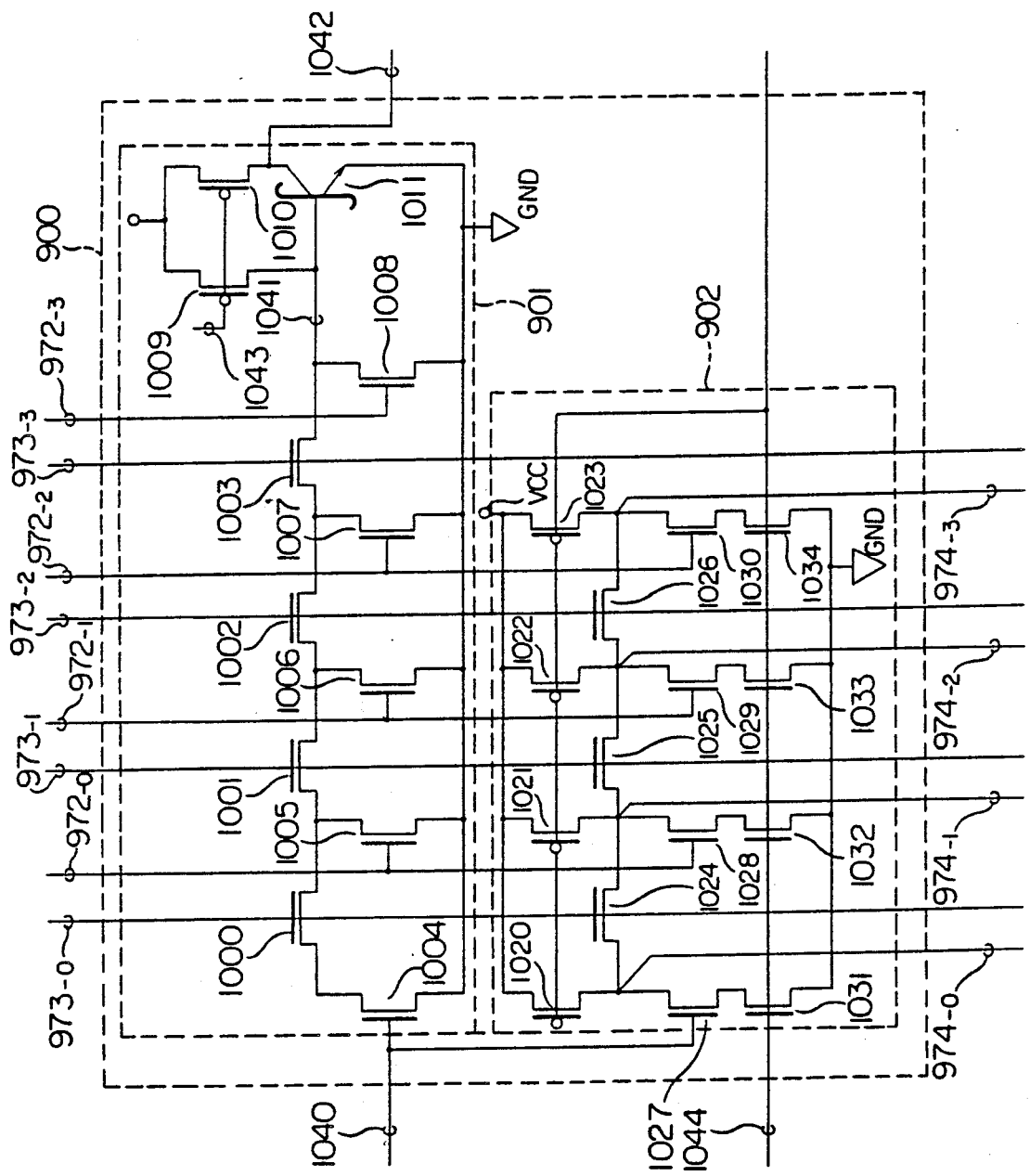
Figure 11:
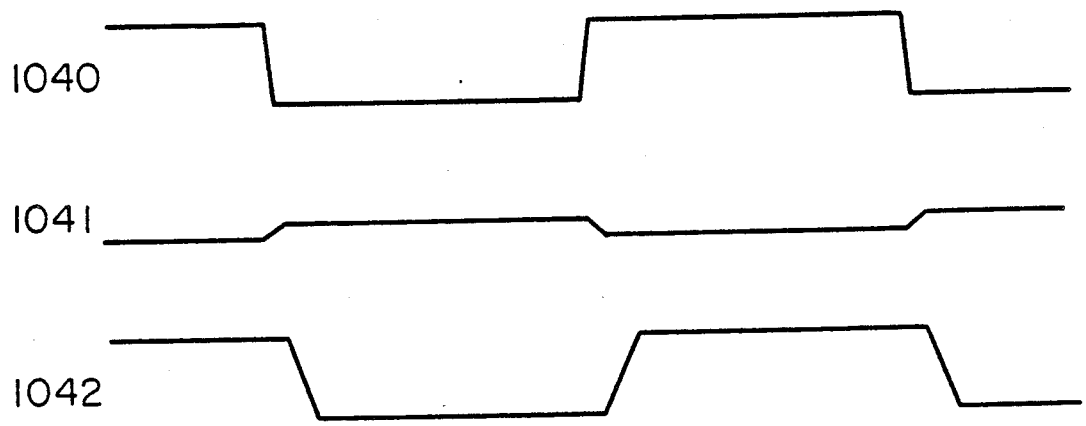
Figure 12:
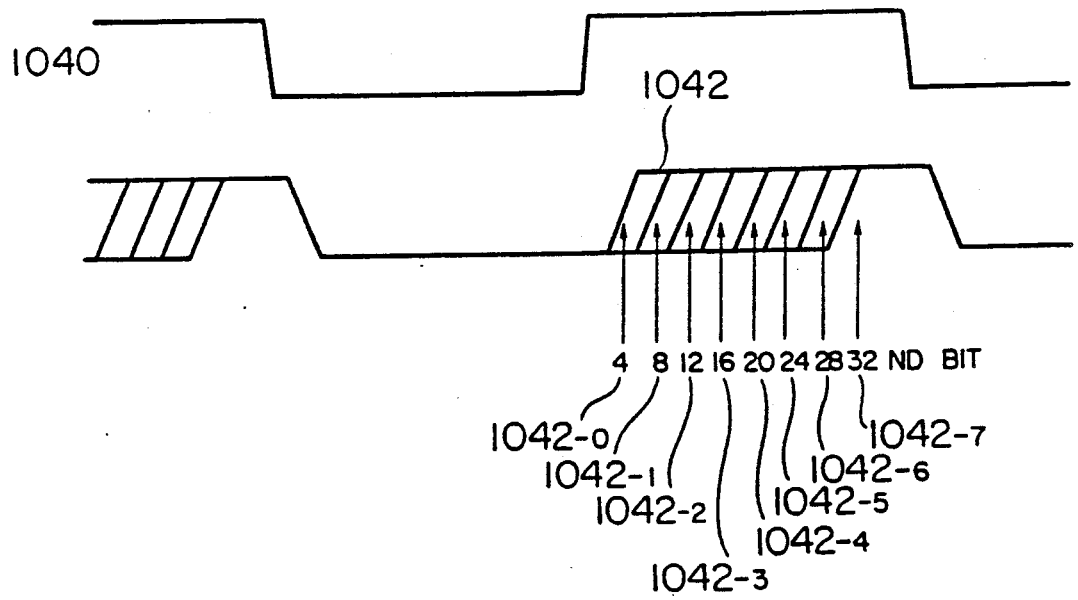
Figure 13:
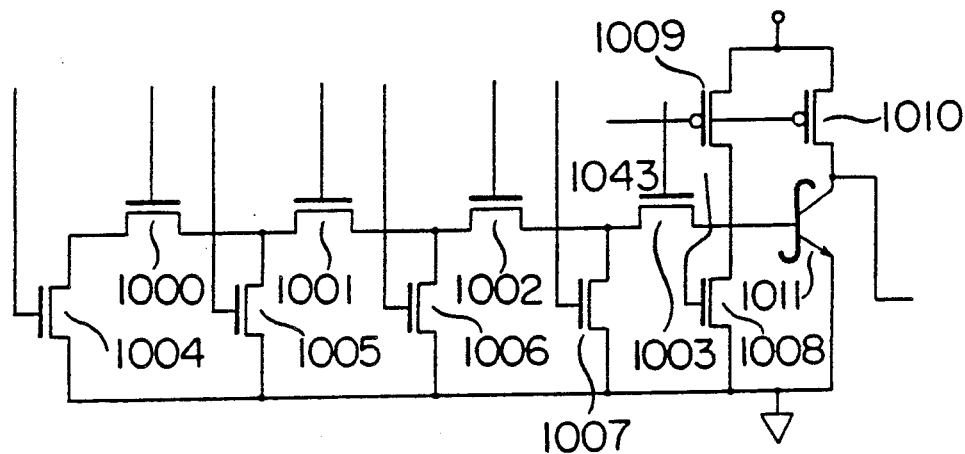
Figure 14:
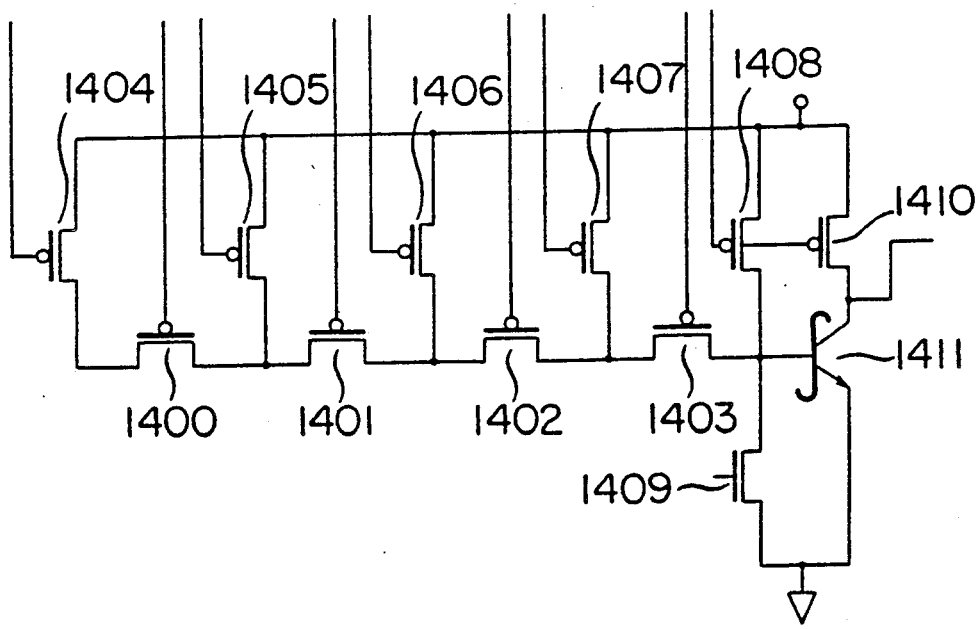
Figure 16:
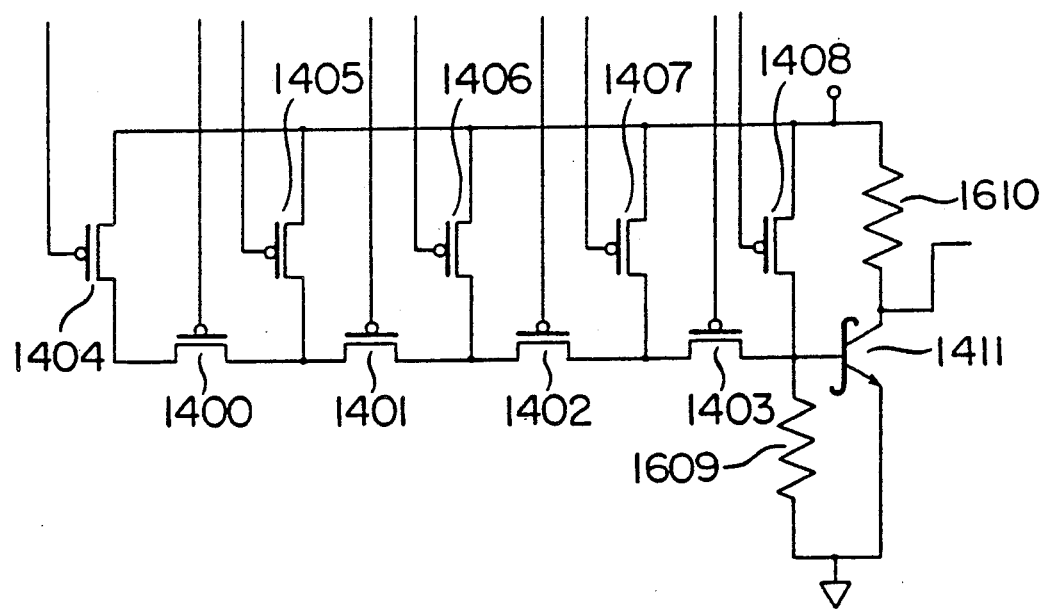
Figure 19:
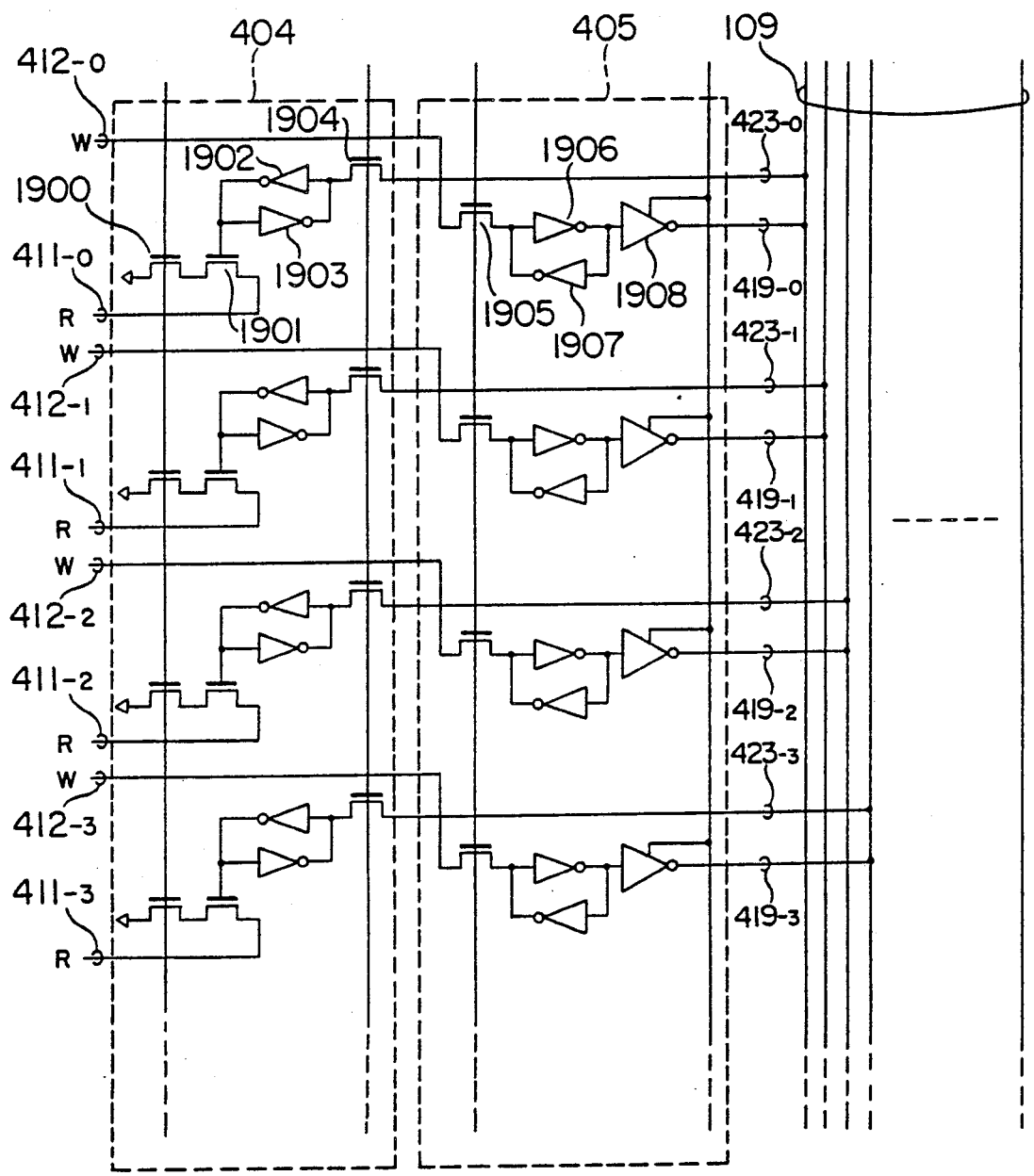
Figure 20:
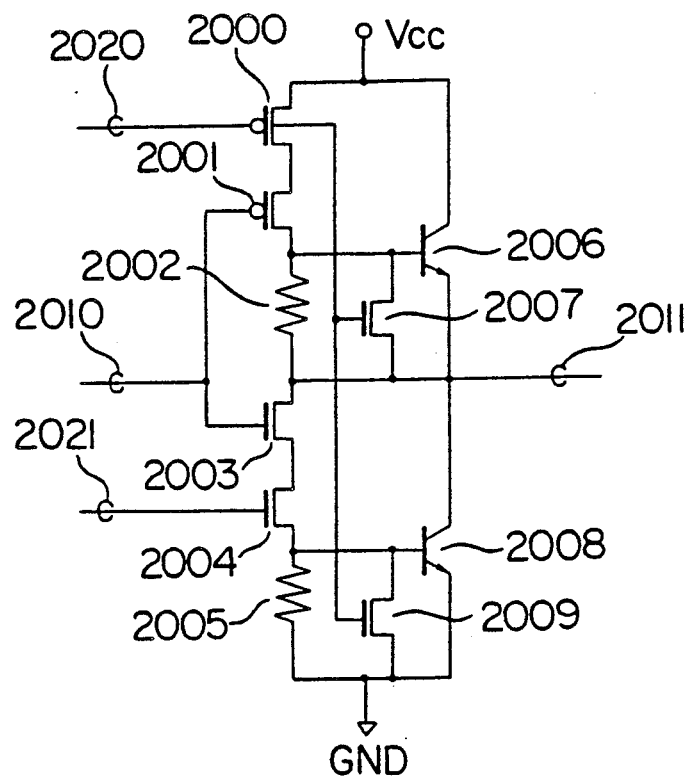
Figure 21:
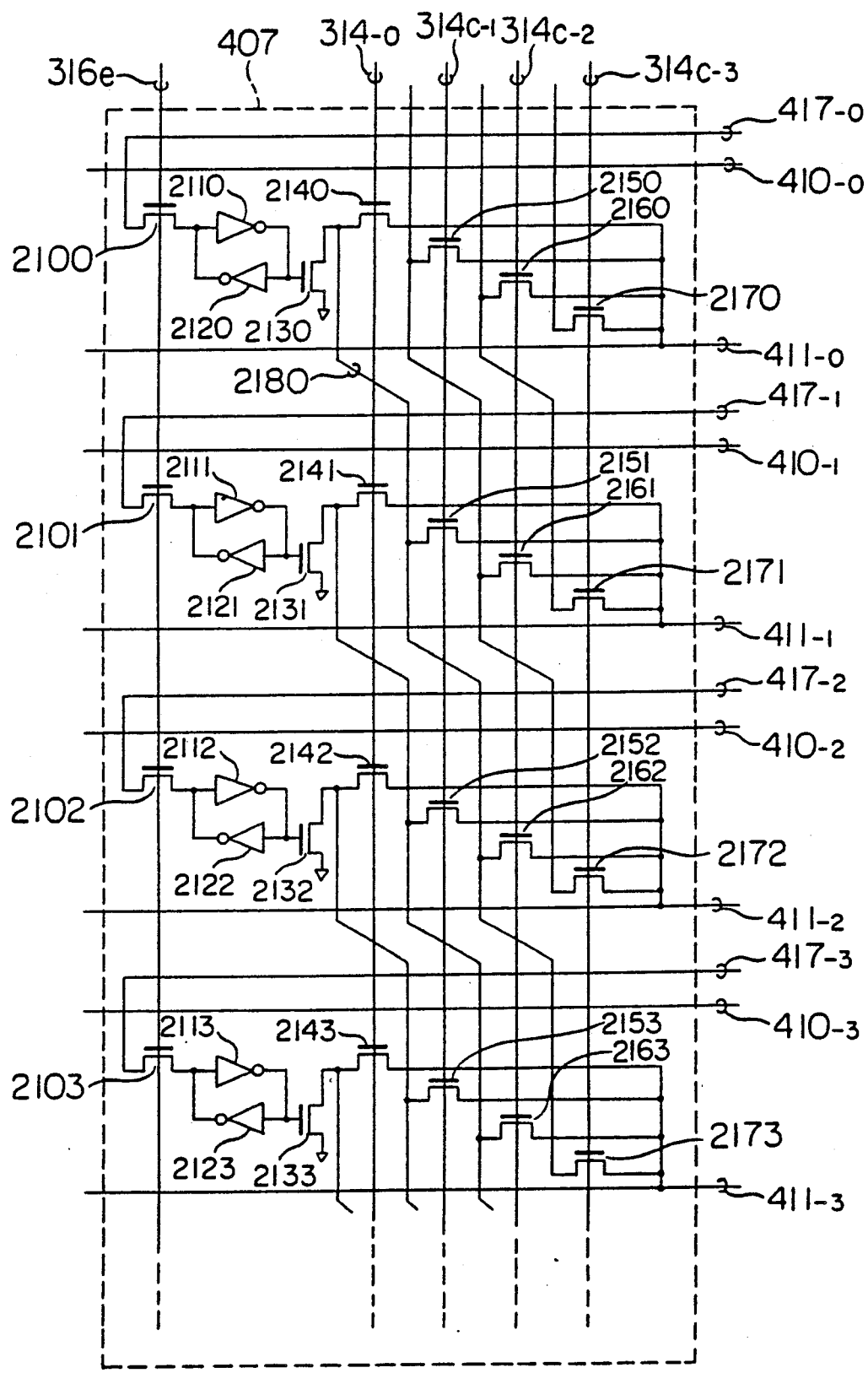
Figure 22:
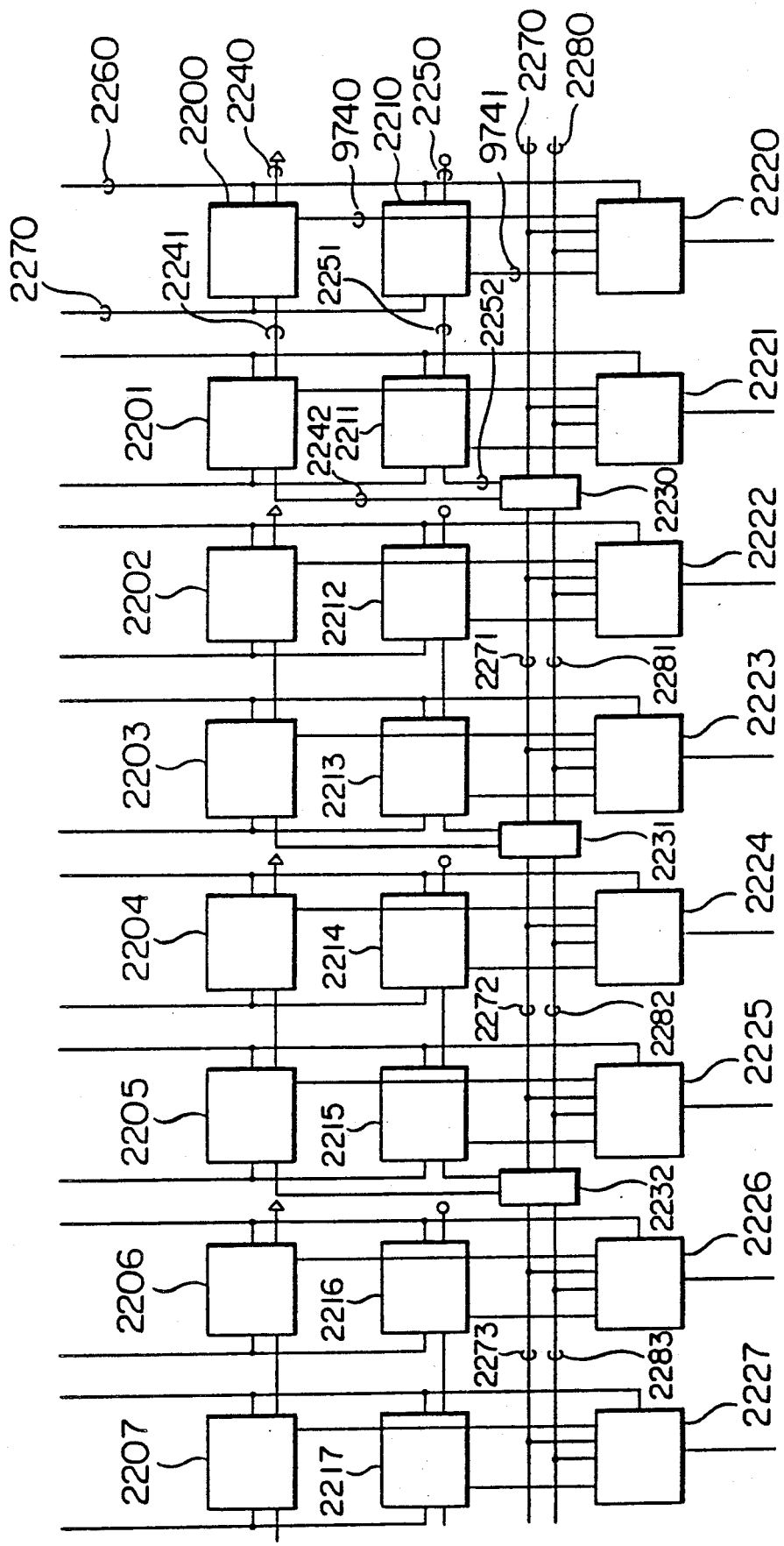
Figure 24:
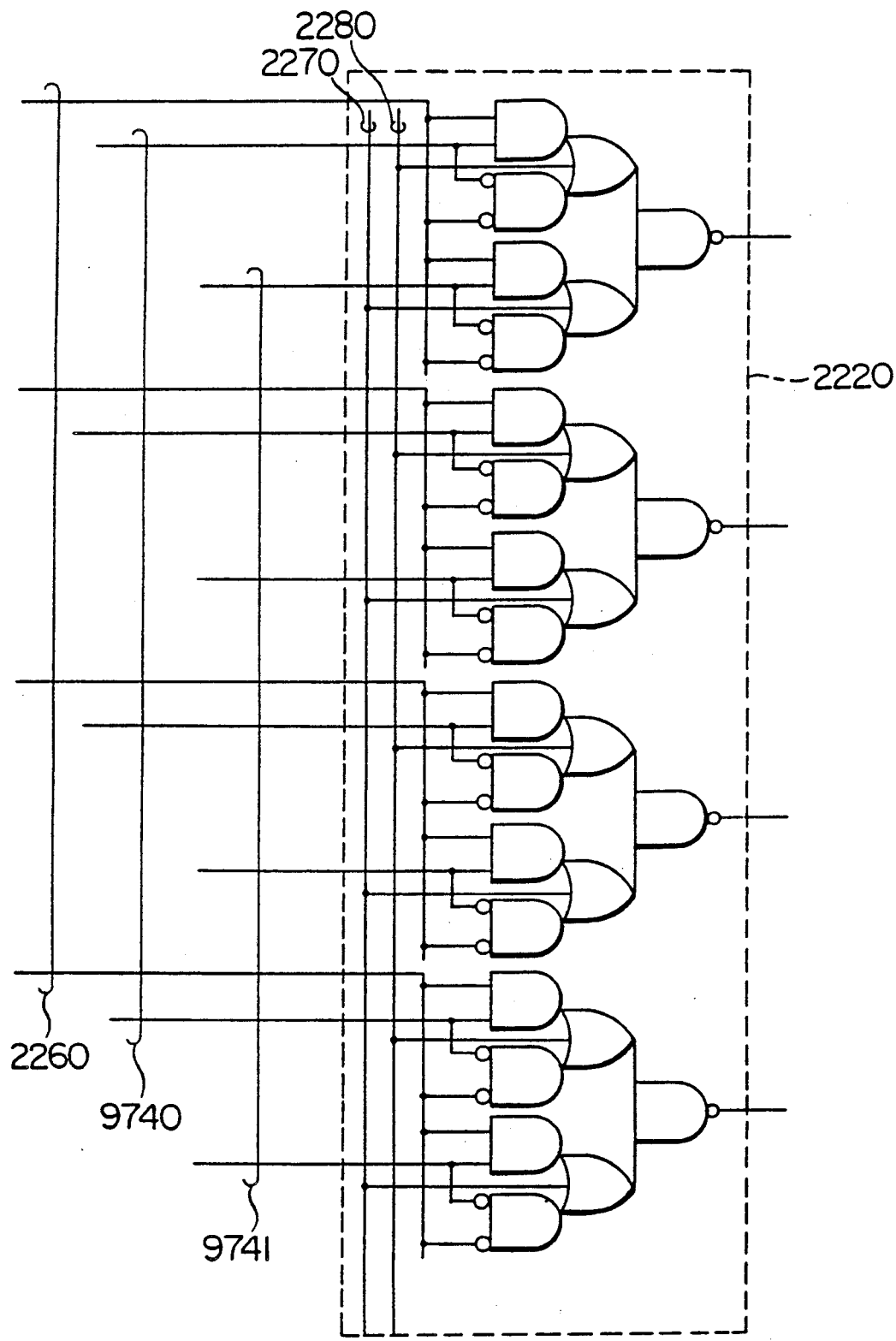
Figure 25:
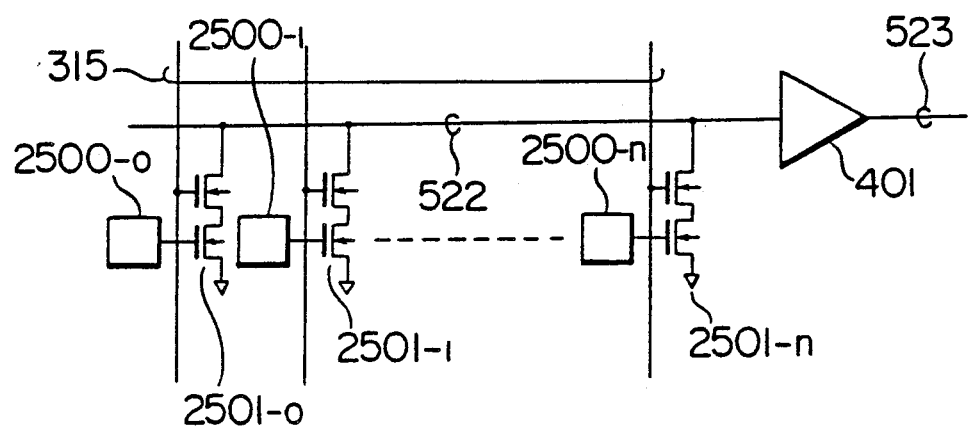
Figure 26:
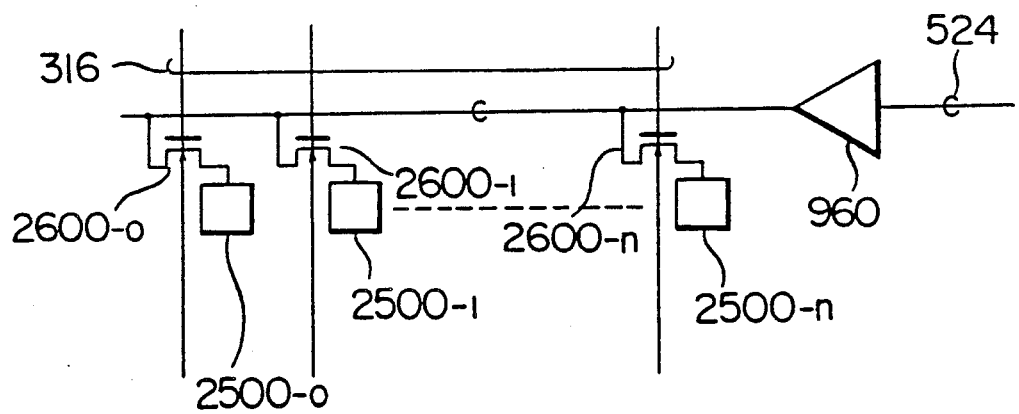
Figure 27:
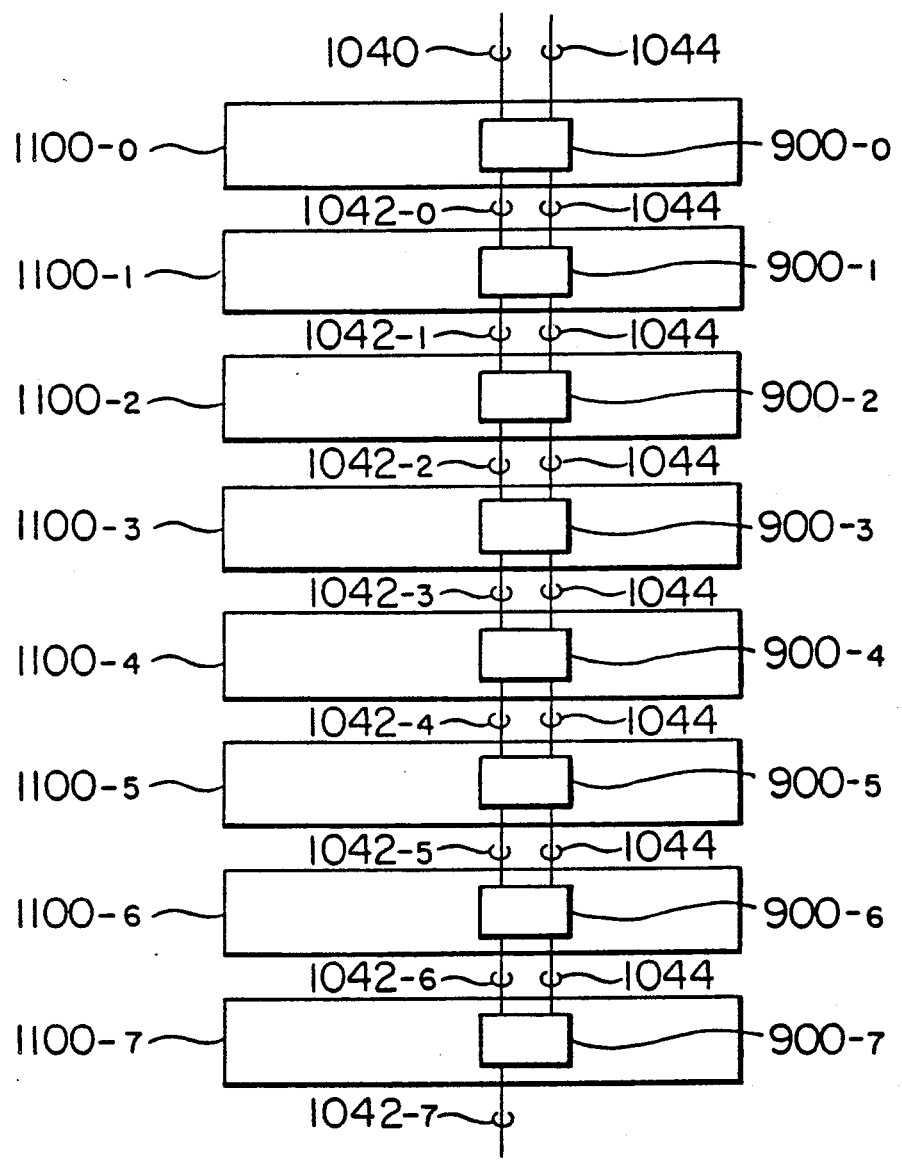

FIG. 5 is a circuit diagram of the registers 400 and the precharge and sense circuits 401 and 402 of FIG. 4;

FIG. 6 shows operation waveforms for the precharge and sense circuits of FIG. 5;

FIG. 7 is a circuit diagram showing the address register 406 of FIG. 4;

FIG. 8 is a schematic diagram showing details of the bus driver 730 of FIG. 7;

FIG. 9 is a circuit diagram showing details of the arithmetic operation circuit 403 of FIG. 4;

FIG. 10 is a schematic diagram showing details of the carry propagation circuit 900 of FIG. 9;

FIG. 11 is a waveform diagram showing waveforms of the carry-look-ahead circuit 901 of FIG. 10;

FIG. 12 is a waveform diagram showing states of the carry output signals of carry propagation circuits from the arrangement of FIG. 27;

FIG. 13 is a schematic circuit showing a 4-bit block carry look-ahead circuit 901 of FIG. 10;

FIG. 14 is a circuit diagram showing an alternative arrangement for a 4-bit block carry look-ahead circuit 901;

FIGS. 15, 16, 17(a), 17(b), 17(c) and 17(d) show further modifications for the carry look-ahead circuits 901;

FIGS. 18(a) and 18(b) show a modified form for connecting the elements of the NPN transistor 1411 in FIG. 16;

FIG. 19 shows data registers 404 and 405 of FIG. 4;

FIG. 20 shows a 3-state circuit 1908 of FIG. 19;

FIG. 21 is a schematic circuit showing a barrel shifter 407 of FIG. 4;

FIG. 22 shows another applied form of a carry propagation circuit of the embodiment of FIG. 10;

FIGS. 23(a), 23(b), 23(c), 23(d) and 23(e) show circuit arrangements for carry generators;

FIG. 24 shows a ½-adder for use in a carry propagation circuit;

FIG. 25 is a diagram showing the need for a sense circuit in the read bus between the register and arithmetic operation circuit of the present invention;

FIG. 26 is a diagram showing the necessity of a buffer having high driving capability in a write bus 524;

FIG. 27 shows an embodiment in which a 32-bit adder is formed of 8 adders each having 4 bits.

Figure 28:
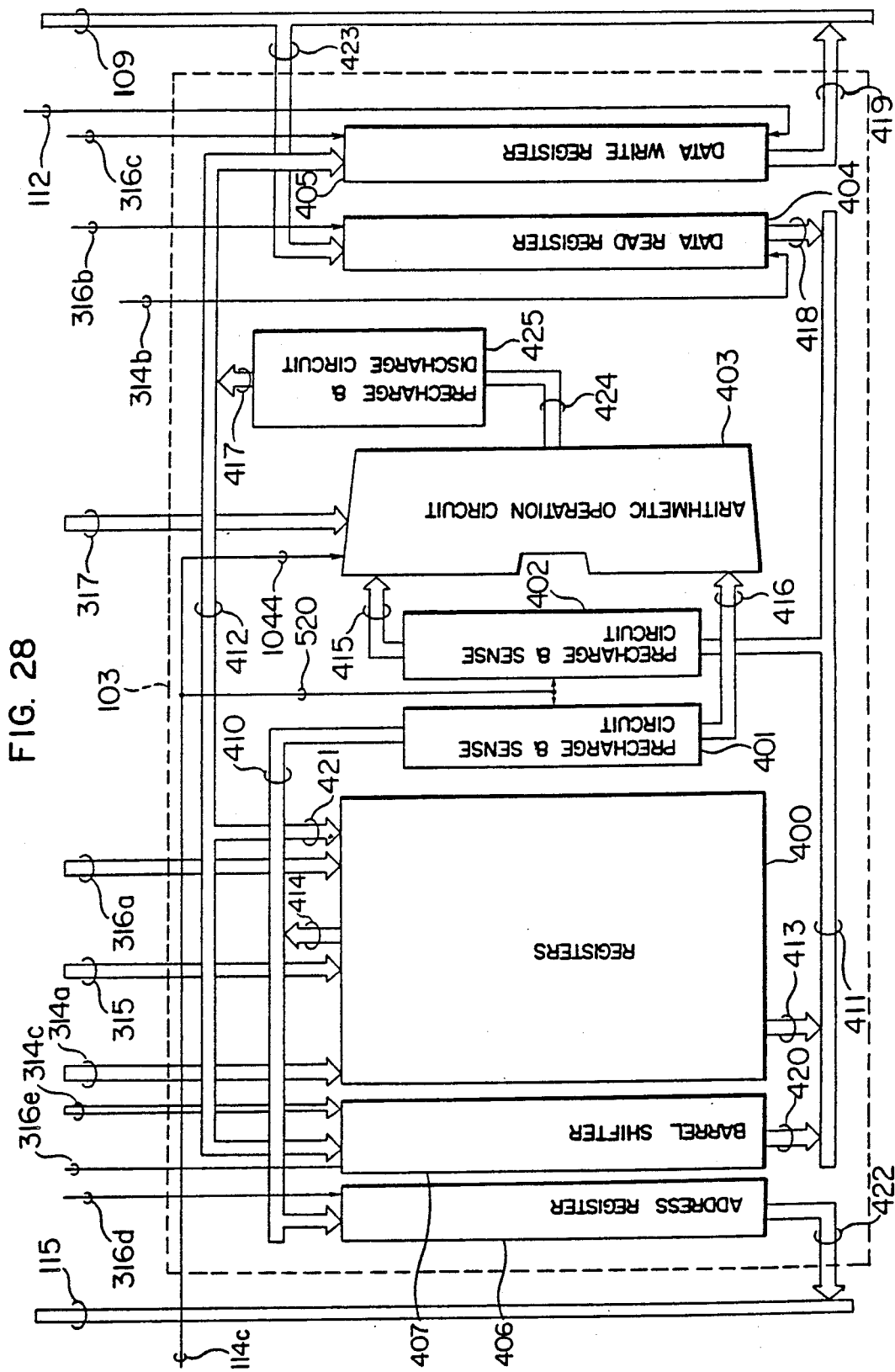
Figure 29:
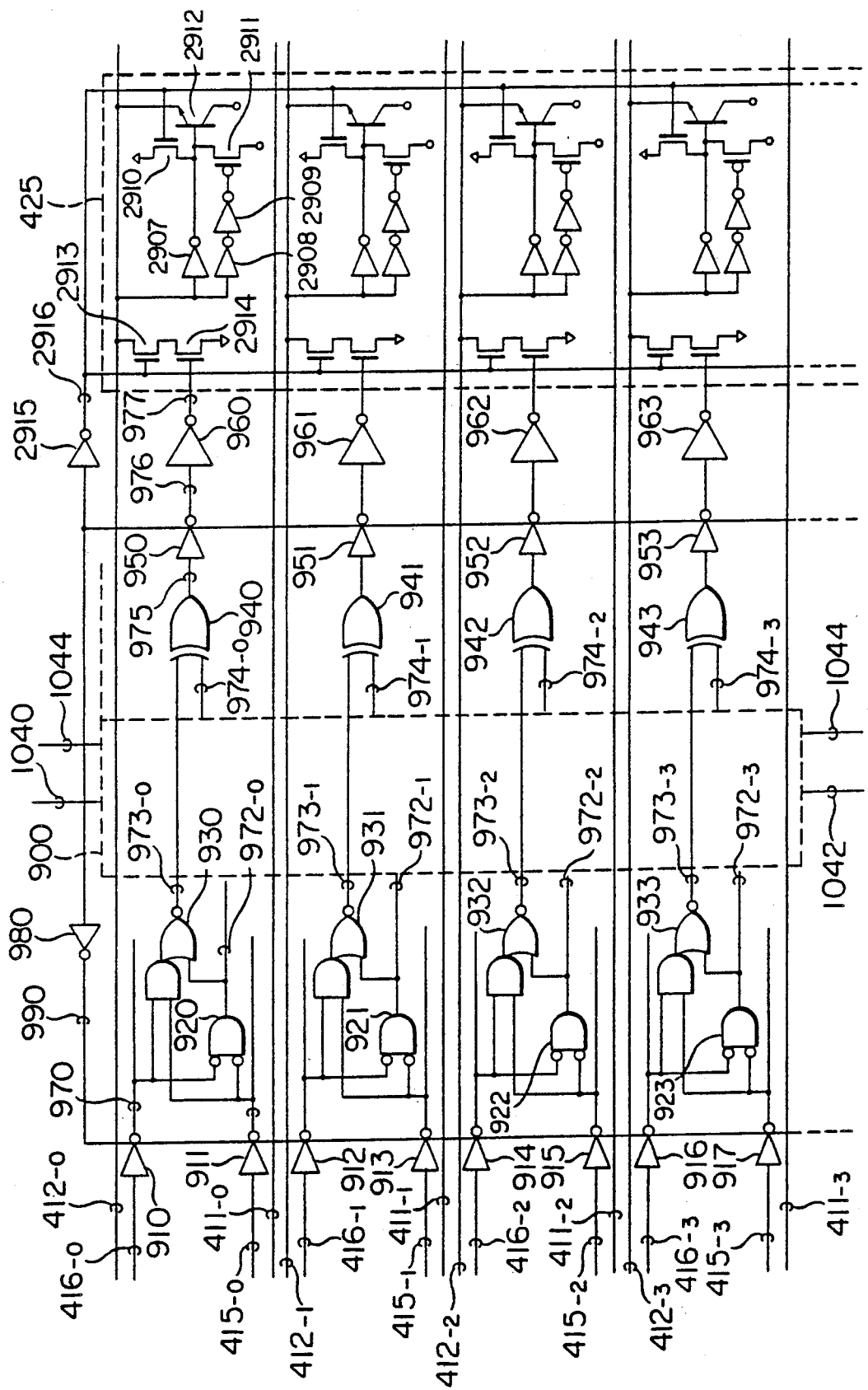
Figure 30:
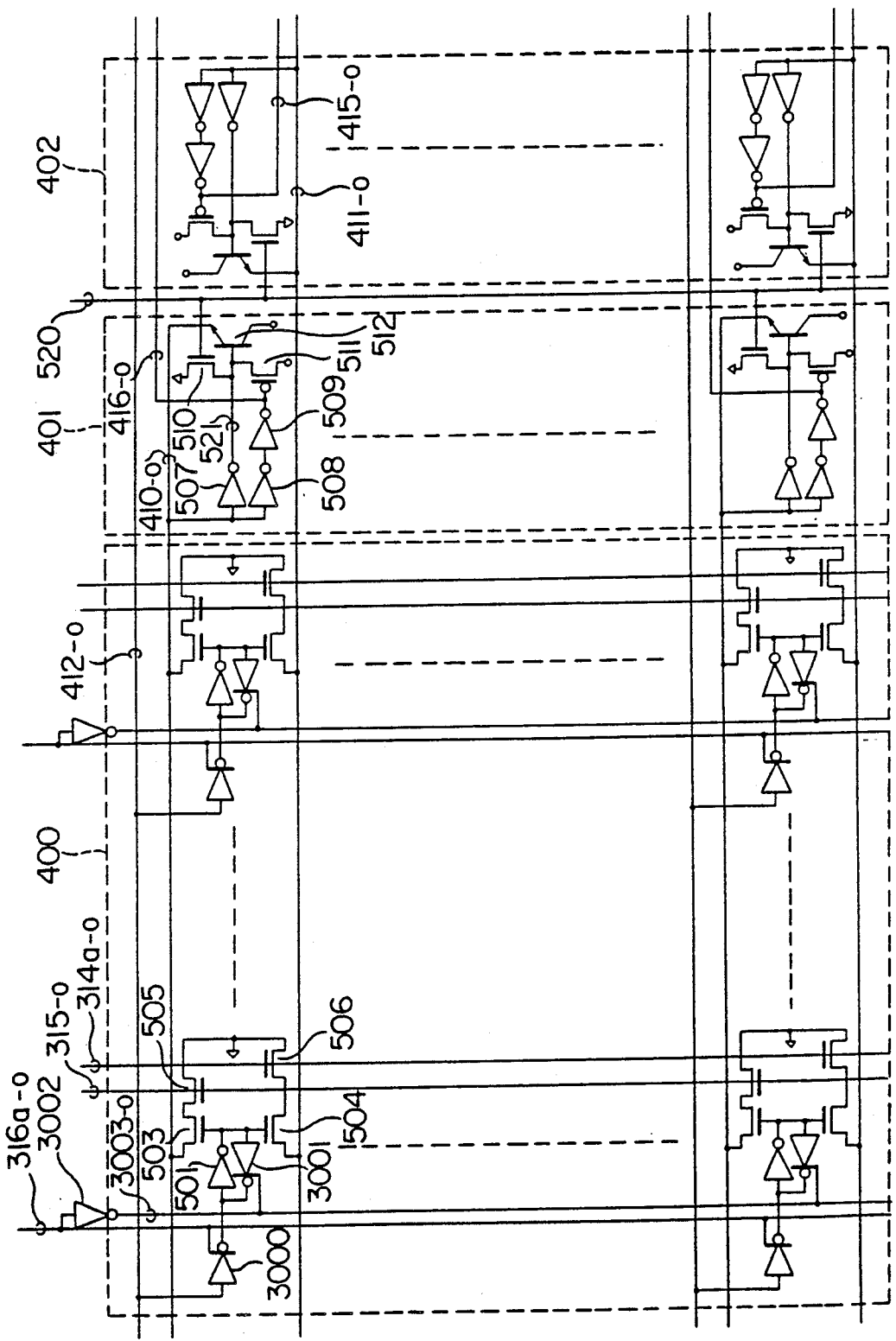
Figure 31:
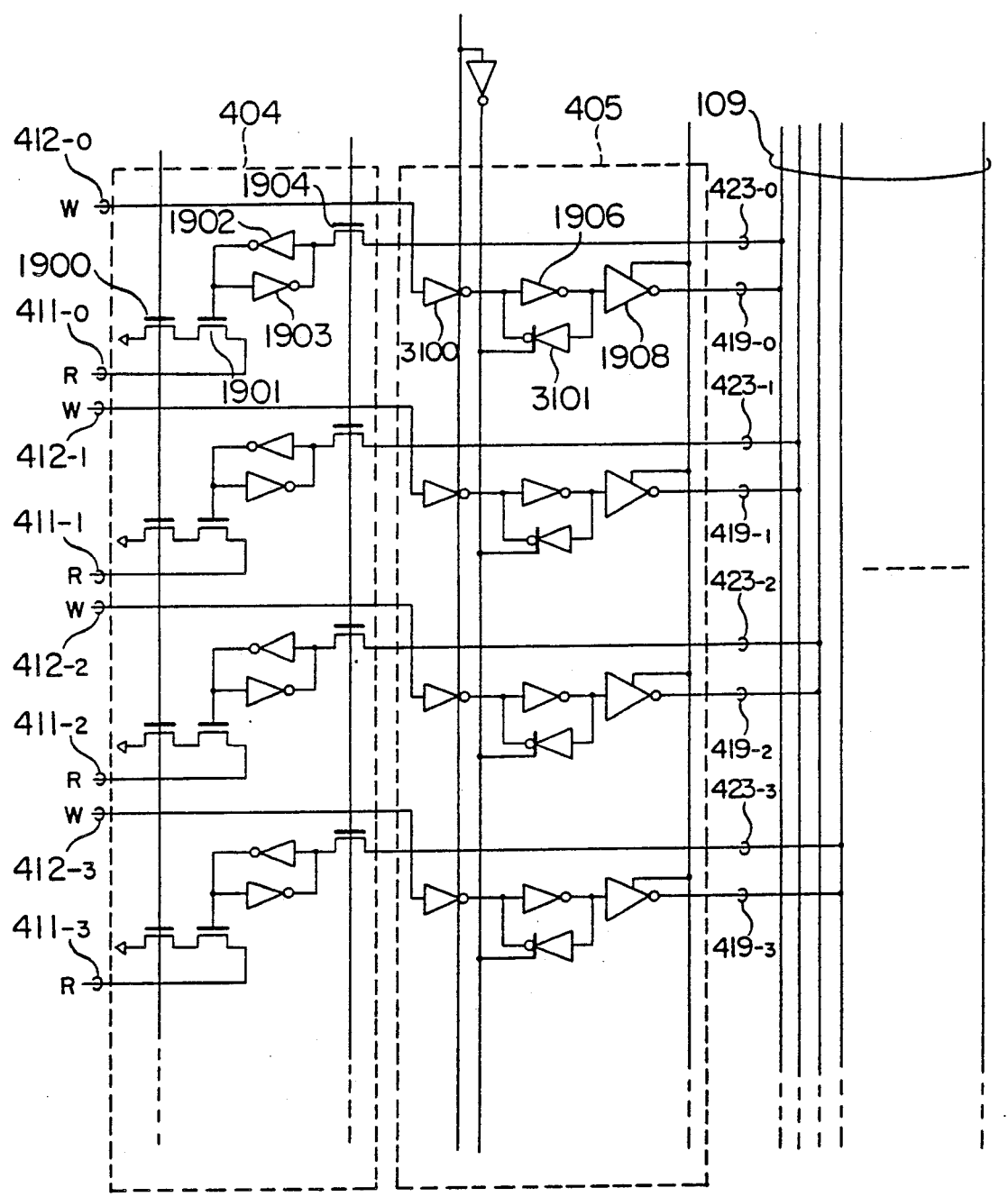
Figure 32:
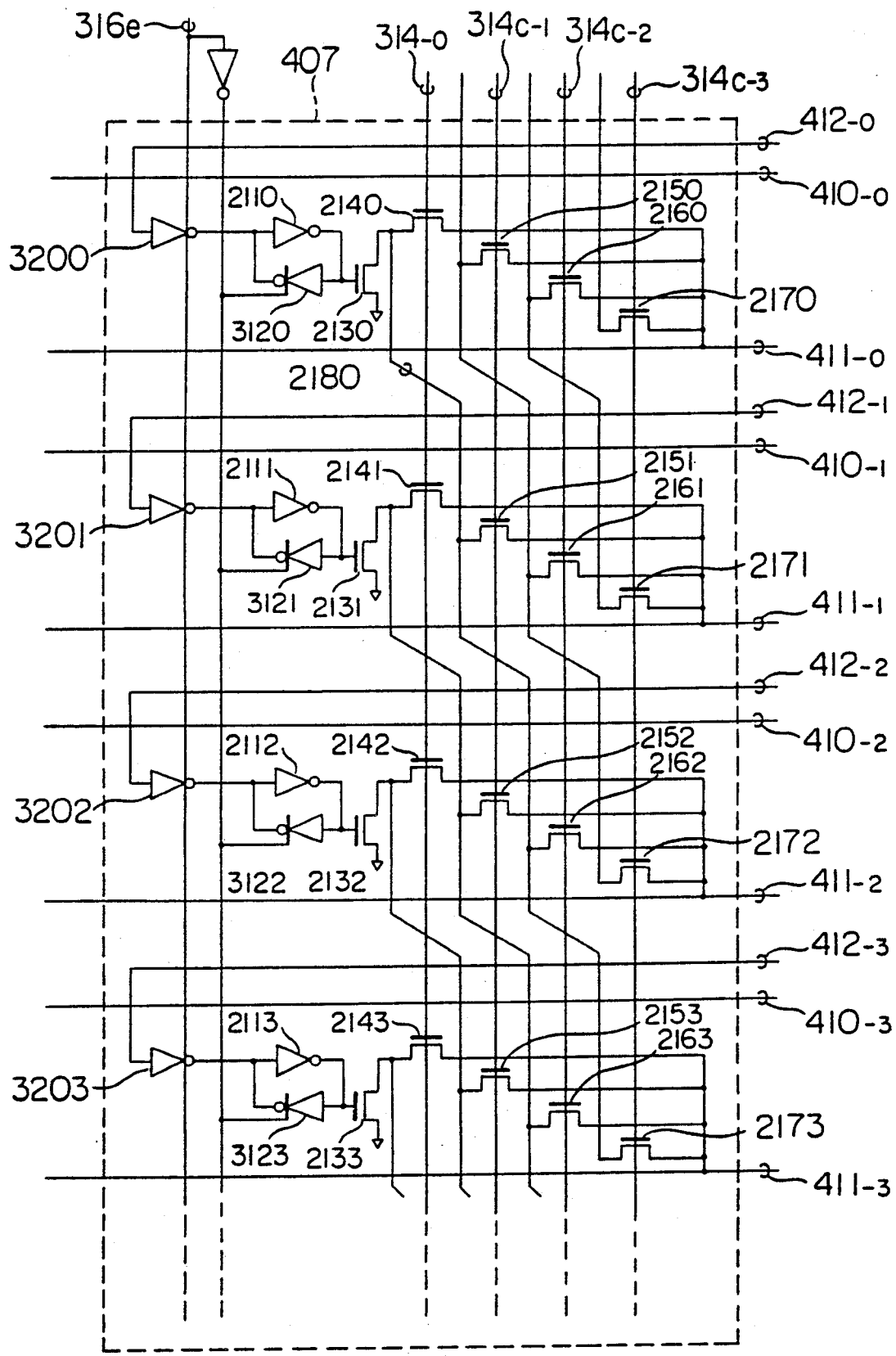
Figure 33:
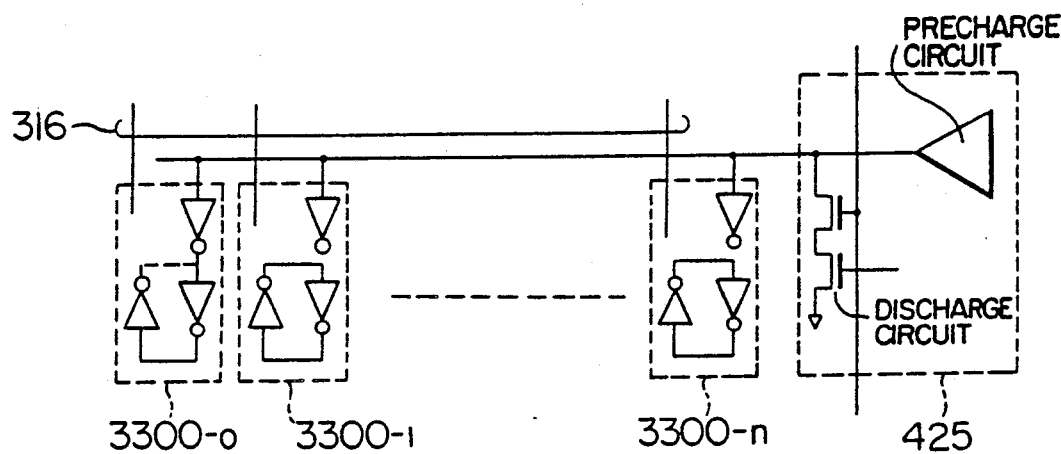
Figure 34:
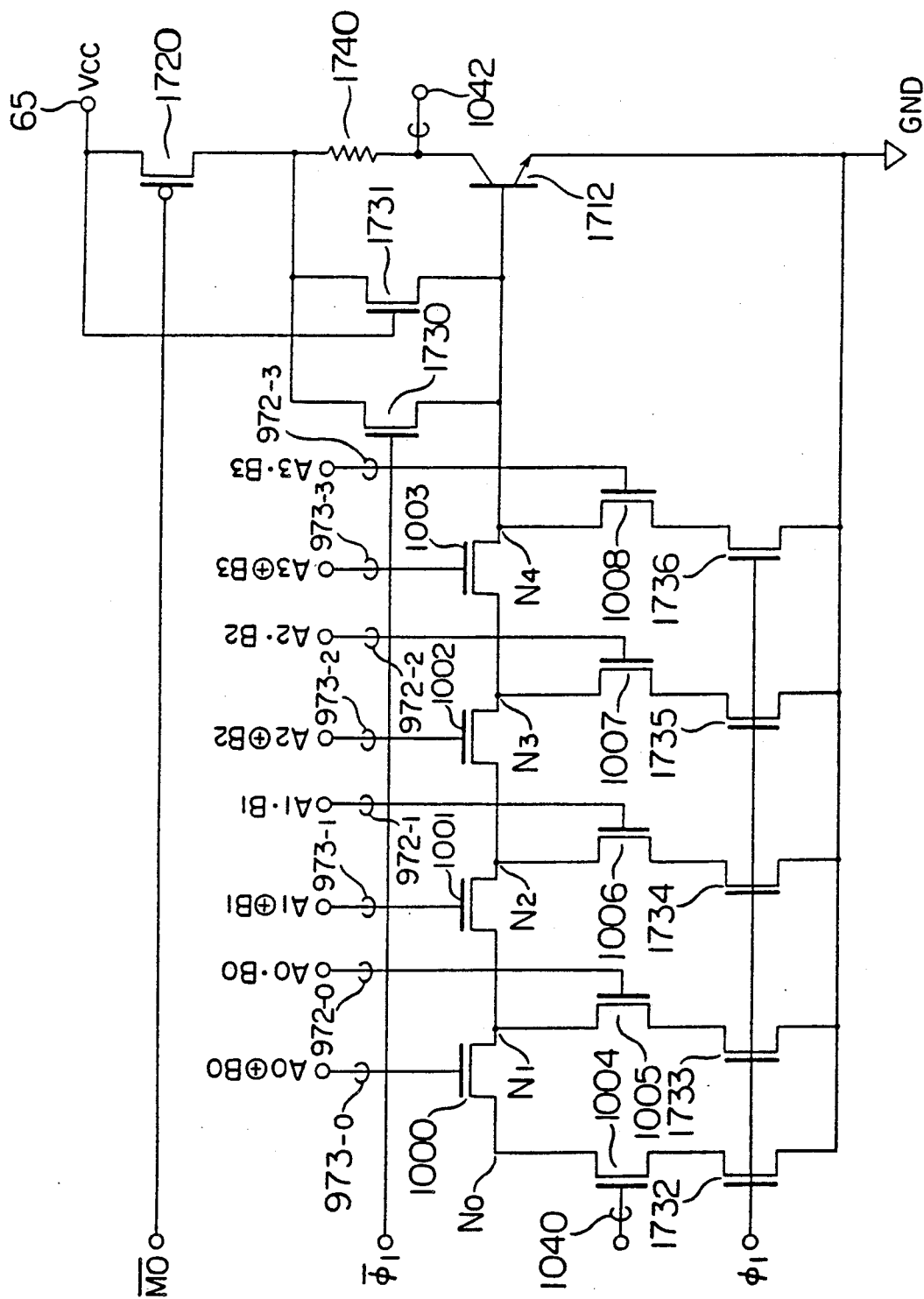
Figure 36:
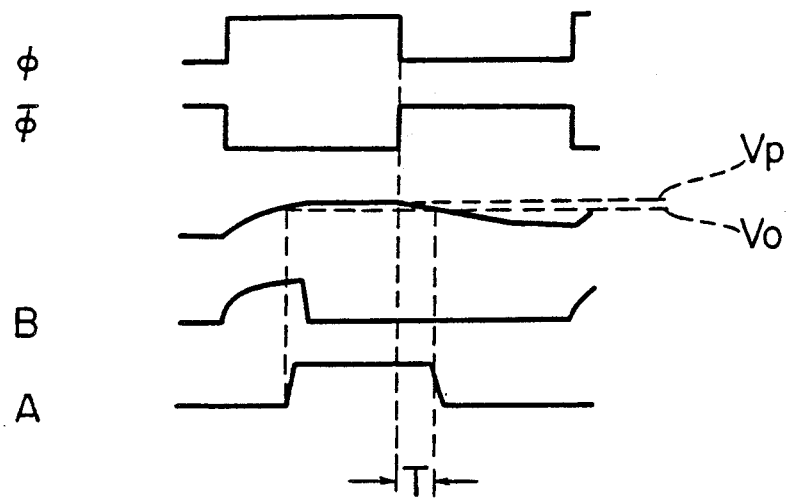
Figure 50:
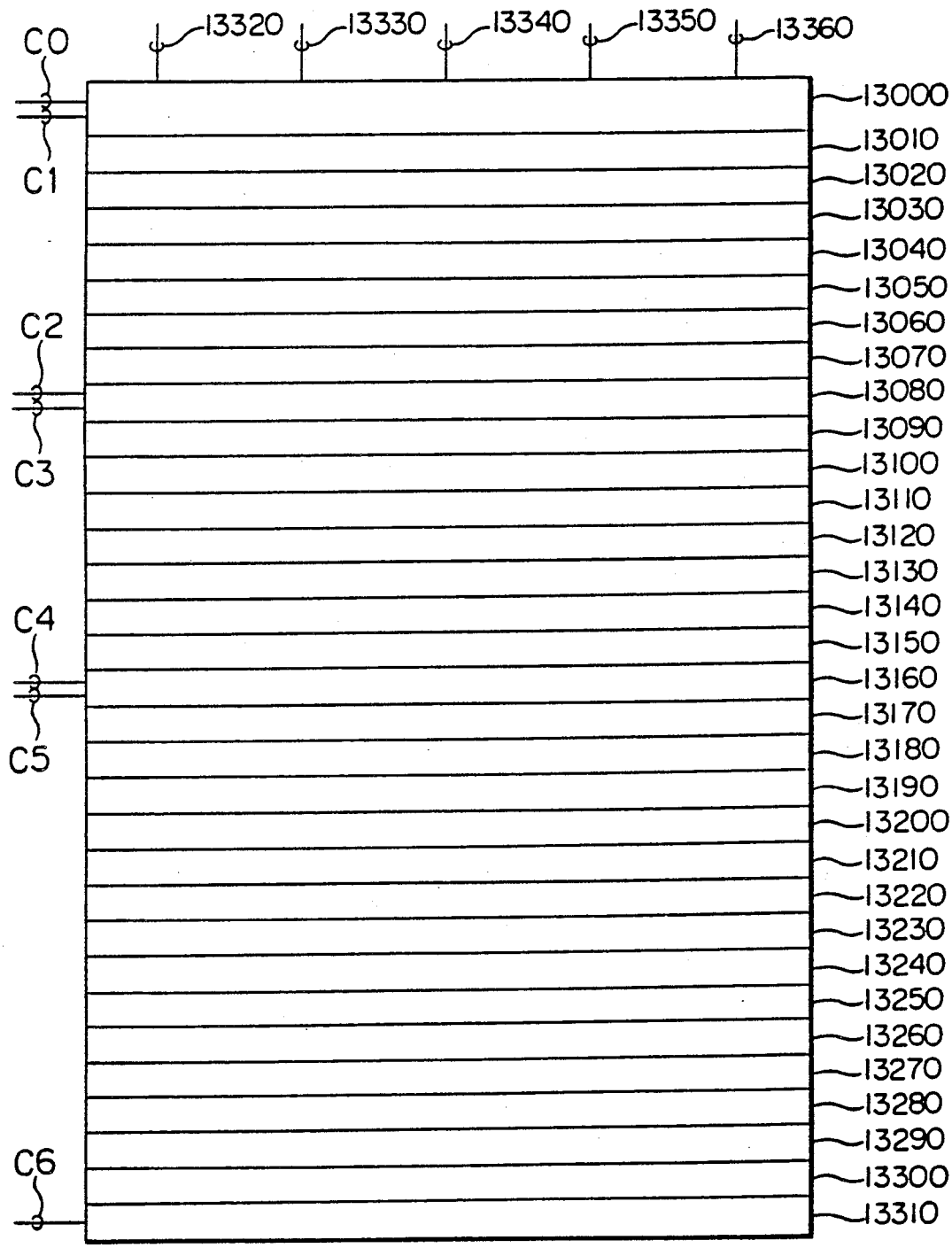

FIG. 28 shows a second embodiment of an arithmetic operation unit 103 of FIG. 4;

FIG. 29 shows the connection between the arithmetic operation circuit 403 and the precharge and discharge circuit 425 based on the arrangement of FIG. 28;

FIG. 30 shows a modified form of registers 400 for the embodiment of FIG. 28;

FIG. 31 is a circuit diagram showing details for the registers 404 and 405 of FIG. 28;

FIG. 32 is a circuit diagram showing details for the barrel shifter 407 of FIG. 28;

FIG. 33 shows a modification of the write bus of FIG. 28;

FIG. 34 shows a second embodiment of a 4-bit carry look-ahead circuit 901;

FIGS. 35 to 40 show embodiments of precharge and discharge circuits 425 of FIG. 29;

FIGS. 41 to 48 and 51 to 54 show alternative arrangements for barrel shifter circuits in accordance with the present invention; and FIGS. 49, 50 and 55 are explanatory diagrams regarding the shifting operation in accordance with the present invention.

The present invention will be apparent from the following detailed description taken in conjunction with the accompanying drawings.

An embodiment of the present invention will now be described hereinbelow with reference to the drawings.

Figure 1:
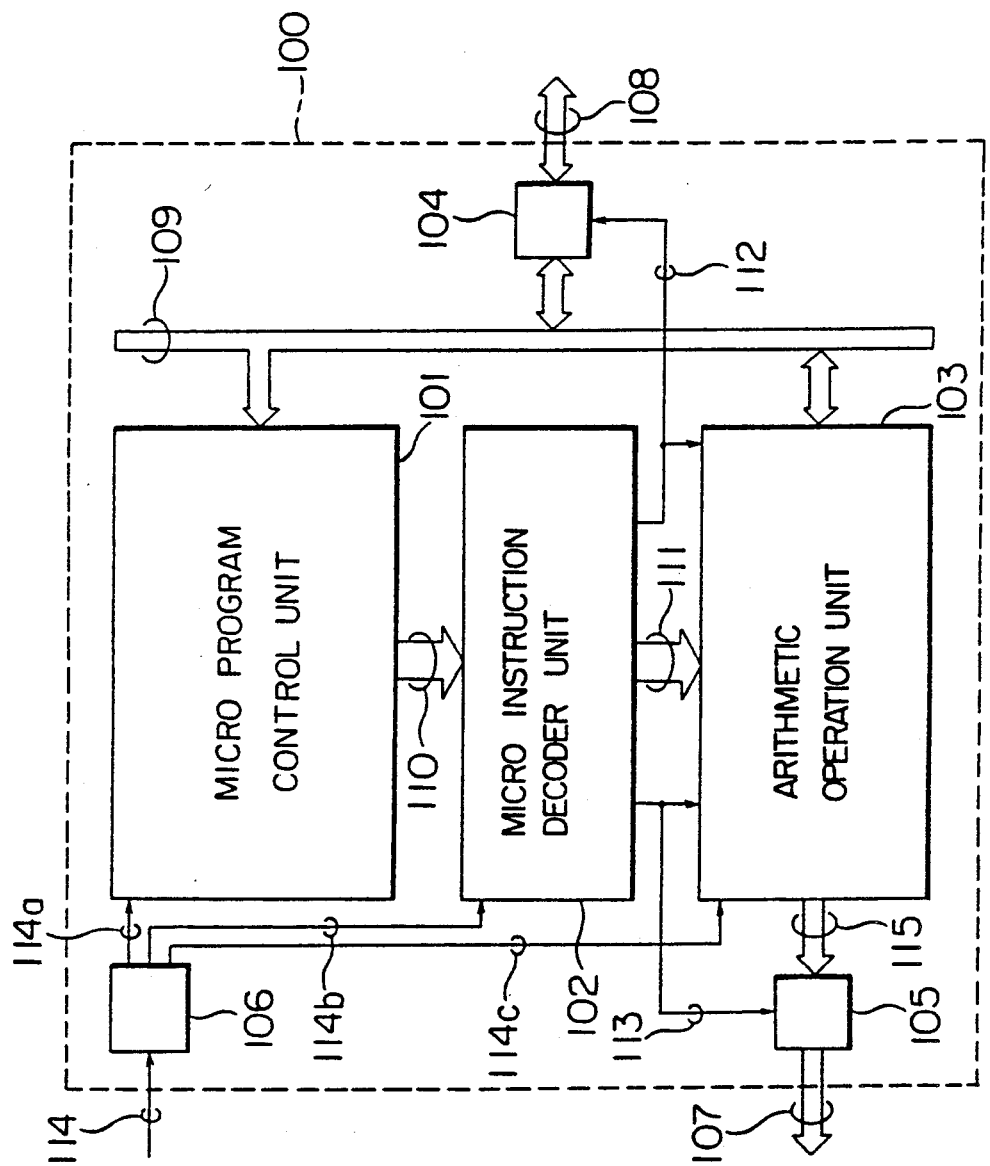
FIG. 1 is a block diagram showing a high integrated processor in accordance with a first embodiment of the present invention.

FIG. 1 is an arrangement diagram of a high integrated processor 100 which is integrated on one semiconductor substrate showing one embodiment of the present invention. This processor comprises: a micro program control unit 101 using a micro program ROM (Read Only Memory) as a main element; a micro instruction decoder unit 102; an arithmetic operation unit 103; an input/output buffer 104 for data; an output buffer 105 for address; and a clock supply buffer 106. The operation from the instruction fetching until the execution will then be described as an example with reference to FIG. 1.

(1) Instruction fetch

The content of a program counter in the arithmetic operation unit 103 is outputted to the output buffer 105 for the address through a bus 115 and is supplied to the outside of the processor 100 through a bus 107B. An instruction word corresponding to this address is supplied to the micro program control unit 101 through a bus 108, data input/output buffer 104 and an internal bus 109.

(2) Readout of a micro instruction

An instruction word applied to the micro program control unit 101 is interpreted and is outputted as a micro instruction string onto a bus 110.

(3) Interpretation and execution of a micro instruction

A micro instruction is applied from the micro program control unit 101 to the micro instruction decoder unit 102 through the bus 110 and is interpreted. Thus, signals 111, 112 and 113 to directly control the arithmetic operation unit 103 are outputted.

On the other hand, an original clock 114, which is inputted to the clock supply buffer 106, is supplied to the respective units 101, 102 and 103 through clock signal lines 114a, 114b and 114c, respectively.

Figure 2:
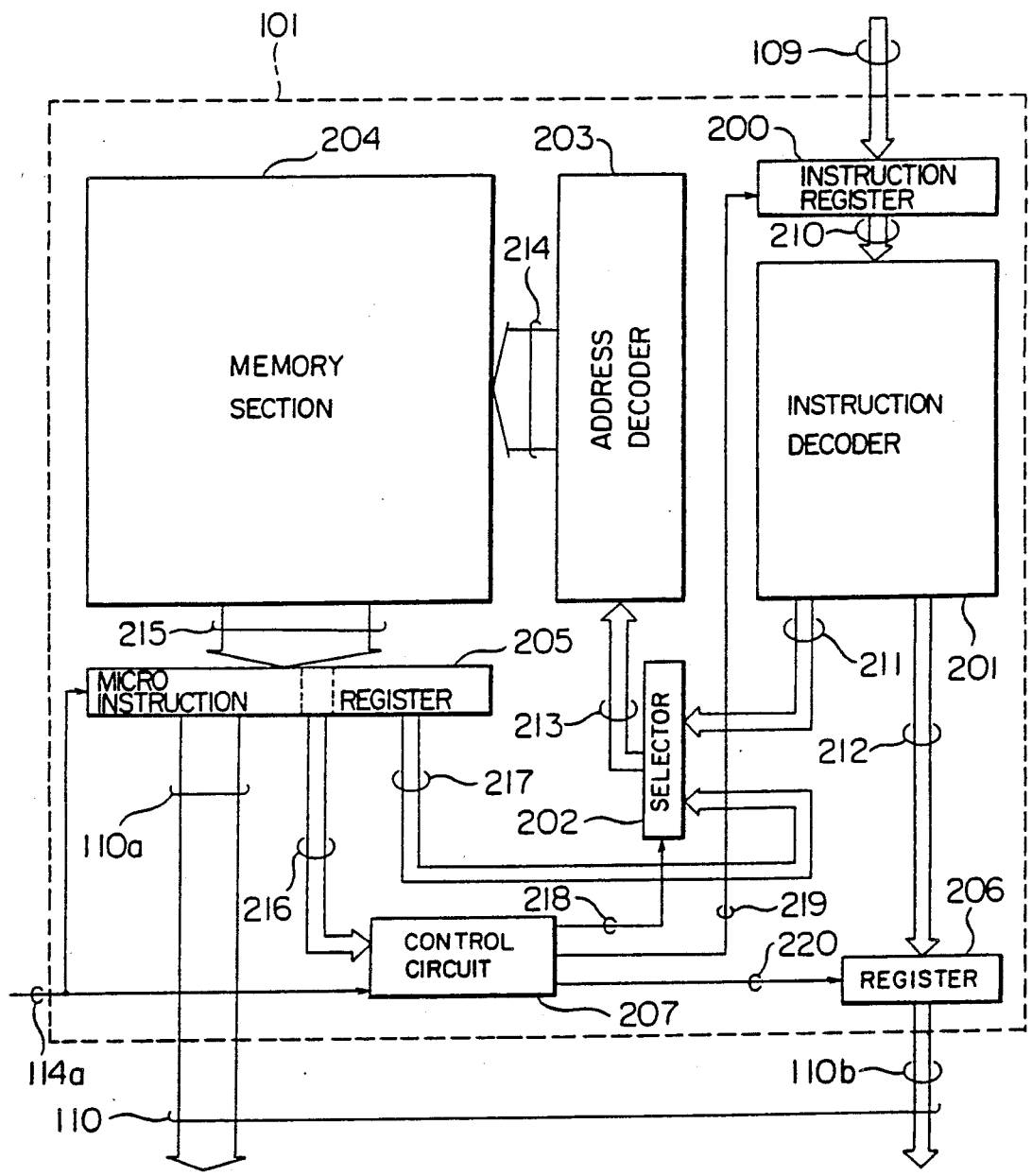
FIG. 2 is a block diagram showing the micro program control unit 101 of FIG. 1.

FIG. 2 is an arrangement diagram of the micro program control unit 101 in FIG. 1. The micro program control unit 101 comprises: an instruction register 200; an instruction decoder 201; a micro address selector 202; an address decoder 203 of the ROM; a memory section 204 of the ROM; a micro instruction register 205; a register 206 for a register number; and a control circuit 207 in the micro program control unit 101. An instruction word which is inputted to the micro program control unit 101 through the bus 109 is controlled to be loaded into the instruction register 200 by a control signal 219 of the control circuit 207. The content of the instruction register 200 is applied to the instruction decoder 201 through a bus 210 and is interpreted. Thus, a head address signal 211 of the corresponding micro program and a register number signal 212 are outputted. For the former signal, the micro address selector 202 selects the side of the head address signal 211 in response to an output signal 218 of the control circuit 207. An output signal 213 of the micro address selector 202 is applied to the address decoder 203 of the ROM. On the other hand, the latter signal is loaded into the register 206 for register number in response to an output signal 220 of the control circuit 207.

In the address decoder 203 of the ROM, the word corresponding to the input address signal 213 is determined and one word which is stored in the memory section 204 of the ROM is read out by driving at least one of word signals 214. The word read out is loaded into the micro instruction register 205 through a bus 215. A part of the content of the micro instruction register 205 is connected to the micro instruction decoder unit 102 through a signal line 110a. On one hand, a signal line 216 in the other portion is connected to the control circuit 207 and is used for control of the foregoing instruction register 200, micro address selector 202 and register 206 for register number. Further, a signal line 217 in the still other portion indicates an address of a micro instruction which is read out subsequently to the micro instruction which is being executed at present. The micro address selector 202 is controlled through the signal line 218, thereby allowing the address signal 217 to be supplied onto the signal line 213.

In addition, an output signal 110b of the register 206 for register number is connected to the micro instruction decoder unit 102 at the next stage in a manner similar to the foregoing signal 110a.

Figure 3:
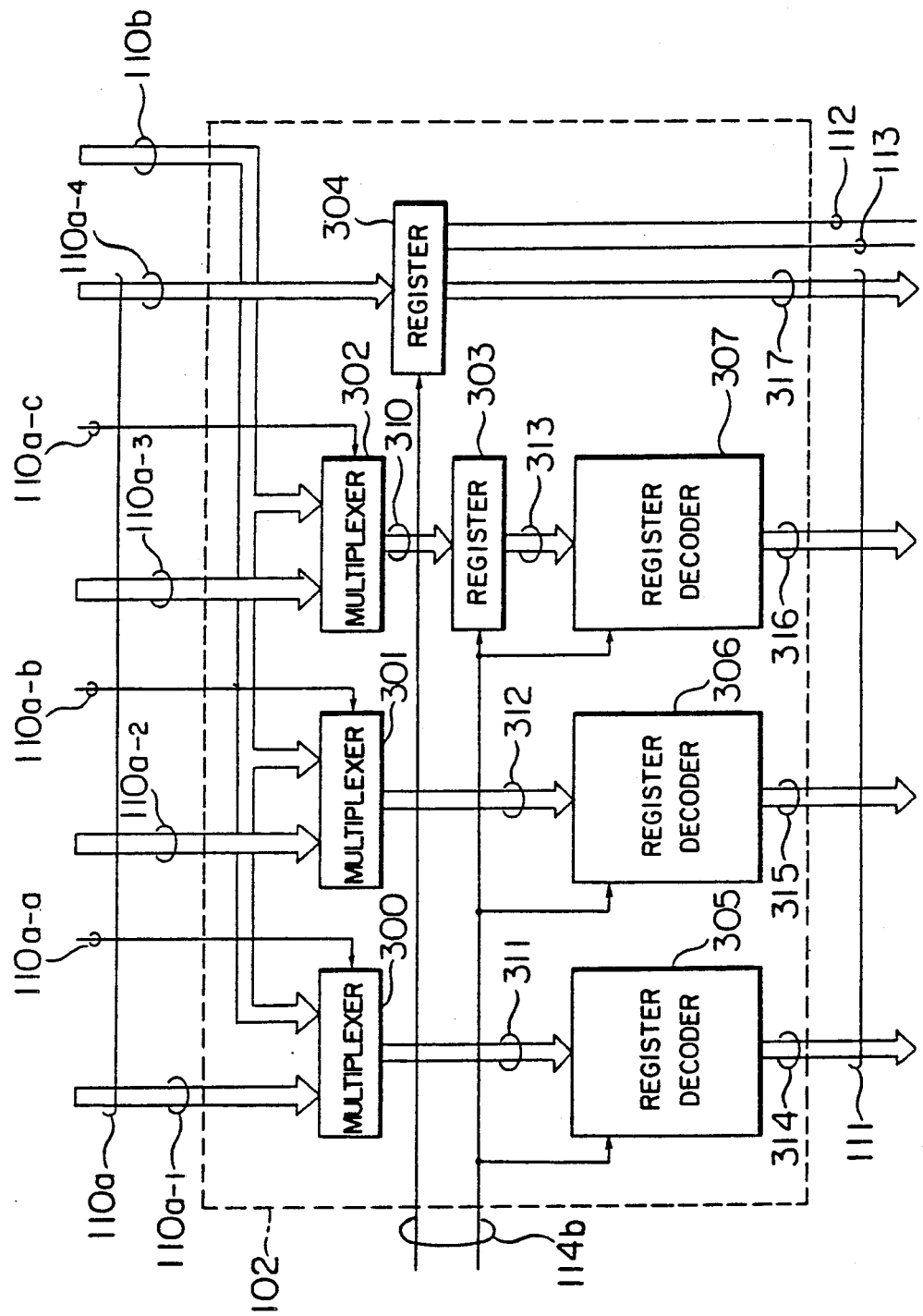
FIG. 3 is a block diagram showing the micro instruction decoder unit 102 of FIG. 1.

FIG. 3 shows an arrangement of the micro instruction decoder unit 102. The unit 102 comprises: multiplexers 300, 301 and 302 each for selecting a source of the register number; a register decoder 305 for selecting one of the registers to be operated; a register decoder 306 for selecting the other register; a register decoder 307 for selecting a register to store the result of arithmetic operation; a submicro instruction register 303 for delaying the operation timing for the register decoder 307 by one clock cycle from the operation timings for the register decoders 305 and 306; and a submicro instruction register 304 for delaying the control timing for an arithmetic circuit (which will be mentioned later) by a half clock cycle from the control timings for the register decoders 305 and 306. The signal line 110a of a part of the micro instruction register 205 in the micro program control unit 101 is divided into: signals 110a-1 and 110a-2 indicative of the register numbers for reading; a signal 110a-3 representative of the register number for writing; control signals 110a-a, 110a-b and 110a-c for controlling the multiplexers 300, 301 and 302; and a signal 110a-4 for controlling the arithmetic operation circuit and the like (which will be explained later). The multiplexers 300, 301 and 302 select either one of the source stored ion the micro instruction register 205 as a source of the register number and the source which is derived from the instruction decoder 201 and has been stored in the register 206 for register number in response to the control signals 110a-a, 110a-b and 110a-c. The registers from which the readout is performed are selected in a manner such that output signals 311 and 312 of the multiplexers 300 and 301 are respectively inputted to the register decoders 305 and 306 and output signals 314 and 315 representing the results of decoding are used for such selection. On the other hand, the register in which the writing is performed is selected in a manner such that an output signal 310 of the multiplexer 302 is once stored in the submicro instruction register 303 and a signal 313 is inputted to the register decoder 307 after the delay time of on clock cycle from the readout from the registers and an output signal 316 indicative of the result of decoding is used for such selection. In this case, as the read registers, it is not always necessary to select two registers. In case of one operand operation (for example, increment/decrement or the like or zero operand operation (clear or the like), there could be also a case where the readout of respective one register is designated or the readout of the register is not designated. In addition, the number of write register is not limited to one. The results of arithmetic operations could be written in a plurality of registers.

The arithmetic operation circuit is controlled for the interval between the foregoing readout and write timings for the registers. A time lag between those operation timings is provided by the submicro instruction register 304. A control signal 317, which was delayed by half clock, is applied to the arithmetic operation circuit.

FIG. 4 is an arrangement diagram of a first embodiment the arithmetic operation unit 103 as a main part of the preferred embodiment of FIG. 1. The arithmetic operation unit 103 comprises: registers 400; precharge & sense circuits 401 and 402 of register read buses 410 and 411; an arithmetic operation circuit 403; a data read register 404 to read the data on the internal bus 109; data write register 405 to output a data onto the internal bus 109; an address register 406 to output an address onto an internal bus 115; and a barrel shifter 407 to shift the data inputted from a write bus 412 as the multibit data.

The fundamental operation of the arithmetic operation unit 103 will now be classified into four kinds and described in detail.

(1) Arithmetic operation between registers

[The case where data is read out from two registers among the registers 400 and is operated on by the arithmetic operation circuit 403 and the result of the operation is rewritten in one register among the registers 400]

Two registers among the registers 400 are selected on the basis of the outputs 314a and 315 of the register decoders 305 and 306, thereby allowing the contents of the registers selected to be supplied onto the register read buses 411 and 410 through two ports 413 and 414, respectively. These data are detected at a high speed by the precharge & sense circuits 402 and 401 which will be explained later and their output signals 415 and 416 are inputted to the arithmetic operation circuit 403. An output signal 417 representing the result of arithmetic operation of the arithmetic operation circuit 403 is supplied onto the write bus 412 and is written through a port 421 into the register among the registers 400 which is designated by the output signal 316a of the register decoder 307.

(2) Updating of the program counter

[Updating (increment) of the program counter in the registers 400 and loading into the address register 406]

The program counter in the registers 400 is selected by the control signal 315 as the output signal of the register decoder 306, thereby allowing the content of the program counter selected to be supplied onto the register read bus 410 through the port 414. The data on the register read bus 410 is detected by the precharge & sense circuit 401 and is inputted as the output signal 416 to the arithmetic operation circuit 403. The data is not supplied to the side of the register read bus 411 and the control signal 317 is set into the increment mode, thereby permitting the output signal 417 indicating the result of arithmetic operation of the arithmetic operation circuit 403 to become [(program counter)+1]. This updated value is written in the program counter from the port 421 in response to the control signal 316a through the write bus 412.

On the other hand, the content of the program counter supplied through the port 414 onto the register read bus 410 is loaded into the address register 406 by a control signal 316d and is transmitted onto the internal bus 115 through a bus 422.

(3) Arithmetic operation of the input data and data output

The data inputted to the data read register 404 from the internal bus 109 is supplied onto the register read bus 411 through the port 418. On one hand, the content of one register among the registers 400 is supplied onto the read bus 410 through the port 414 in response to the control signal 315. The output signal 417 representing the result of arithmetic operation of the arithmetic operation circuit 403 is written through the write bus 412 into one register among the registers 400 or into the data write register 405. In the case where the output signal 417 of the arithmetic operation circuit is written into the data write register 405, its content is transmitted onto the internal bus 109 through a port 419 by the control signal 112. This example relates to the case where the result of arithmetic operation of the content of one register among the registers 400 and the memory data is again stored in the memory.

(4) Barrel shift

The output signal 417 indicative of the result of arithmetic operation of the arithmetic operation circuit 403 is loaded into the barrel shifter 407 through the write bus 412 in response to a control signal 316e. In the next cycle, the result shifted in accordance with a shift amount designated by a control signal 314c is supplied onto the register read bus 411 through a port 420. This situation is substantially similar to the case where the readout is performed from the registers among the registers 400 and the detailed description is omitted here.

The detailed circuit of each component element in the arithmetic operation unit 103 and its operation will then be described hereinbelow with reference to the drawings.

FIG. 5 shows a detailed circuit diagram of the registers 400 and precharge & sense circuits 401 and 402 for the read buses. Each arrangement and operation principle will now be explained.

(1) One-bit arrangement of the registers 400

As described above, the registers 400 are a "multiport RAM (Random Access Memory)" which is connected to, for instance, two read buses and one write bus. When an arrangement of one bit of the registers 400 is shown with regard to the least significant bit, it is constituted by: an NMOS transistor 500 which forms the port 421-0 which is connected to a write bus 412-0; CMOS inverters 501 and 502 which form a one-bit memory; and NMOS transistors 503 to 506 to supply the data onto read buses 410-0 and 411-0. The writing operation into one bit of the foregoing RAM is performed by applying the content on the write bus 412-0 through the NMOS transistor 500 to the CMOS inverters 501 and 502, which form a memory, by setting a control signal 316a-0 at a "high" level. On the other hand, the reading operation is executed by setting control signals 315-0 and 314a-0 at a "High" level and thereby causing the charges on the read buses 410-0 and 411-0 to be discharged respectively only when an output of the CMOS inverter 501 is at a "High" level. If the output of the CMOS inverter 501 is at a "Low" level, the charges on the respective read buses 410-0 and 411-0 are not discharged The reading operations of the registers 400 are executed after the precharging of the read buses 410 and 411.

(2) Precharge & sense circuits 401 and 402 for the read buses 410-0 and 411-0

One bit of the precharge & sense circuit 401 corresponding to the read bus 410-0 is constituted by: an NPN bipolar transistor (hereinafter, simply referred to as an NPN transistor) 512 for precharging the read bus 410-0; CMOS inverters 507, 508 and 509 to control the NPN transistor 512; an NMOS transistor 510; and a PMOS transistor 511. The operation of this circuit can be considered in terms of two intervals such as a precharge interval and a discharge interval.

(i) Precharge interval

A clock signal 520 is at a "Low" level for the precharge interval and the NMOS transistor 510 is kept in the "off" state. When it is now assumed that the read bus 410-0 is at a "Low" level, an output of the CMOS inverter 507 is at a "High" level. On the contrary, an output of the CMOS inverter 509 connected in series to the CMOS inverter 508 is at a "Low" level. Therefore, the output of the CMOS inverter 509 is connected to a gate of the PMOS transistor 511, so that the PMOS transistor 511 is set into the "on" state. In such a situation, a sufficient base current is supplied to a base 521 of the NPN bipolar transistor 512 due to the CMOS inverter 507 and PMOS transistor 511. A collector current of the NPN transistor 512 is supplied onto the read bus 410-0 from an emitter of the NPN transistor 512, thereby allowing the precharge of the read bus 410-0 to be started. As the read bus 410-0, which has been at a "Low" level, approaches a "High" level, the CMOS inverter 507 first approaches a "Low" level, so that the current supply from the inverter 507 to the base of the NPN transistor 512 is suppressed. Next, a final output 416-0 of the CMOS inverters 508 and 509 connected in series approaches a "High" level and the PMOS transistor 511 is also turned off, causing the base current to the NPN transistor 512 to be cut off. Due to the above-mentioned operation, the read bus 410-0 is precharged to a constant voltage for the precharge interval (interval when the clock signal 520 is at a "Low" level). This precharge voltage is determined by a threshold voltage ($V_{TH}$) of the NMOS and PMOS transistors constituting the CMOS inverters 507, 508 and 509, so that even if there is a variation in $V_{TH}$ in the MOS process, the precharge voltage responsive to the variation is determined and the stable precharge operation can be performed. With regard to the precharge & sense circuit 402 also, the read bus 411-0 is likewise precharged. The outputs 416-0 and 415-0 of two precharge & sense circuits 401 and 402 certainly become a "High" level after the precharge.

The precharge & sense circuits 401 and 402 ar arranged symmetrically with respect to a point using the central point of the clock signal line 520 as a center. Consequently, the clock signal line 520 can be commonly used and further the read buses 410 and 411 can be arranged in parallel on both sides of the precharge & sense circuits 401 and 402.

(ii) Discharge

The register read (discharge) cycle from the registers 400 is executed by setting the clock signal 520 at a "High" level. By setting the clock signal 520 at a "High" level, the NMOS transistor 510 connected to the base of the NPN transistor 512 is turned on and the base potential of the NPN transistor 512 is kept at a "Low" level. Thus, this makes it possible to prevent the influence of the current supply from the CMOS inverter 507 and POS transistor 511 in association with a variation in potential of the read bus 410-0. When it is now assumed that the output of the CMOS inverter 501 constituting one bit of the RAM is at a "High" level and the control signal 315-0 is at a "High" level, the NMOS transistors 503 and 505 are set into the "on" state, so that the read bus 410-0 is discharged due to the foregoing two NMOS transistors 503 and 505 connected in series. This discharge causes a slight variation of the read bus 410-0 to be amplified by only an amount as much as the gains of the CMOS inverters 508 and 509 connected in series. This amplified variation is reflected to the read signal 416-0. Therefore, even if a extremely large capacitive load is included in the read bus 410-0, the occurrence of discharge of the order of about 0.1 V causes the read signal 416-0 to be changed from a "High" level to a "Low" level.

FIG. 6 shows operation waveforms of the clock signal 520, base potential 521 of the NPN transistor 512, read bus 410-0, and read signal 416-0 in the foregoing operation. As will be understood from FIG. 6, the read bus 410-0 is precharged by two steps due to the CMOS inverter 507 and PMOS transistor 511 for controlling the NPN transistor 512 and reaches a constant precharge voltage. On the other hand, the read signal 416-0 defines the output due to a very slight discharge of charges of the read bus 410-0 for the discharge interval This effect is derived since the precharge voltage is set at a voltage which is slightly higher than the level of the read signal 416-0 that is set at "Low". As mentioned before, the precharge voltage is determined by the threshold voltage ($V_{TH}$) of the NMOS transistor and PMOS transistor, so that it is not affected by the variation of the MOS process.

FIG. 25 is an explanatory diagram showing the necessity of the sense circuit in the read bus between the register and the arithmetic operation circuit. The subject arrangement comprises: flip-flops 2500-0 to 2500-n which constitute the storage section of one bit of the register of (n+1) words; a read bus 522; NMOS transistors 2501-0 to 2501-n, each of which consists of two transistors and constitutes logical AND for transmission of data onto the read bus 522; and the precharge & sense circuit 401. In such an arrangement, if either one of the read control signals 315 becomes a "High" level, one of the two NMOS transistors connected to that high-level signal is turned on. The other is turned on or off in dependence upon the content of the flip-flop. As a result, the content of the register (flip-flop) corresponding to the read signal which is at a "High" level is reflected to the read bus 522. At this time, the following problem is caused. Namely, a number of registers (flip-flops) are connected to the read bus 522 through the NMOS transistors each consisting of two transistors, so that the wiring capacitance of the bus itself and the drain capacitance of the NMOS transistors are added. Therefore, if a buffer of a high driving capability is added to each flip-flop in order to reflect the content of one flip-flop onto the read bus 522, the register section remarkably increases in size and it is actually impossible to realize such a register section in a high integrated processor. Therefore, in the precharge & sense circuit 401 of the read bus 522 in the embodiment, the read bus 522 is preliminarily precharged and only in the case where the charges of the read bus 522 are drawn out, a very slight potential variation is detected by the sense circuit, thereby enabling high operating speed and high integration to be realized.

On the contrary, the write bus has just opposite meaning. FIG. 26 is a diagram showing the necessity of the buffer having a high driving capability in a write bus 524.

Data is written in one bit of the register of (n+1) words through the write bus 524. In this case, the data of one bit has to be transmitted onto the write bus 524 having a large capacitive load because of a reason similar to that in case of the foregoing read bus 522. That is, the data is written into one register (or a plurality of registers) among many and unspecified registers (flip-flops) through the write bus 524. Therefore, a buffer 960 having a high driving capability is inevitable.

FIG. 7 shows an arrangement of the address register 406. The address register 406 comprises: CMOS inverters 700 and 701 connected to the read bus 410-0; a MOS transistor 710 for writing; CMOS inverters 720 and 721 constituting a memory (flip-flop); and a bus driver 730 connected to the internal bus 115. As mentioned above, the read bus 410-0 is precharged when the clock signal 520 is at a "Low" level and is discharged when the clock signal 520 is at a "High" level. The CMOS inverters 700 and 701 connected in series serve as an amplifying circuit to amplify an extremely slight variation of the read bus 410-0 similarly to the CMOS inverters 508 and 509 in the precharge & sense circuit 401 in FIG. 5. The result of this amplified variation is stored in the flip-flop (constituted by the CMOS inverters 720 and 721) in response to the write signal 316d, which is inputted to a gate of the NMOS transistor 710 An output of the CMOS inverter 720 is supplied onto the internal bus 115 through the bus 422 by the bus driver 730 which is constituted by a composite gate circuit consisting of bipolar transistors and CMOS transistors FIG. 8 shows an internal arrangement of the bus driver 730 which is constituted by a composite gate circuit consisting of bipolar transistors and CMOS transistors. The bus driver 730 comprises: a PMOS transistor 800 at the input stage; an NMOS transistor 801; NPN transistors 804 and 805 at the output stage; and resistive elements 802 and 803 which are inserted between a base and an emitter of each of those NPN transistors. An output signal 810 of the CMOS inverter 720 constituting the flip-flop is inputted to each gate of the PMOS transistor 800 and NMOS transistor 801. The PMOS transistor 800 is turned on when the output signal 810 is at a "Low" level and the NMOS transistor 801 is turned on when it is at a "High" level. Therefore, when the input signal 810 to the bus driver 730 is at a "Low" level, a base current is supplied to the NPN transistor 804 by the PMOS transistor 800 and a collector current flows through the NPN transistor 804, so that an output 422-0 is rapidly charged and becomes a "High" level. On the contrary, when the input signal 810 is at a "High" level, the charges of the output 422-0 are rapidly discharged by the NMOS transistor 805, so that the output 422-0 becomes a "Low" level. The resistive elements 802 and 803 have an effect to apply the bias to the bases of the NPN transistors 804 and 805.

FIG. 9 shows an arrangement of the arithmetic operation circuit 403 in FIG. 4, in which the circuits for as much as four bits from the least significant bit are shown. In this diagram, only an adder in which the largest critical path is caused in the arithmetic operation circuit 403 is shown. The arithmetic circuits such as a subtracter, multiplier, divider, etc. are the applied forms of the adder; therefore, the adder will then be explained hereinbelow as an example. In addition to those arithmetic circuits, a logic operation circuit is also generally included; however, it is omitted here. The least significant bit of the four-bit adder comprises: latches 910 and 911 to temporarily store the contents of the read signals 416-0 and 415-0 of the precharge & sense circuits 401 and 402; a gate 920 to obtain AND of output signals 970 and 971 of those latches; a gate 930 to obtain exclusive OR of an output signal of the gate 920 and the foregoing signals 970 and 971; a four-bit carry propagation circuit 900 to perform the carry [carry in case of the addition (borrow in case of the subtraction; however, both of these types of carry information are defined as a carry hereinafter)] propagation in response to output signals 972-0 and 973-0 of the gates 920 and 930; a gate 940 to obtain exclusive OR of an output signal 974-0 of the least significant bit of the circuit 900 and the output signal 973-0 of the gate 930; a latch 950 to temporarily store an output signal 975 of the gate 940; and the bus driver 960 to supply an output signal 976 of the latch 950 onto the write bus 412-0. In this adder, an output signal 973-0 due to the gates 920 and 930 denotes the result of addition of the two-bit data signals 970 and 971 which are inputted to the adder. The output signal 975 of the gate 940 represents the result of addition of the result of addition of the two-bit inputs to the adder and the carry. On the other hand, the output signal 972-0 of the gate 920 informs to the carry propagation circuit 900 that the carry to a higher significant bit certainly occurs in the case where two bits of the inputs to the adder are at logic levels "1" and "1". The output signal 973-0 of the gate 930 informs the carry propagation circuit 900 that the carry from the lower significant bit should be propagated to the higher significant bit in the case where two bits of the inputs to the adder are at logic levels "1" and "0", or "0" and "1". In FIG. 9, a clock signal 1044 is supplied to the carry propagation circuit 900, latch 950 and inverter 980. An output signal 990 of the inverter 980 is supplied to the latches 910 and 911. A reason why the clock signals which are applied to the latches 910, 911 and 950 have the opposite phases is because the data is temporarily stored in the latches 910 and 911 for the former half interval of one clock cycle and the result of addition is temporarily stored in the latch 950 for the latter half interval.

As will be mentioned later, the clock signal 1044 is applied to the four-bit carry propagation circuit 900 in order to perform the dynamic operation in the carry propagation. Other kinds of input signals 1040 and output signals 1042 to and from the carry propagation circuit 900 are a carry input signal from the lower significant bit and a carry output signal to the higher significant bit, respectively. Still other input signals to the carry propagation circuit 900 include AND output signals 972-0 to 972-3 and exclusive OR output signals 973-0 to 973-3 in the respective bits. Further, other output signals from the carry propagation circuit 900 include carry signals 974-0 to 974-3 in the respective bits. Use methods of those input and output signals will then be described in detail hereinbelow.

FIG. 10 shows an arrangement of the carry propagation circuit 900 of four bits (N=4) in which bipolar transistors and MOS transistors mixedly exist. The carry propagation circuit 900 is divided into k four-bit block carry look ahead circuits 901 which propagate only the carry among the four bits and four-bit carry propagation circuits 902 which propagate the carry in the four bits. The k four-bit block carry look ahead circuits 901 comprise: an NMOS transistor 1004 which is made operative in response to the carry input signal 1040 from the lower significant bit; NMOS transistors 1005 to 1008 which ar made operative in response to the AND output signals 972-0 to 972-3 in the respective bits; NMOS transistors 1000 to 1003 which are made operative in response to the exclusive OR output signals 973-0 to 973-3 in the respective bits; an NPN transistor 1011, provided in the connecting portion, for detecting the carry propagation from the lower significant bit and propagating the carry propagation to the next stage; a PMOS transistor 1009 to supply a base current to the NPN transistor 1011; and a PMOS transistor 1010 to pull up the collector side of the NPN bipolar transistor 1011 to the power source. The operation of the four-bit block carry look ahead circuit 901 will be explained hereinbelow.

The AND output signals 972-0 to 972-3 and exclusive OR output signals 973-0 to 973-3 of two bits of the inputs corresponding to the respective bits can simultaneously become a logic level "0" with each other; however, they do not simultaneously become a logic level "1". Next, three kinds of examples of the operation corresponding to the patterns of the four-bit input data of two sets of the circuit 901 will be shown.

It is assumed that the circuit 901 operates under the condition such that a gate input signal 1043 to the PMOS transistors 1009 and 1010 is grounded and they are in the "on" state.

(1) Input data "0000" and "0000"

In either case where the carry input signal 1040 from the lower significant bit is "0" or "1", all of the signals 972-0 to 972-3 and 973-0 to 973-3 become "0" and all of the NMOS transistors 1000 to 1008 are turned off. Thus, the PMOS transistor 1009 continuously supplies a current to a base of the NPN bipolar transistor 1011, so that the NPN transistor 1011 is turned on. Therefore, even if the PMOS transistor 1010 for pull-up is in the "on" state, the collector potential of the NPN transistor 1011 becomes "0" and the carry output signal 1042 becomes "0". This example shows the case where no carry is propagated.

(2) Input data "0000", and "1111"

Since all signals 973-0 to 973-3 become "1" and all signals 972-0 to 972-3 become "0", in the case where the carry input signal 1040 from the lower significant bit is "0", the propagation of the carry is not performed. However, when the carry input signal 1040 is "1", the carry is propagated. When the carry input signal 1040 from the lower significant bit is now "0", the NMOS transistors 1004 to 1008 are turned off. On the other hand, the NMOS transistors 1000 to 1003 are turned off, but the current which is supplied to the base of the NPN bipolar transistor 1011 due to the PMOS transistor 1009 does not flow except that it flows through the NPN bipolar transistor 1011 (the capacitive loads of sources and drains of the NMOS transistors 1000 to 1003 are transiently charged), so that the NPN bipolar transistor 1011 is kept in the "on" state. Consequently, the carry output signal 1042 becomes "0".

On the other hand, when the carry input signal 1040 is "1", all NMOS transistors 1000 to 1004 are turned on, so that the current which is supplied through the PMOS transistor 1009 is drawn out to the side of the earth potential GND through the NMOS transistors 1000 to 1004 connected in series, thereby allowing the supply of the current into the base of the NPN transistor 1011 to be suppressed. Therefore, the NPN transistor 1011 is turned off and the carry output signal 1042 is charged to "1" by the PMOS transistor 1010 for pull-up. Namely, the carry is propagated to the next stage.

(3) Input data "0011" and "1100"

In this case, the signals 973-0, 973-2 and 973-3 become "1", the signal 972-1 becomes "1" and the other signals become "0", so that only the NMOS transistors 1000, 1006, 1002, and 1003 are turned on and the other transistors are turned off. Even if the carry input signal 1040 is "0" or "1" under such a situation, the current which is supplied by the PMOS transistor 1009 is drawn out by the NMOS transistors 1003, 1002 and 1006, which are equivalent to the arrangement whereby those NMOS transistors are connected in series toward the ground side. Therefore, this results in the function such that the current supply to the base of the NPN transistor 1011 is suppressed. Consequently, the NPN bipolar transistor 1011 is turned off and the carry output signal 1042 becomes "1", thereby allowing the carry to be propagated to the next stage.

In the foregoing description, the state whereby the carry input signal 1040 from the lower significant bit is "1" and all NMOS transistors 1000 to 1003 are in the "on" state corresponds to the most critical path 1 in the carry propagation. Subsequently, the current which is supplied from the PMOS transistor 1009 can be easily drawn out in accordance with the sequence of a path 2 of the NMOS transistors 1003, 1002, 1001, and 1005, a path 3 of the NMOS transistors 1003, 1002 and 1006, a path 4 of the NMOS transistors 1003 and 1007, and a path 5 of the NMOS transistor 1008.

Therefore, in the case where the NMOS transistors 1000 to 1004 are constituted such that each gate length is L and each gate width is W, the path 1 corresponds to the single NMOS transistor of a gate width of W/5, so that the gate widths of the respective NMOS transistors 1005 to 1008 in the paths 2 to 5 can be set to W/2, W/3, W/4, and W/5, respectively, thereby enabling the inter-four-bit carry propagation circuit 901 to be constituted as a compact circuit. The same can be also applied to the four-bit carry propagation circuit 902 which will be explained later.

It has been shown an example whereby the gate input signal 1043 to the PMOS transistors 1009 and 1010 in the foregoing four-bit block carry look ahead circuit 901 is grounded and the PMOS transistors 1009 and 1010 are always set into the "on" state. However, substantially the similar carry propagation speed is obtained even if the signal 1043 is set such that the PMOS transistors 1009 and 1010 are turned on only at the time of the arithmetic operation which requires the carry propagation in order to make the electric power consumption low.

According to the method of this circuit, there is provided the complete current operation in which the "on" and "off" states of the NPN transistor 1011 are controlled by drawing out the current which is supplied into the base of the NPN transistor 1011 along the foregoing five kinds of paths of the NMOS transistors 1000 to 1008, so that the voltage operation of a very small amplitude is provided and a high operating speed is obtained. That is, it is possible to derive the circuit method whereby the current amplification property of the bipolar transistor and the switching characteristic of the MOS transistor are efficiently utilized.

On the other hand, the foregoing four-bit block carry look ahead circuit 901 uses the almost complete current operation, so that the amplitudes of the potentials at the sources and drains of the NMOS transistors 1000 to 1003 are small. Therefore, it is difficult to fetch the carry signal corresponding to each bit among four bits at the MOS logic levels. Therefore, it is desirable to also use the foregoing four-bit carry propagation circuit 902. The embodiment of the four-bit carry propagation circuit 902 is constituted by the precharge method and comprises: PMOS transistors 1020 to 1023 for precharge; NMOS transistors 1031 to 1034 to inhibit the logic operation during precharge; NMOS transistors 1024 to 1026 for propagation of the carry; an NMOS transistor 1027 for input of the carry; and NMOS transistors 1028 to 1030 which receive the AND signals 972-0 to 972-2. The operation of the four-bit carry propagation circuit 902 is as follows.

(1) Precharge

For the interval when the clock signal 1044 is at a "Low" level, the PMOS transistors 1020 to 1023 for precharge are turned on, thereby charging the capacitive loads of sources and drains of the NMOS transistors 1024 to 1026 to a power source voltage $V_{cc}$. At this time, the NMOS transistors 1031 to 1034 serve to obstruct the drawing out of the charges by the clock signal 1044 (at a "Low" level) in order to complete the precharge irrespective of the states ("0" or "1") of the AND signals 972-0 to 972-2.

(2) Discharge

For the interval when the clock signal 1044 is at a "High" level, the PMOS transistors 1020 to 1023 for precharge are turned off and the NMOS transistors 1031 to 1034 are turned on. In this state, the "on" or "off" state of the NMOS transistors 1024 to 1030 is determined in dependence upon the input data to the adder and the potentials at the sources and drains of the NMOS transistors 1024 to 1026 are determined. A combination of two sets of four-bit input data to the adder will now be explained with respect to the three kinds of examples used in the foregoing four-bit block carry look ahead circuit.

(1) Input data "000" and "0000"

In this case, in either case where the carry input signal 1040 from the lower significant bit is "0" or "1", all of the signals 973-0 to 973-2 and 972-0 to 972-2 become "0" and the potentials at the sources and drains of the NMOS transistors 1024 to 1026 for propagation of the carry are held at the precharge voltages and no charge is drawn out. Consequently, all carry signals 974-0 to 974-3 among the four bits are "1" (negative logic) and this means that the propagation of the carry is not performed.

(2) Input data "0000" and "1111"

In this case, all AND signals 972-0 to 972-2 become "0" and all exclusive OR signals 973-0 to 973-2 become "1". Therefore, the NMOS transistors 1024 to 1026 for propagation of the carry are turned on and the NMOS transistors 1028 to 1030 are turned off. At this time, if the carry input signal from the lower significant bit is "0", the carry propagation does not occur and the potentials at the sources and drains of the NMOS transistors 1024 to 1026 for propagation of the carry are maintained at the precharge voltages. Thus, the carry signals 974-0 to 974-3 among the four bits are held at "1" (negative logic) and this means that the propagation of the carry is not performed.

On the other hand, when the carry input signal 1040 from the lower significant bit is "1", the NMOS transistors 1026, 1025 and 1024 for propagation of the carry, the NMOS transistor 1027 for input of the carry, and further the NMOS transistor 1031 ar connected in series and at the same time they are in the "on" state, so that the charges at the sources and drains of the NMOS transistors 1024 to 1026 are drawn out to the side of the earth potential GND. therefore, each potential becomes "0" (negative logic) and this denotes that the carry signals 974-0 to 974-3 among the four bits have the carries.

(3) Input data "0011" and "1110"

At this time, the NMOS transistors 1024 and 1026 for the carry propagation and the NMOS transistor 1029 are turned on. When the carry input signal 1040 from the lower significant bit is "0" in this state, the charges are drawn out along the path of the NMOS transistors 1026 and 1029 and the carry signals 974-2 and 974-3 among the four bits become "0" (negative logic) and this represents that they have the carries. The other carry signals 974-0 and 974-1 become "1" (negative logic) and this means that they have no carry.

On the contrary, when the carry input signal 1040 from the lower significant bit is "1", the NMOS transistor 1027 is also turned on, so that the charges are drawn out along both of the path of the NMOS transistors 1024 and 1027 and the path of the NMOS transistors 1024 and 1029. In this case, the drawing-out of the charges is carried out with respect to all of the sources and drains of the NMOS transistors 1024 to 1026, so that all carry signals 974-0 to 974-3 among the four bits become "0" (negative logic) and this means that they have the carries.

A reason why there is no need to draw out the charges with regard to the highest significant bit in the four-bit carry propagation circuit 902 is because the foregoing four-bit block carry look ahead circuit 901 performs the drawing-out of the charges.

FIG. 11 shows operation waveforms of the abovementioned four-bit block carry look ahead circuit 901. When the carry input signal 1040 is at a "Low" level, the base current is supplied from the PMOS transistor 1009 to a base electrode 1041 of the NPN transistor 1011, so that the NPN transistor 1011 is turned on and the collector potential becomes "0" and the carry output signal line 1042 becomes "Low". When the carry input signal 1040 becomes "High", the base current which is applied by the PMOS transistor 1009 is suppressed, so that the NPN transistor 1011 is turned off and the carry output signal line 1042 becomes a "High" level.

FIG. 27 shows an embodiment in which a 32-bit adder is constituted by connecting eight (k=8) adders 1100-0 to 1100-7 of four bits (N=4). Carry propagation circuits 900-0 to 900-7 in the respective adders 1100-0 to 1100-7 are connected in series, respectively. A carry input 1040 from the least significant bit is sequentially propagated from the carry propagation circuit 900-0 to the circuit 900-7. In the embodiment, 32 bits are constituted by connecting eight sets of the carry propagation circuits each consisting of four bits in series; however, those 32 bits may be constituted by connecting the carry propagation circuits in series on an arbitrary bit unit basis.

FIG. 12 shows the states of the carry output signals 1042-0 to 1042-7 of the carry propagation circuits 900-0 to 900-7 in the respective bits in the arrangement of FIG. 27. As shown in the diagram, the carries are sequentially propagated for every four bits to the higher significant bits.

FIG. 13 is a diagram showing only the four-bit block carry look ahead circuit 901 shown in FIG. 10. As already described with respect to the operation principle of this circuit, a current is preliminarily supplied to the base of the NPN transistor 1011 to turn on the NPN transistor 1011 and only when the carry is propagated to the higher significant bit, the current which is supplied from the PMOS transistor 1009 is drawn out due to the combination of the NMOS transistors 1000 to 1008, thereby suppressing the base current.

FIG. 14 is a circuit diagram showing an embodiment of the four-bit block carry look ahead circuit 901 on the basis of the concept opposite to that in the circuit of FIG. 13. In FIG. 14, an NPN transistor 1411 is preliminarily turned off by an NMOS transistor 1409 and only when the carry is propagated to the higher significant bit in combination of PMOS transistors 1400 to 1408, a base current is supplied to the NPN bipolar transistor 1411. The circuit of FIG. 13 is the positive logic, while the circuit of FIG. 14 is the negative logic.

In any of the circuit methods of FIGS. 13 and 14 mentioned above, their principles are similar and are the carry propagating method whereby the logic of the carry propagation and switching characteristics due to the MOS transistors are utilized and the current amplification characteristics due to the bipolar transistors are used. That is, this circuit method utilizes the small amplitude operation of the base potential of the bipolar transistor, in other words, $g_m$ of the bipolar transistor.

Figure 15:
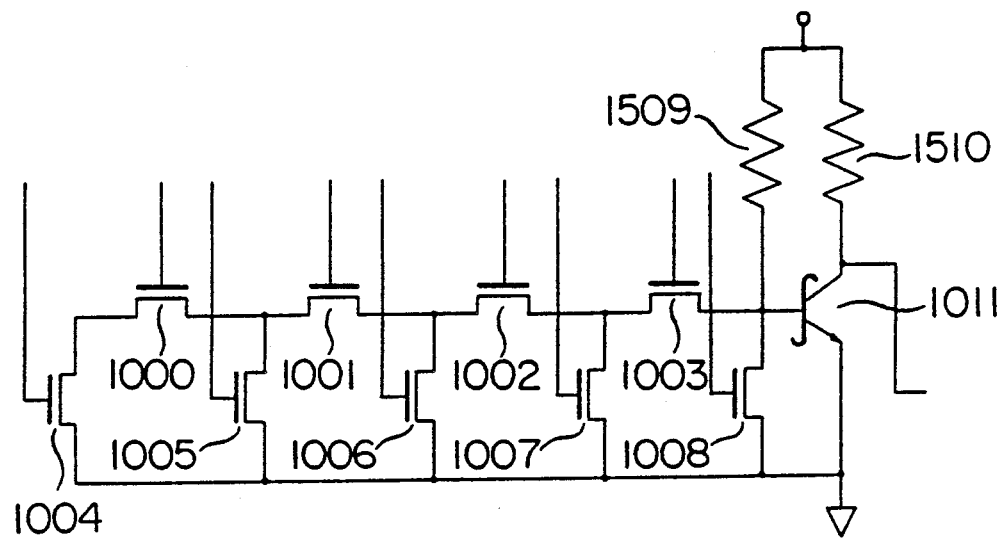

FIG. 15 is a diagram showing an embodiment of a circuit in which the PMOS transistors 1009 and 1010 in the four-bit block carry look ahead circuit 901 of FIG. 13 are replaced by resistive elements 1509 and 1510. In this embodiment, it is possible to obtain substantially the same carry propagation speed as that in the circuit of FIG. 13. However, in case of FIG. 13, the PMOS transistors 1009 and 1010 can be set into the "off" state in the case where there is no need to allow the carry propagation circuit 901 to operate; therefore, the circuit of FIG. 13 is superior in terms of the electric power consumption.

FIG. 16 is a circuit diagram in a modified form in which a PMOS transistor 1410 and the NMOS transistor 1409 in the four-bit block carry look ahead circuit 901 of FIG. 14 are replaced by resistive elements 1610 and 1609, respectively. In this case as well, the carry propagation speed similar to that in the circuit of FIG. 14 is derived; however, the circuit of FIG. 16 is inferior in terms of the electric power consumption because of the same reason as that explained in FIG. 15. However, there is an advantage such that the static operation can be perforemd due to the resistive element 1609. Practically speaking, the base potential of the NPN transistor 1411 has to be dynamically made low by the NMOS transistor 1409 in FIG. 14; on the contrary, however, such a dynamic operation is unnecessary in FIG. 16.

FIGS. 17(a) to 17(d) show modified forms of the NPN transistor 1011 and its connecting elements in FIG. 15. FIG. 17(a) is the same as that in FIG. 15, in which the NPN transistor 1011 is provided with a Schottky barrier diode. A reason of this arrangement is to avoid the "saturation phenomenon" which is caused due to an increase in base potential of the bipolar transistor 1011 over the collector potential. FIGS. 17(b), (c) and (d) show examples whereby the foregoing "saturation phenomenon" is avoided by adding diodes 1700 to 1702 to an ordinary NPN transistor 1711. A diode 1703 in FIG. 17(d) is added to reduce the collector potential of the NPN bipolar transistor 1711 and to transmit it to the next stage.

FIGS. 18(a) and 18(b) show modified forms of the connecting elements of the NPN transistor 1411 in FIG. 16. FIG. 18(a) is the same as that in FIG. 16, in which the NPN transistor is provided with a Schottky barrier diode and serves to avoid the "saturation phenomenon" of the bipolar transistor similarly to the case of FIGS. 17(a) to 17(d). FIG. 18(b) shows a circuit arrangement whereby diodes 1800 and 1801 are added to an ordinary NPN transistor 1811, thereby preventing that the NPN transistor 1811 is saturated due to a similar reason.

FIG. 34 is a diagram showing another embodiment of the four-bit block carry look ahead circuit 901. In the diagram, reference numerals 1000 to 1003 denote the NMOS transistors. The drain of the NMOS transistor 1000 is commonly connected to the source of the NMOS transistor 1001 at a node $N_1$. The drain of the NMOS transistor 1001 is commonly connected to the source of the NMOS transistor 1002 at a node $N_2$. The drain of the NMOS transistor 1002 is commonly connected to the source of the NMOS transistor 1003 at a node $N_3$. The source of the NMOS transistor 1000 is commonly connected to the drain of the NMOS transistor 1004 at a node $N_0$. The drain of the NMOS transistor 1003 is connected to a base of an NPN transistor 1712 at a node $N_4$. Each gate of the NMOS transistors 1000 to 1003 is connected to an exclusive OR output of corresponding one set of input signals A and B.

A series connection of the NMOS transistor 1004 and an NMOS transistor 1732 is provided between the node $N_0$ and the earth potential GND. A series connection of the NMOS transistor 1005 and an NMOS transistor 1733 is provided between the node $N_1$ and the earth potential GND. A series connection of the NMOS transistor 1006 and an NMOS transistor 1734 is provided between the node $N_2$ and the earth potential GND. A series connection of the NMOS transistor 1007 and an NMOS transistor 1735 is provided between the node $N_3$ and the earth potential GND. A series connection of the NMOS transistor 1008 and an NMOS transistor 1736 is provided between the node $N_4$ and the earth potential GND. The carry input signal 1040 is connected to a gate of the NMOS transistor 1004. The AND output of the corresponding one set of input signals A and B is connected to each gate of the NMOS transistors 1005 to 1008. A clock signal $\phi_1$ is commonly connected to each gate of the NMOS transistors 1732 to 1736. A collector of the NPN transistor 1712 is connected to one end of a resistor 1740 and its base is connected to the node $N_4$ and its emitter is connected to the earth potential GND. The other end of the resistor 1740 is commonly connected to each drain of NMOS transistors 1730 and 1731 and of a PMOS transistor 1720. Souces of the NMOS transistors 1730 and 1731 are connected to the base of the NPN transistor 1712. A gate of the NMOS transistor 1730 is connected to a clock $\overline{\phi}_1$ and a gate of the NMOS transistor 1731 is connected to the power source potential $V_{cc}$.

A source of the PMOS transistor 1720 is connected to the power source potential $V_{cc}$. A gate of the PMOS transistor 1720 is connected to a mode signal $\overline{M_0}$. In such an arrangement, the four-bit carry output signal 1042 is fetched from the collector of the NPN transistor 1712. The operation of this circuit will then be explained with respect to two typical cases.

(1) $\phi_1 = 1$, $\overline{\phi}_1 = 0$, $A_0$ to $A_3 = 0000$, $B_0$ to $B_3 = 0000$ In this case, all of the NMOS transistors 1000 to 1003 and NMOS transistors 1005 to 1008 are in the "off" state. Therefore, at this time, the current path from the node $N_4$ to the earth potential GND does not exist irrespective of the input carry signal 1040. Thus, the base current flows from the power source potential $V_{cc}$ to the NPN transistor 1712 through the PMOS transistor 1720 and NMOS transistor 1731 and the NPN transistor 1712 is turned on. Therefore, at this time, the carry output signal 1042 is "0".

(2) $\phi_1 = 1$, $\overline{\phi}_1 = 0$, $A_0$ to $A_3 = 1111$, $B_0$ to $B_3 = 0000$ In this case, all NMOS transistors 1000 to 1003 are in the "on" state and all NMOS transistors 1005 to 1008 are in the "off" state. If the carry input signal 1040 is "0" in this state, the current path from the node $N_4$ to the earth potential GND does not exist similarly to the foregoing case; therefore, the NPN transistor 1712 is in the "on" state and the carry output signal 1042 is "0". On the other hand, when the carry input signal 1040 is "1", the current path from the nodes $N_4$, $N_3$, $N_2$, and $N_0$ to the earth potential GND is formed, so that the base current to the NPN transistor 1712 is bypassed to the earth potential GND and the NPN transistor 1712 is turned off. Thus, a load (not shown) is charged through the PMOS transistor 1720 and resistor 1740 and the carry output signal 1042 becomes "1".

The NMOS transistor 1730 is the additional means for increasing the base current to the NPN transistor 1712 when the clock signal $\overline{\phi}_1$ is "1" and thereby quickening the turning-on. The resistor 1740 is the level shift means for matching the level of the carry output signal 1042. The gate of the PMOS transistor 1720 is connected to the mode signal $\overline{Mo}$ and in the ordinary operation, the mode signal $\overline{Mo}$ is at a "0" level and the PMOS transistor 1720 is in the "on" state; however, in the non-operative state, the mode signal $\overline{Mo}$ is at a "1" level and the PMOS transistor 1720 is in the "off" state, thereby cutting off the electric power to the overall circuit.

It should be noted that the voltages at the nodes $N_0$ to $N_4$ through which the carry signal is propagated in the operation processes in the foregoing descriptions of (1) and (2) are suppressed to the junction voltage (about 0.9 V) between base-emitter of the NPN transitor 1712 and the circuit operates with a low amplitude. Therefore, the charge/discharge times of the stray capacitance existing in the propagation path of the carry become short, thereby enabling the high speed carry propagation to be accomplished. In addition, as the level recovery means, a bipolar transistor having a transfer conductance $g_m$ larger than that of a MOS transistor is combined; consequently, the low-amplitude signal at the node $N_4$ can be effectively taken out as a logic level signal of a large amplitude.

As the result of that the present embodiment was implemented using a MOS transistor of a channel length of 2.0 μm and an NPN transistor in which an emitter size is $2 \times 5$ μm$^2$ and $f_T$ is 3.0 GHz, the carry propagation speed of about 6 nsec could be obtained in case of 32 bits and the high speed operation which is three or more times that in a conventional circuit could be confirmed.

FIG. 19 is a circuit diagram showing a detailed circuit arrangement of the data read register 404 and data write register 405 shown in FIG. 4.

The data read register 404 loads the data into a memory (flip-flop) which is constituted by CMOS inverters 1902 and 1903 by way of an NMOS transistor 1904 through data lines 423-0 to 423-3, . . . from the internal bus 109. In a similar manner as in the case of the foregoing registers 400, the data is read out onto the read bus 411-0 by means of NMOS transistors 1900 and 1901 together with the precharge & sense circuit 402.

On the other hand, the data write register 405 temporarily stores the data supplied onto write buses 412-0 to 412-3, . . . into a memory (flip-flop) which is constituted by CMOS inverters 1906 and 1907 through an NMOS transistor 1905. The content stored in this memory is transmitted onto the internal bus 109 through a bus 419-0 by way of a three-state buffer 1908. The three-state buffer 1908 to transmit the content of the data write register 405 onto the internal bus 109 has to be set into a high impedance state when the data is inputted from the internal bus 109 into the data read register 404. An arrangement of the three-state buffer 1908 will then be explained with reference to the drawing.

FIG. 20 is a circuit diagram showing the three-state buffer circuit 1908 as one embodiment of a three-state circuit.

A reference numeral 2010 denotes an input terminal; 2011 is an output terminal; 2020 and 2021 are first and second control terminals to which mutually complementally signals are inputted $V_{cc}$ the power source potential terminal; GND the earth potential terminal; 2006 a first NPN bipolar transistor in which an N-type collector is connected to the power source potential terminal $V_{cc}$ and an N-type emitter is connected to the output terminal 2011; and 2008 a second NPN bipolar transistor in which an N-type collector is connected to the output terminal 2011 and an N-type emitter is connected to the earth potential terminal GND. Numerals 2000 and 2001 indicate first and second PMOS transistors whose sources and drains are connected in series to the power source potential terminal $V_{cc}$ and a base of the first bipolar transistor 2006. A gate of the first PMOS transistor 2000 is connected to the first control terminal 2020, while a gate of the second PMOS transistor 2001 is connected to the input terminal 2010, respectively. Numerals 2003 and 2004 are first and second NMOS transistors whose drains and sources are connected in series to the output terminal 2011 and a base of the second NPN bipolar transistor 2008. A gate of the first NMOS transistor 2003 is connected to the input terminal 2010, while a gate of the second NMOS transistor 2004 is connected to the second control terminal 2021, respectively.

A numeral 2007 denotes a third NMOS transistor in which a source and a drain are connected to the base of the first NPN bipolar transistor 2006 and the output terminal 2011 and a gate is connected to the first control terminal 2020. A numeral 2009 is a fourth NMOS transistor in which a source and a drain are connected to the base of the second NPN bipolar transistor 2008 and the earth potential terminal GND and a gate is connected to the first control terminal 2020.

A numeral 2002 is a resistor serving as a first resistive element which is provided between the base of the first NPN bipolar transistor 2006 and the output terminal 2011; and 2005 is a resistor serving as a second resistive element which is provided between the base of the second NPN bipolar transistor 2008 and the earth potential terminal GND.

(1) Operation as an ordinary buffer

By respectively setting the control signals which are applied to the control terminals 2020 and 2021 to "0" and "1", the PMOS transistor 2000 and NMOS transistor 2004 are turned on and the NMOS transistors 2007 and 2009 are turned off. In this case, this circuit is equivalent to the bus driver in FIG. 8 and an output signal having the inverted level of that at the input terminal 2010 is derived at the output terminal 2011. This output signal is driven by the NPN bipolar transistors 2006 and 2008, so that it is possible to strongly charge or discharge the bus having a heavy capacitive load.

(2) High impedance operation

By respectively setting the control signals which are applied to the control terminals 2020 and 2021 to "1" and "0", the PMOS transistor 2000 and NMOS transistor 2004 are turned off and the NMOS transistors 2007 and 2009 are turned on. Thus, the potential between the base-emitter of the NPN bipolar transistors 2006 and 2008 becomes "0", so that the two NPN bipolar transistors 2006 and 2008 are turned off. Therefore, the charge from the first NPN bipolar transistor 2006 or the discharge by the second NPN bipolar transistor 2008 does not occur and the output signal 2011 becomes a high impedance state.

FIG. 21 is an arrangement diagram of the barrel shifter 407 in the arithmetic operation unit 103 in FIG. 4. In this embodiment, the barrel shift function in the direction of the higher significant bit of the three bits is shown as an example. One bit comprises: an NMOS transistor 2100 for writing; a memory (flip-flop) which is constituted by CMOS inverters 2110 and 2120; NMOS transistors 2140, 2150, 2160, and 2170 each for performing the barrel shift; and an NMOS transistor 2130 for reading out the content of the foregoing flip-flop and determining whether it is supplied onto the bus 411-0 or not. When the control signal 316e is "1", the data on the write bus 417-0 passes through the NMOS transistor 2100 and is temporarily stored in the flip-flop. In the case where an output of that flip-flop, namely, an output signal of the CMOS inverter 2110 is "0", the NMOS transistor 2130 is in the "off" state. Therefore, even if a path of either of NMOS transistors 2140, 2151, 2162, and 2173 connected by a wiring 2180 is selected for the drain of the NMOS transistor 2130 in response to control signals 314c-0 to 314c-3, the drawing-out of the charges from any of read buses 411-0 to 411-3 does not occur. On the contrary, in the case where the output of the foregoing flip-flop, namely, the output signal of the CMOS inverter 2110 is "1", the following five kinds of operations are executed under controls by the control signals 314c-0 to 314c-3.

(1) In the case where all control signals 314c-0 to 314c-3 are "0":
The output of the flip-flop corresponding to each bit, that is, the outputs of the CMOS inverters 2110 to 2113 are not supplied onto the read buses 411-0 to 411-3.

(2) In the case where only the control signal 314c-0 is "1":
NMOS transistors 2140 to 2143 are turned on, so that the charges on the read buses 411-0 to 411-3 are drawn out through the respective paths of the NMOS transistors 2140, 2130; 2141, 2131; 2142, 2132; and 2143, 2133. That is, in this case, the barrel shift is not performed.

(3) In the case where only the control signal 314c-1 is "1":
NMOS transistors 2150 to 2153 are turned on, so that the charges on the read buses 411-1 to 411-3 are drawn out through the respective paths of the NMOS transistors 2151, 2130; 2152, 2131; and 2153, 2132. Namely, in this case, the shift is carried out to the higher significant bit by one bit.

(4) In the case where only the control signal 314c-2 is "1":
NMOS transistors 2160 to 2163 are turned on, so that the charges on the read buses 411-2 and 411-3 are drawn out through the respective paths of the NMOS transistors 2162, 2130; and 2163, 2131. Namely, in this case, the shift is performed to the higher significant bit by two bits.

(5) In the case where only the control signal 314c-3 is "1":
NMOS transistors 2170 to 2173 are turned on, so that the charges on the read bus 411-3 are drawn out through the path of the NMOS transistors 2173 and 2130. That is, in this case, the shift is performed to the higher significant bit by three bits.

In the circuit arrangement to realize the barrel shift function shown in the above, for example, the NMOS transistors 2140, 2151, 2162, and 2173 are connected to the wiring 2180; thus, the total amount of the capacitance of the wiring 2180 and drain capacitance of each NMOS transistor becomes large. However, by making a ratio of L/W of the NMOS transistor 2130 large, a decrease in speed of the drawing-out of the charges is prevented. On one hand, since the NMOS transistor 2130 is gate-controlled by the output of the flip-flop, i.e., by the output of the CMOS inverter 2110, in the case where this output is "1", the charges which are added to the wiring 2180 are preliminarily discharged prior to executing the barrel shift. On the other hand, each source of the NMOS transistors 2140, 2150, 2160, and 2170 is connected to the read bus 411-0; however, amounts of these capacitances are extremely small as compared with the capacitance which is produced in the overall read bus 411-0.

The shift data is read out at a high speed by the precharge & sense circuit 402 described in detail in FIG. 5 due to the drawing-out of the charges of the read buses 411-0 to 411-3 at the time of the barrel shift. This readout speed is almost similar to the readout speed in the foregoing registers 400.

FIG. 22 is a diagram showing another applied form of the carry propagation circuit in the embodiment shown in FIG. 10. This diagram relates to an example of application to a higher speed arithmetic operation circuit. Two sets of eitht carry propagation circuits 900 shown in FIG. 10 are arranged. Practically speaking, carry propagation circuits 2200 to 2207 and 2210 to 2217 are arranged as shown in FIG. 22. A set of carry propagation circuits 2200 to 2207 are connected in series on every two-block unit basis from the lower significant bit. An input carry signal to each block (signal 2240 in the least significant block) is grounded. A set of carry propagation circuits 2210 to 2217 are also connected in series on every two-block unit basis from the lower significant bit. An input carry signal to each block (signal 2250 in the least significant bit) is fixed at the level on the power source side. The above-mentioned meanings represent that the former relates to the case where no carry is propagated from the lower significant bit and the latter is concerned with the case where the carry is propagated from the lower significant bit. That is, the carry propagations in the cases where the carry is propagated from the lower significant bit and where the carry is not propagated from the lower significant bit are processed in parallel. Carry output signals 2242 and 2252 processed in parallel in the respective blocks of the carry propagation circuits 2200 to 2201 and 2210 to 2211 are inputted to a carry generator 2230. On one hand, a carry signal pair 2270 and 2280 from the lower significant bit is also inputted to the carry generator 2230, thereby allowing a carry signal pair 2271 and 2281 to be generated to the next stage. In addition, a carry output pair 9740 and 9741 and the carry signal pair 2270 and 2280 from the lower significant bit in the four bits are added by a half adder 2220.

As described above, in the applied form of FIG. 22, the critical path upon execution of the addition of 32 bits is determined by the carry propagation time in the eight-bit block of the carry propagation circuits 2200 and 2201, or 2210 and 2211, the carry propagation time of carry generators 2230, 2231 and 2232, and the addition time of half adder 2226 or 2227. Even in this applied form also, the bit unit of the carry propagation circuits 2200 to 2207 and 2210 to 2217 is not fixed to four bits as mentioned above, they may be connected in series on an arbitrary bit-length unit basis. On one hand, the block consisting of the carry propagation circuits 2200 and 2201, or 2210 and 2211 is not necessarily fixed to eight bits as well.

Further, the carry input signal to each of the carry propagation circuits 2200, 2202, 2204, 2206, and 2210, 2212, 2214, 2216 in the applied form is fixed to "0" or "1"; therefore, these propagation circuits are optimized and a part of MOS transistors can be omitted, thereby making it possible to accomplish the reduction in size and the high operating speed.

Figure 23A:
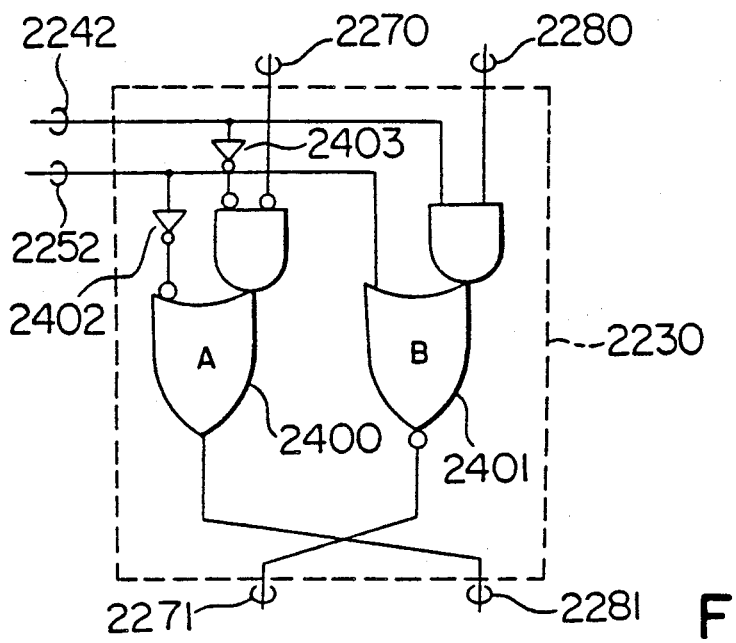

FIG. 23(a) shows a circuit arrangement of the carry generator 2230 in the foregoing applied form. This generator logically operates as follows.

The carry output signal pair (2271, 2281) to the next stage is generated in dependence upon the states of the carry output signals (2242 and 2252) of the eight-bit carry propagation block A (carry propagation circuits 2200 to 2201) and carry propagation block B (carry propagation circuits 2210 to 2211).

(1) In the case where the carry input signal pair (2270, 2280) is "0, 1" (with carry) and the carry output signals (2242, 2252) of the blocks A and B are "0, 0" (no carry):

It is necessary that the occurrence of the carry to the higher significant bit is transferred as no-signal; therefore, the carry output signal pair (2271, 2281) becomes "1, 0" due to the gates 2400 to 2403.

(2) In the case where the carry input signal pair (2270, 2280) is "0, 1" (with carry from the lower significant bit) and the carry output signals (2242, 2252) of the blocks A and B are "0, 1" (the carry to the next stage occurs if there is the carry from the lower significant bit):

The same as in the foregoing item (1).

(3) In the case where the carry input signal pair (2270, 2280) is "0, 1" (with carry from the lower significant bit) and the carry output signals (2242, 2252) of the blocks A and B are "1, 0":

Such a case does not exist logically.

(4) In the case where the carry input signal pair (2270, 2280) is "0, 1" (with carry from the lower significant bit) and the carry output signals (2242, 2252) of the blocks A and B are "1, 1" (there is the carry to the higher significant bit irrespective of the presence/absence of the carry from the lower significant bits):

It is necessary to cause the carry to the higher significant bit and the carry output signal pair (2271, 2281) becomes "0, 1".

The case where the carry input signal pair (2270, 2280) is "0, 1" has been described in the above. However, when they are "1, 0" (no carry from the lower significant bit) descriptions will be made as follows in correspondence to the foregoing four kinds of cases.

The carry output signal pair (2271, 2281) becomes:
"1, 0" in case of (1);
"1, 0" in case of (2);
Nonexistent logically in case of (3); and
"0, 1" in case of (4).

Figure 23B:
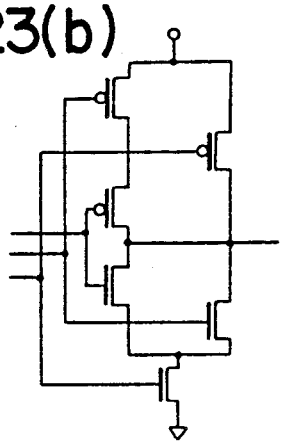
Figure 23C:
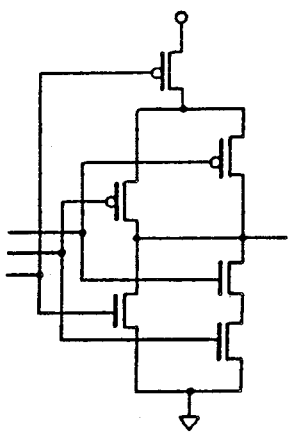
Figure 23D:
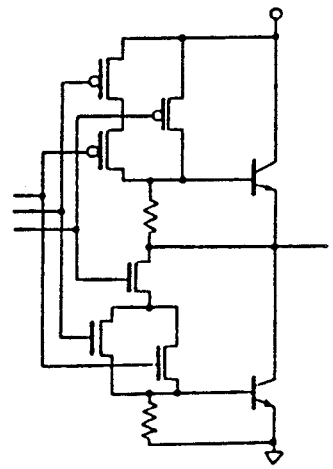
Figure 23E:
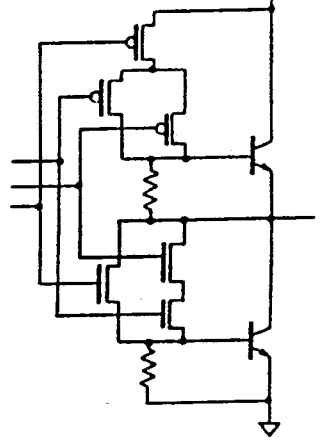

FIGS. 23(b) and (c) show examples whereby the gates 2240 and 2401 in the carry generator 2230 are constituted by CMOS transistors. FIGS. 23(d) and (e) show examples whereby the gates 2400 and 2401 in the carry generator 2230 are constituted by a composite circuit of NPN bipolar transistors and CMOS transistors. Since the carry output signal pair 2271 and 2281 of the carry generator 2230 has a large capacitive load, a higher operating speed can be attained in the circuits of FIGS. 23(d) and (e) in which a degree of dependence upon the delay time due to the capacitance is small.

FIG. 24 shows an arrangement of the half adder 2220 in the adder in the applied form of the foregoing carry propagation circuit 900. This circuit is the half adder as much as four bits and has a function to select the half addition by the signal 2260 responsive to the exclusive OR output at the previous stage of the carry propagation circuit 900 in FIG. 9 and by the carry outputs 9740 and 9741 from the blocks A and B and the result of addition by the carry input signals 2270 and 2280.

FIG. 28 is an arrangement diagram of another embodiment of the arithmetic operation unit shown in FIG. 4. A difference between this arrangement and FIG. 4 is that the write bus 412 is constituted as the dynamic type which is used by being precharged similarly to the read buses 410 and 411. For this purpose, a precharge & discharge circuit 425 is connected to an output 424 of the arithmetic operation circuit 403 and is connected to the write bus 412 through the output 417 of the circuit 425. With such an arrangement, a sense circuit is needed for each of input sides of the registers 400, data write register 405 and barrel shifter 407 connected to the write bus 412. The component elements different from those in the embodiment of FIG. 4 for the modified form of FIG. 28 will now be described in detail hereinbelow with reference to the drawings.

(1) Precharge & discharge circuit 425

FIG. 29 shows a connection between the arithmetic operation circuit 403 and the precharge & discharge circuit 425 added to the arrangement of FIG. 4 on the basis of the arrangement of FIG. 28. A different point from the arithmetic operation circuit 40 in FIG. 9 is that bus drivers 960 to 963 may be constituted by CMOS inverters of the orders which can drive NMOS transistors of a discharge circuit which will be mentioned later. On one hand, the precharge & discharge circuit 425 comprises substantially the same circuit arrangement as the precharge & sense circuits 401 and 402 shown in FIG. 5 and a discharge circuit. The precharge circuit comprises: an NPN transistor 2912; an NMOS transistor 2910; a PMOS transistor 2911; and CMOS inverters 2907, 2908 and 2909. This precharge circuit turns off the NMOS transistor 2910 for the former half interval of one clock cycle in response to an output 2916 of a CMOS inverter 2915, thereby precharging the write bus 412-0. The precharge voltage is set due to the feedback to the PMOS transistor 2911 and NPN transistor 2912 by the CMOS inverters 2907, 2908 and 2909. This setting has been described in detail with respect to FIG. 5; therefore, its detailed explanation is omitted here.

The discharge circuit of the write bus 412-0 is constituted by connecting NMOS transistors 2913 and 2914 in series. The output 2916 of the CMOS inverter 2915 is connected to a gate of the NMOS transistor 2913. An output 977 (424) of the CMOS inverter 960 for the output of the arithmetic operation circuit 403 is connected to a gate of the NMOS transistor 2914. Therefore, the NMOS transistor 2913 is turned on for the latter half interval of one clock cycle. When the output 977 of the arithmetic operation circuit is at a logic level "1", the discharge of the read bus 412-0 is performed. When it is a logic level "0", the discharge is not performed and the result of arithmetic operation is reflected to the write bus 412-0. The write bus 412-0 is precharged to a low voltage by the foregoing precharge circuit and the charges of this write bus are drawn out by the NMOS transistors 2913 and 2914 constituting the discharge circuit. Therefore, it is necessary that the other elements to take in the content of the write bus 412-0 are constituted so as to have the same gains as those of the CMOS inverters 2908 and 2909 in the foregoing precharge circuit. Next, as the other elements to take in the content of the write bus 412, there is shown a modified form corresponding to the arithemtic operation unit of FIG. 28 of the registers 400, data write register 405 and barrel shifter 407

(2) Registers 400

FIG. 30 shows a modified form of the registers 400 in association with the arrangement of FIG. 28. The precharge & sense circuits 401 and 402 are substantially the same as those in FIG. 5. In the arrangement of one bit of the registers 400, the NMOS transistors 503, 504, 505, and 506 to draw out the charges of the read buses 410-0 and 411-0 and one CMOS inverter 501 forming a memory are identical to those in FIG. 5. As the other elements, a signal 3003-0 having the phase opposite to that of the write signal 316a-0 exists due to a latch 3000 to write data, a latch 3001 as another element which forms a memory, and a CMOS inverter 3002 to control these two elements. In the foregoing memory arrangement, the data on the write bus 412-0 is temporarily stored in the latch 3000 when the write signal 316a-0 is at a logic level "1". At this time, the write signal 3003-0 becomes a logic level "0", so that an output of the latch 3001 does not conflict with an output of the latch 3000. Next, when the write signal 316a-0 becomes a logic level "0", the other write signal 3003-0 becomes a logic level "1", so that the memory function is realized by the CMOS inverter 501 and latch 3001.

In the foregoing arrangement of one bit of the registers 400, the gains of the latch 3000 and CMOS inverter 501 serving as a path to write the data from the write bus 412-0 are set to be identical to or lower than the gains of the CMOS inverters 2908 and 2909 in FIG. 29 mentioned before, thereby enabling the voltage level of a low amplitude of the write bus 412-0 to be sensed and stored.

(3) Data write register 405

FIG. 31 is a circuit diagram showing a detailed circuit arrangement of the data read register 404 and data write register 405 shown in FIG. 28. As compared with the data write register 405 in FIG. 19 for the arrangement of the arithmetic operation unit in FIG. 4, the NMOS transistor 1905 and CMOS inverter 1907 are replaced by latches 3100 and 3101, respectively. A reason of this replacement is substantially the same as in the case of the arrangement of one bit of the registers 400 in FIG. 30, namely, it is to enable the voltage level of a low amplitude of the write bus 412-0 to be sensed and stored.

(4) Barrel shifter 407

FIG. 32 is a circuit diagram showing a detailed circuit arrangement of the barrel shifter 407 shown in FIG. 28. As compared with the barrel shifter 407 in FIG. 21 for the arrangement of the arithemtic operation unit in FIG. 4, the NMOS transistors 2100 to 2103 and CMOS inverters 2120 to 2123 are replaced by latches 3200 to 3203 and 3120 to 3123, respectively. A reason of this replacement is substantially the same as in the foregoing cases of FIGS. 30 and 31.

Next, FIG. 33 shows a modified form of the write bus of FIG. 28 for FIG. 4 in comparison with FIG. 26. In FIG. 26, the buffer 960 with a high driving capability in the write bus is needed. On the other hand, in FIGS. 29 and 30, by adding the precharge & discharge circuit 425, a sense circuit of the bus has to be provided for every register. One of respective registers 3300-0 to 3300-n in FIG. 33, for instance, the register 3300-0 temporarily constitutes a sense circuit by the write control signal 316. The other registers hold the arrangement of the memory circuit and keep the content thereof.

FIGS. 35 to 40 show other embodiments of the precharge & discharge circuit 425 shown in FIG. 29. FIGS. 35 to 40 correspond to other embodiments of the precharge & sense circuits 401 and 402 shown in FIGS. 5 and 30 excluding a discharge circuit 4000 consisting of the NMOS transistors 2913 and 2914 in FIGS. 35, 37, 38, 39, and 40.

Figure 35:
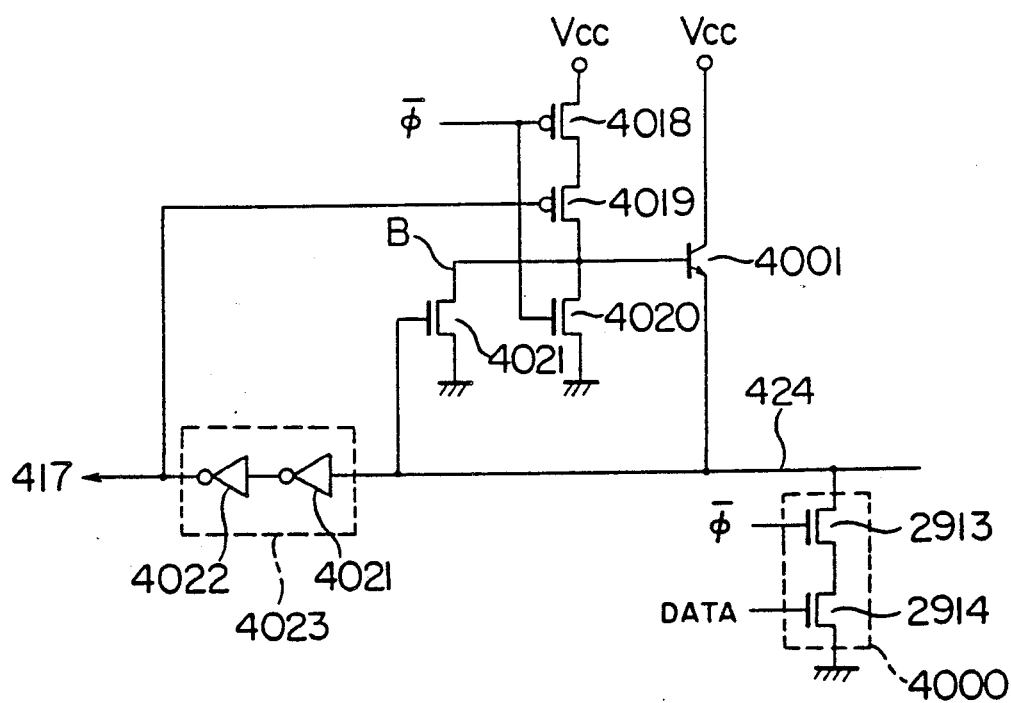

In FIG. 35, a collector of an NPN transistor 4001 is connected to the power source voltage $V_{cc}$ and an emitter is connected to the output 424 (977) of the arithmetic operation circuit serving as the data bus line. A gate of a PMOS transistor 4019 is connected to the output 417 (412) of an output circuit 4023 to read out the data of the output 424 of the arithemtic operation circuit which consists of a series circuit of inverting circuits 4021 and 4022. A gate of a PMOS transistor 4018 is controlled by a clock $\bar{\phi}$. One end of a series circuit of the PMOS transistors 4018 and 4019 is connected to the power source voltage $V_{cc}$ and the other end is connected to a base B of the NPN transistor 4001. A gate of the NMOS transistor 4021 is connected to the output 424. A gate of an NMOS transistor 4020 is controlled by the clock $\bar{\phi}$. One end of a parallel circuit of the NMOS transistors 4020 and 4021 is connected to the base B of the NPN transistor 4001 and the other end is connected to the earth potential. This embodiment will then be explained with reference to a time chart shown in FIG. 36. In the case where the selected internal data is "1" in the previous cycle (clock $\phi$ is at a high level), the charges of the output 424 are drawn out and the potential of the output 424 is reduced, so that the output 417 of the output circuit 4023 is at a low level. Therefore, the PMOS transistor 4019 is in the "on" state. On the other hand, the NMOS transistor 4021 is in the "off" state or in the high impedance state since the potential of the output 424 is low. When the clock $\bar{\phi}$ is at a high level, a PMOS transistor 4018 is in the "off" state and the NMOS transistor 4020 is in the "on" state and the base B of the NPN transistor 4001 is pulled down to the earth potential due to the NMOS transistor 4020. When the clock $\phi$ is switched at a low level in this state, the PMOS transistor 4018 is turned on and the NMOS transistor 4020 is turned off, so that a current is supplied to the base B of the NPN transistor 4001 through the PMOS transistors 4018 and 4019. Namely, the PMOS transistor 4018 and NMOS transistor 4020 constitute a switching circuit to change over the on/off cycle of the NPN transistor 4001 serving as a switching element. Thus, a collector current of the NPN transistor 4001 flows, thereby charging the output 424 and allowing the potential to be increased. On the other hand, when the potential of the output 424 of the arithmetic operation circuit as a data bus line increases, the gate voltage of the NMOS transistor 4021 increases, so that the conductance becomes large, allowing the current to easily flow. Therefore, the base current flowing through the NPN transistor 4001 by the PMOS transistors 4018 and 4019 is shunted and flows through the NMOS transistor 4021. Thus, the base current decreases and the collector current of the NPN transistor 4001 decreases, causing the charging speed of the output 424 to become slow. When the potential of the output 424 exceeds a threshold level $V_0$ of the output circuit 4023, the output 417 is inverted and becomes a high level, so that the PMOS transistor 4019 is turned off and the supply of the base current of the NPN transistor 4001 is stopped. At the same time, the NMOS transistor 4020 is set into the "on" state, thereby allowing the charges accumulated in the base B of the NPN transistor 4001 to be drawn out, so that the charge of the output 424 is stopped. That is, as compared with the control loop to control the NPN transistor 4001 serving as a switching element through the output circuit 4023 to detect the potential of the bus line and the foregoing switching circuit, the NMOS transistor 4021 forms a high speed feedback circuit to feedback the potential of the bus to the base of the NPN transistor 4001 as the control input of the switching element at a high speed. A precharge voltage $V_p$ of the output 424 in this case becomes higher than the threshold level $V_0$ of the output circuit 4023 by only the voltage corresponding to a quantity of charges which are charged for the interval the response time lag of the output circuit 4023 and the operation time lag of the PMOS transistor 4019 and NMOS transistor 4020. However, in this circuit, the charge current decreases due to the action of the NMOS transistor 4021 with an increase in voltage of the output 424, so that the precharge voltage $V_p$ of the output 424 can be set at a level which is slightly higher than the threshold level $V_0$ of the output circuit 4023.

Namely, the charge of the output 424 of the arithmetic operation circuit serving as a data bus line is controlled by the output 417 of the output circuit 4023. Therefore, the relation between the precharge voltage $V_p$ of the output 424 and the threshold level $V_0$ of the output circuit 4023 is not affected by variations in elements ambient temperature, power source voltage and the like, so that the fairly stable operation can be performed. Further, in the embodiment, the bipolar transistor 4001 having a high driving capability of a load is used to charge the output 424 of the arithmetic operation circuit serving as a data bus line and the output 424 is precharged by a sufficiently large precharge current, so that the precharge time can be reduced. Also, the precharge current is suppressed due to the action of the NMOS transistor 4021 which forms the high speed feedback circuit when the bus potential approaches a logic threshold voltage $V_{LT}$ of the output circuit 4023; therefore, the control of the NPN transistor 4001 from the output circuit 4023 is performed with a high degree of accuracy. Thus, for instance, for the logic threshold voltage $V_{LT}=2$ (V), when it is assumed that the precharge voltage $V_p$ of the output 424 of the arithmetic operation circuit as a bus line is set at 2.2 (V), a read delay time $t_d$ becomes 0.095 $\tau_d$, thereby enabling the bus to be accessed at an extremely high speed.

Figure 37:
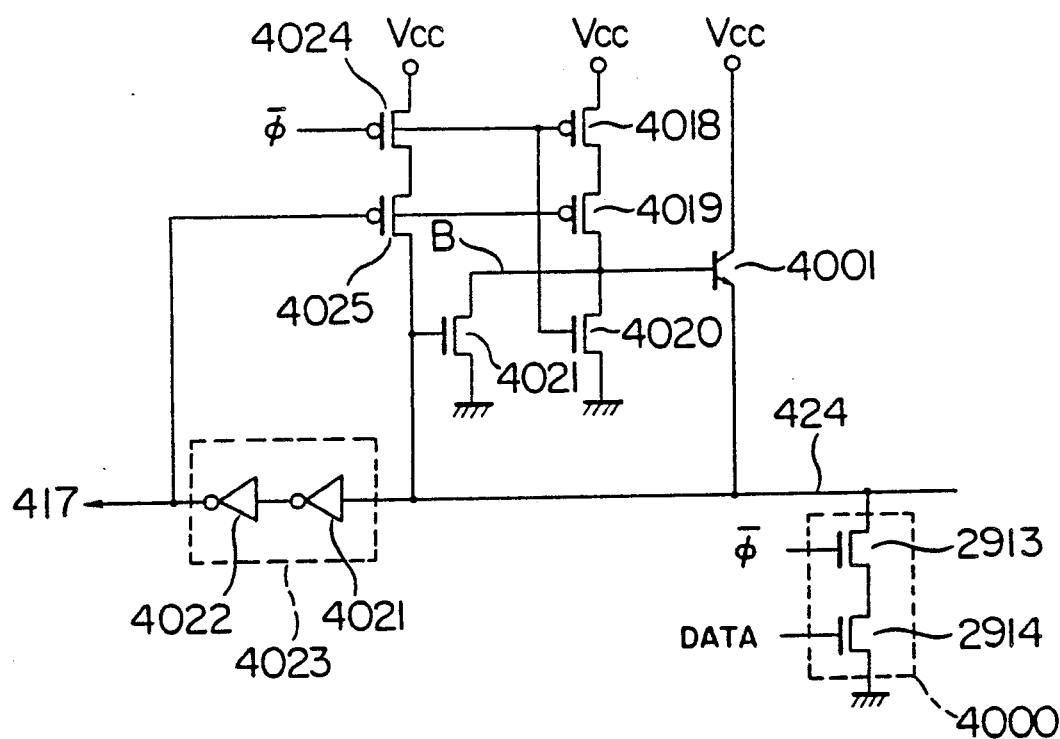

FIG. 37 is a circuit diagram showing a modified form of FIG. 35. In FIG. 37, a different point from FIG. 35 is that one end of a series circuit of a PMOS transistor 4025 whose gate is connected to the output A of the output circuit 4023 and a PMOS transistor 4024 whose gate is controlled by the clock $\overline{\phi}$ is connected to the power source voltage $V_{cc}$ and the other end of this series circuit is connected to the output 424. The series circuit of the PMOS transistors 4024 and 4025 charges the output 424 of the arithmetic operation circuit until the output 417 of the output circuit 4023 is inverted. Namely, in the embodiment, the output 424 of the arithmetic operation circuit is charged by a parallel circuit of the NPN transistor 4001 and the series circuit of the PMOS transistors 4024 and 4025. In comparison between the conductances of a bipolar transistor and a MOS transistor, a value of conductance of a bipolar transistor is generally larger by one digit. Therefore, the charge current of the NPN transistor 4001 is larger than the charge current of the series circuit of the PMOS transistors 4024 and 4025. However, as described above, the charge current of the NPN transistor 4001 decreases in association with an increase in potential of the output 424 of the arithmetic operation circuit. On the other hand, the charge current of the series circuit of the PMOS transistors 4024 and 4025 is determined by the conductance of the series circuit of the PMOS transistors 4024 and 4025, so that it is almost constant even if the potential of the arithmetic operation circuit 424 changes. Namely, the series circuit of the PMOS transistors 4024 and 4025 defines the lowest value of the charge current of the output 424 of the arithmetic operation circuit, thereby making it possible to reduce the time to precharge the output 424 of the arithmetic operation circuit.

Figure 38:
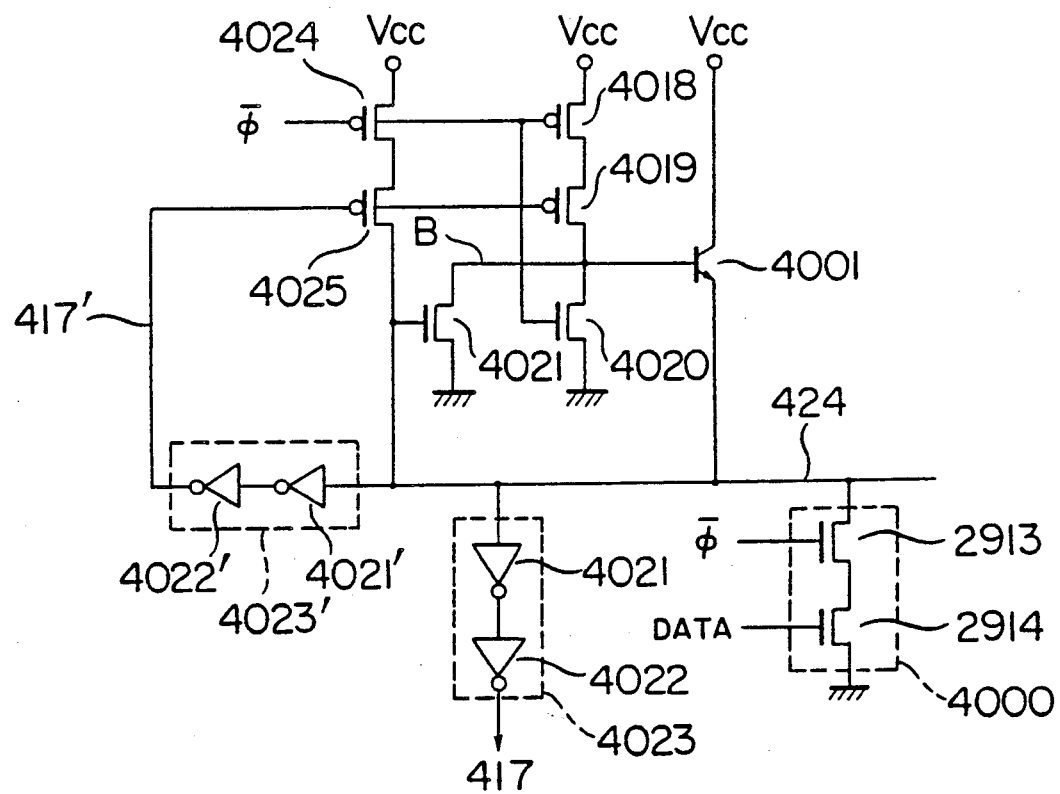

FIG. 38 is a circuit diagram showing another modified form of FIG. 35. In FIG. 38, a different point from FIG. 37 is that an output 417' of a sense circuit 4023' for detection of the bus potential consisting of a series circuit of inverting circuits 4021' and 4022' is connected to the gates of the PMOS transistors 4019 and 4025. By setting the logic threshold voltages $V_{LT}$ of the sense circuit 4023' and output circuit 4023 to be nearly equal, the same circuit characteristic as that in the example shown in FIG. 37 is obtained. In the embodiment, the sense circuit 4023' is provided separately from the output circuit 4023 and the charge of the output 424 of the arithmetic operation circuit is controlled by the output 417' of the sense circuit 4023', thereby increasing a degree of freedom on the arrangement of the precharge circuit for the output 424 of the arithmetic operation circuit as a data bus line and of the output circuit 4023. Therefore, the layout of those circuits becomes easy and a plurality of read circuits 4023 can be connected to the output 424 of the arithmetic operation circuit as a bus line and a degree of freedom on designing of a system is extended.

Figure 39:
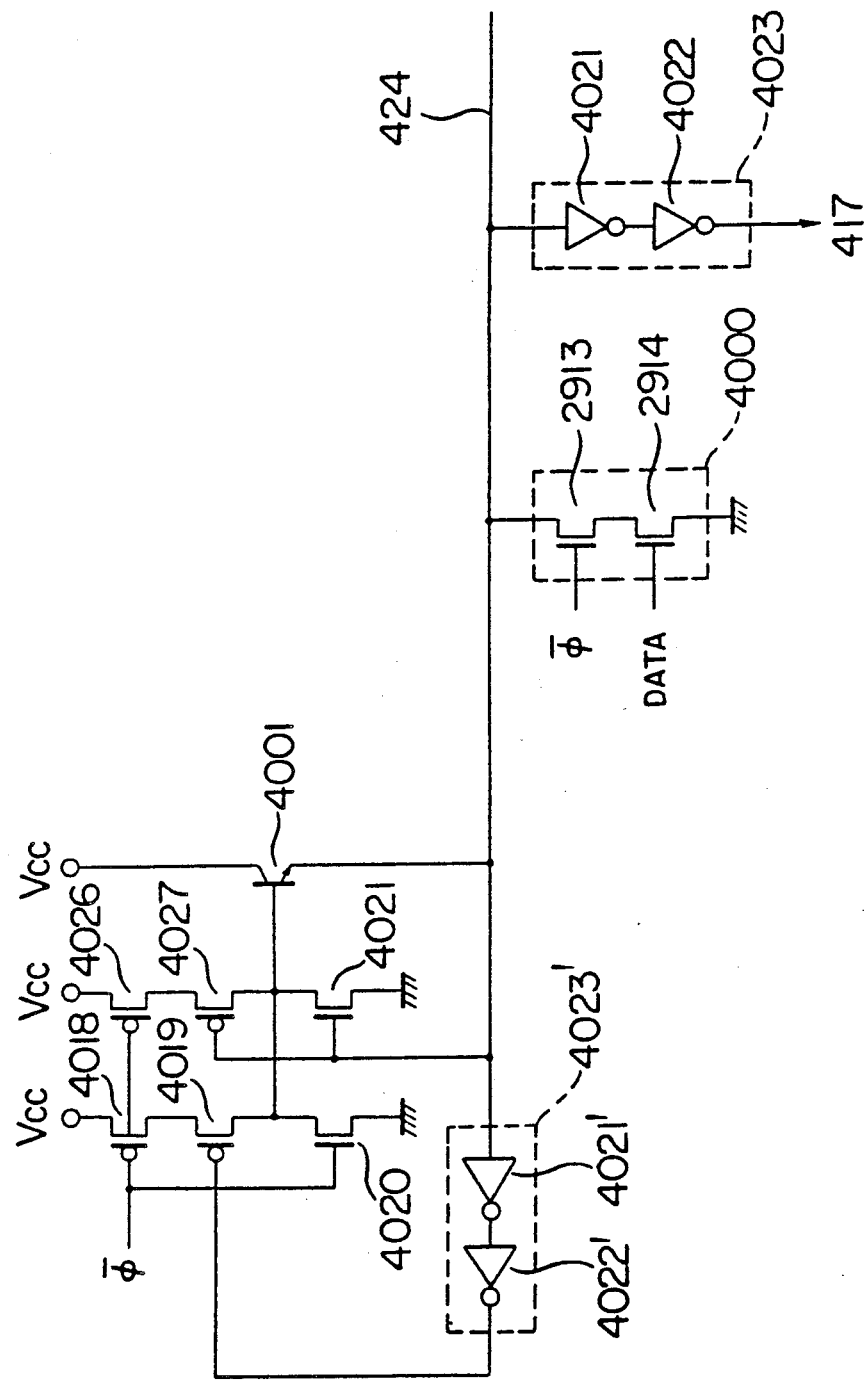

FIG. 39 is a circuit diagram showing another modified form of FIG. 35. In FIG. 39, a high speed feedback circuit is formed by a series circuit of the PMOS transistors 4026 and 4027 in addition to the NMOS transistor 4021, a gate of the PMOS transistor 4026 is connected to the clock $\overline{\phi}$, the precharge cycle is switched, a gate of the PMOS transistor 4027 is connected to the output 424 of the arithmetic operation circuit as a bus line, and the bus potential is fed back to the NPN transistor 4001 at a high speed in a similar manner as the NMOS transistor 4021.

In the embodiment, an inverter amplifier is constituted by the NMOS transistor 4021 and PMOS transistor 4027. The optimum high speed feedback to the NPN transistor 4001 is performed by eliminating a drawback such that it could easily become over damping in case of using only the NMOS transistor 4021.

Figure 40:
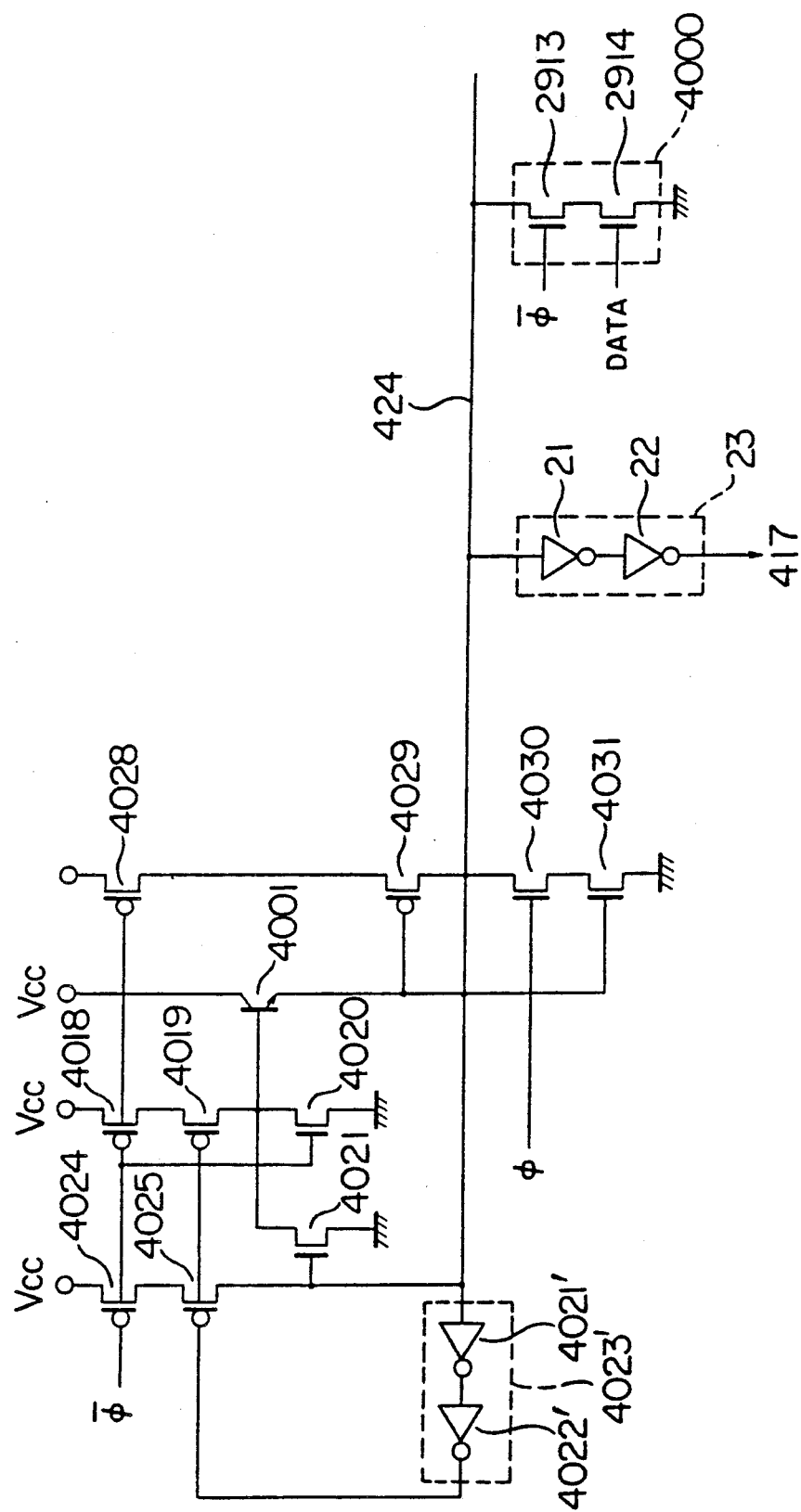

FIG. 40 is a circuit diagram showing another modified form of FIG. 35. A novel point in the embodiment of FIG. 40 is that there is added a circuit in which: a series circuit of PMOS transistors 4028 and 4029 and a series circuit of NMOS transistors 4030 and 4031 are connected in series; a connecting point of those series circuits is connected to the output 424 of the arithmetic operation circuit serving as a bus line; gates of the PMOS transistor 4029 and NMOS transistor 4031 are connected to the output 424 of the arithmetic operation circuit; a gate of the PMOS transistor 4028 is connected to the clock $\overline{\phi}$; and a gate of the NMOS transistor 4030 is connected to the clock $\phi$. The PMOS transistor 4029 and NMOS transistor 4031 form an inverter amplifier and an input and an output of this inventer amplifier are together connected to the output 424 of the arithmetic operation circuit. The PMOS transistor 4028 and NMOS transistor 4030 perform the switching operation to make the inverter amplifier operative as a precharge amplifier. The logic threshold voltage of the inverter amplifier is set to be almost equal to the logic threshold voltage of the output circuit 4023.

This embodiment has an effect such that the inverter amplifier forms a precharge circuit having an independent minor loop although it has a small driving force and in the case where the bus potential very slightly changes from the logic threshold voltage $V_{LT}$, the inverter amplifier locally has the correcting operation of the bus potential. Namely, the precharge circuit according to each embodiment shown in FIGS. 35, 37, 38, and 39 forms a kind of peak hold circuit. Therefore, in the case where the potential of the output 424 of the arithmetic operation circuit serving as a bus line gradually increases due to the charge share with the output circuit 4023 or the discharge circuit 4000 or the like, and further due to the leak current or the like, the embodiment does not have a function to reduce the bus potential excluding the discharge circuit 4000. In the embodiment, this function is added to the precharge circuit and there is added an auxiliary precharge circuit to auxiliarily supply the precharge current in addition to the supply of the precharge current due to the NPN transistor 4001.

Other arrangement examples of the barrel shifter 407 will then be explained with reference to FIGS. 41 to 55.

Figure 42:
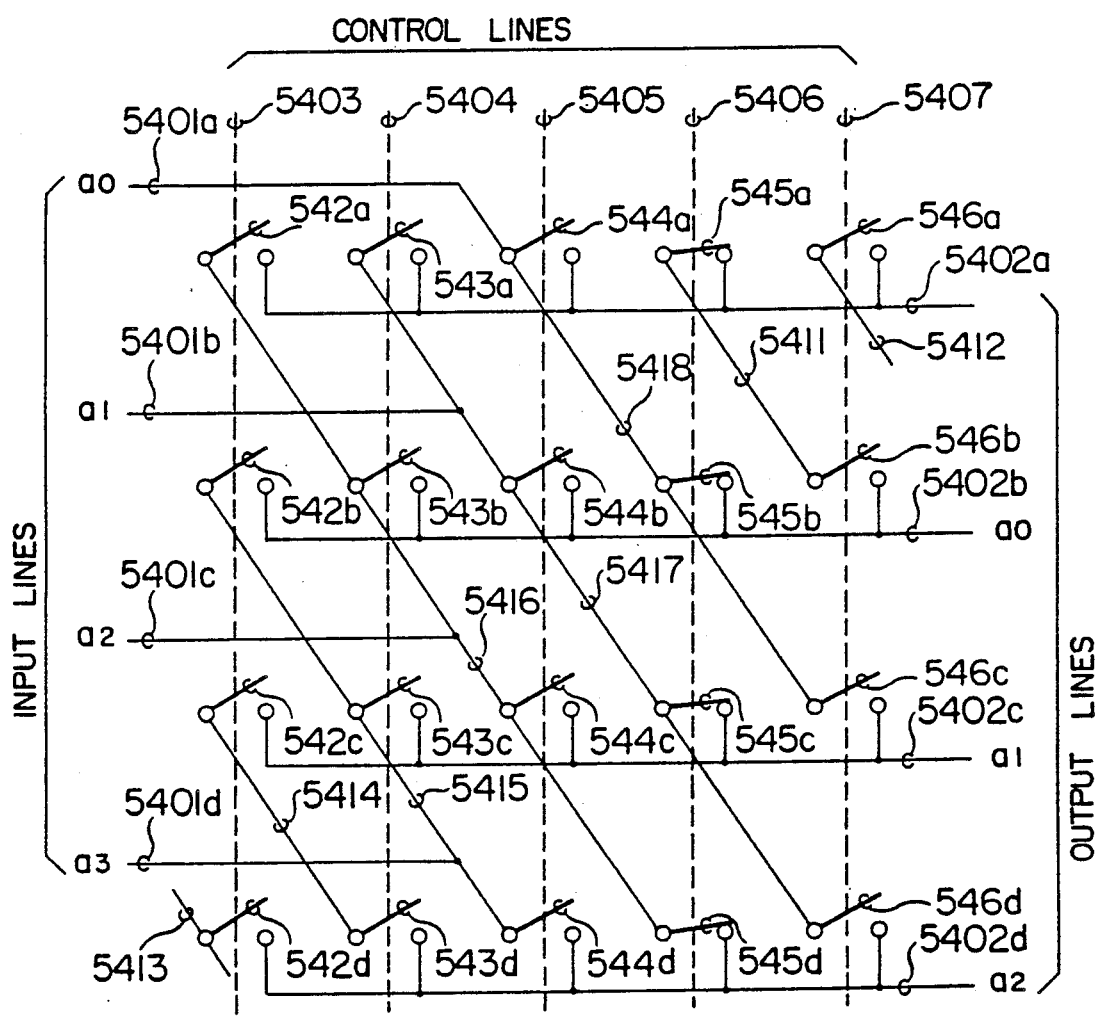

The operation of the shift circuit will be first explained with reference to FIG. 42. In the diagram, reference numerals 5401a to 5401d denote input lines; 5402a to 5402d are output lines; and 542a to 542d, 543a to 543d, 544a to 544d, 545a to 545d, and 546a to 546d are switches to connect the input lines with the output lines (in each numeral, the bit with a suffix of a indicates the lower significant bit and the bit with a suffix d represents the higher significant bit). On one hand, numerals 5403 to 5407 denote control lines for controlling the opening and closing of the switches; 5415 to 5418 are slant lines connected to the input lines; and 5411 to 5414 are slant lines which are not connected to the input lines. FIG. 42 shows a state in that the switches 545a to 545d connected to the control line 5406 are closed. It is now assumed that four-bit data of $a_0$, $a_1$, $a_2$, and $a_3$ are inputted to the input lines in this state. For instance, the data inputted onto the input line 5401b is outputted from the output line 5402c through the slant line 5417 and switch 545c. In a similar manner as above, the data inputted through the input line 5401a is outputted from the output line 5402b and the data inputted through the input line 5401c is outputted from the output line 5402d. The slant line 5411, which is not connected to any of the input lines 5401a to 5401d, is connected to the output line 5402a. By setting the slant line 5411 at a voltage corresponding to a logic "0", a value which is outputted from the output line 5402a becomes "0". Namely, the data of "0", "$a_0$", "$a_1$", and "$a_2$" are outputted onto the output lines 5402a, 5402b, 5402c, and 5402d, thereby allowing the logical shift of one bit to be performed. Similarly, by closing the other switches, the logical shifts of two bits to the left, one bit to the left, zero bit to the left, one bit to the right, and two bits to the right can be operated due to one operation. On one hand, although FIG. 42 shows the example whereby the data length is four-bits and an amount of shift is respectively two bits to the right and left, increases in data length and shift amount can be easily realized by increasing the number of same switch cells.

Figure 43:
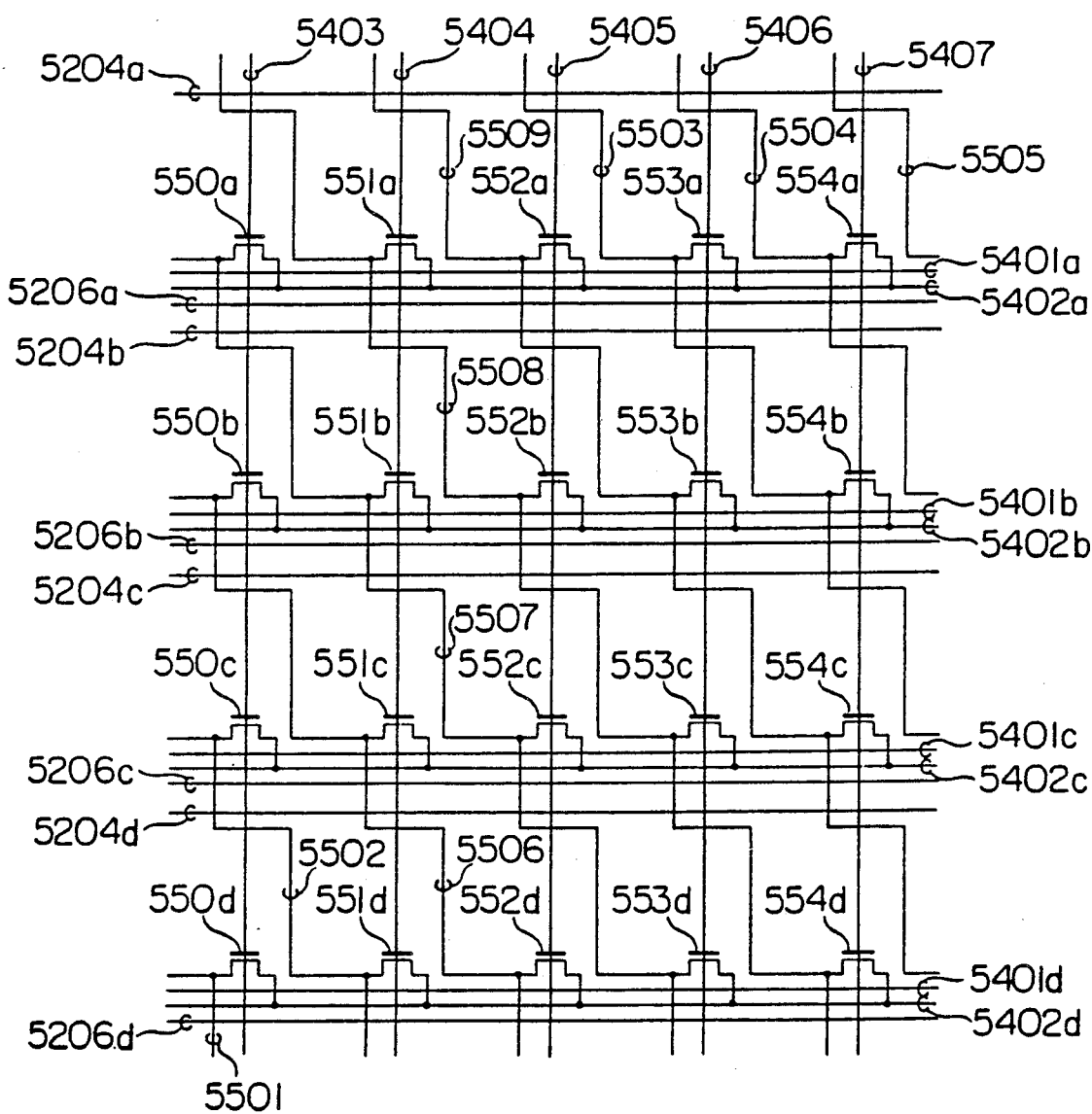

FIG. 43 shows a barrel shift circuit in which the switches 542a to 542d, 543a to 543d, 544a to 544d, 545a to 545d, and 546a to 546d shown in FIG. 42 are constituted by N-type MOS transistors. In the diagram, numerals 5403 to 5407 denote the control lines, 5401a to 5401d are the input lines, and 5402a to 5402d are the output lines. In addition, numerals 5204a to 5204d and 5206a to 5206d in FIG. 43 are system buses in FIG. 42. The circuit shown in FIG. 43 performs the logical shift to the right and left.

Figure 44:
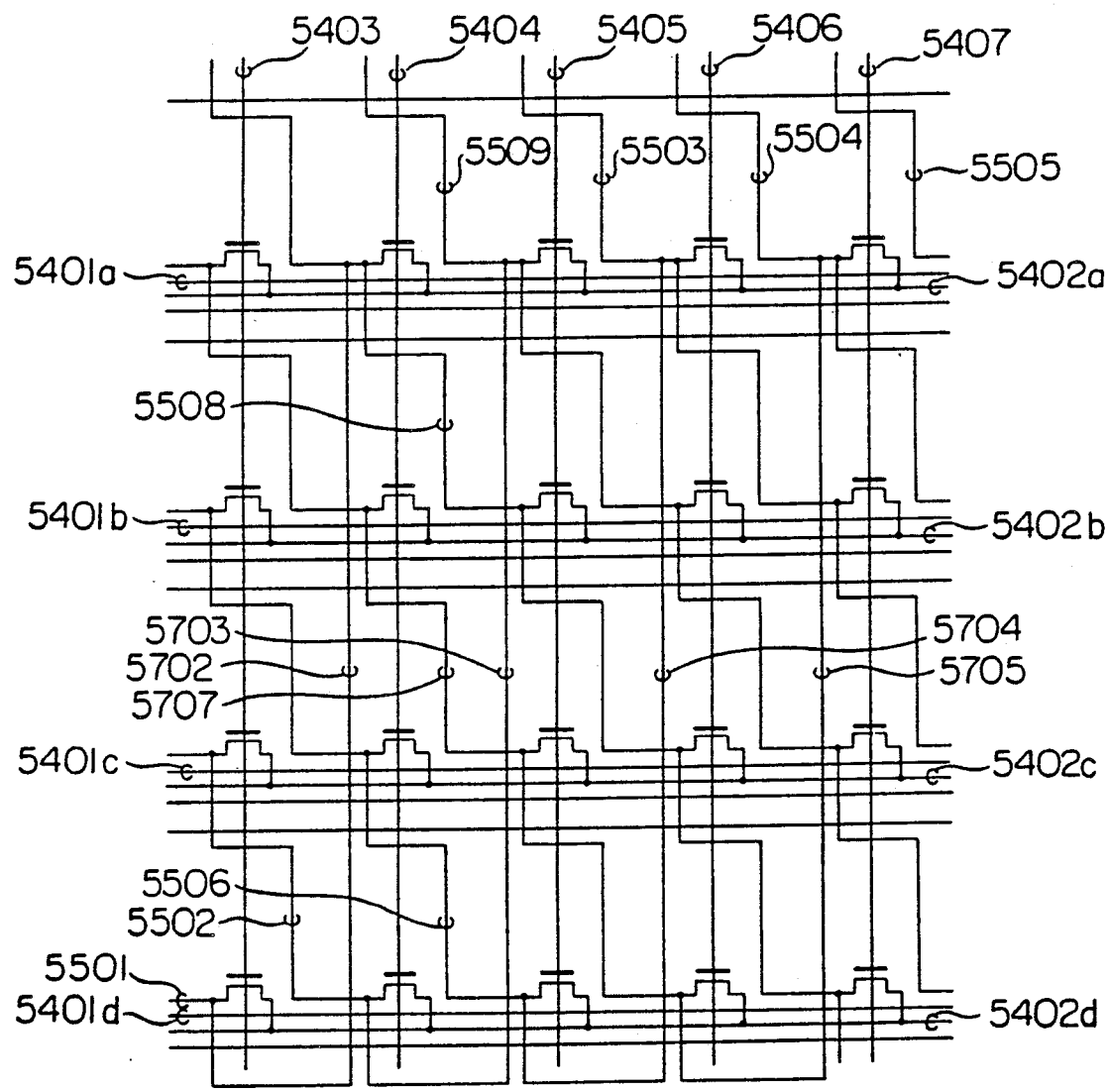

FIG. 44 shows a barrel shift circuit which performs the rotation to the right and left of the input data. This circuit arrangement is substantially the same as the barrel shift circuit shown in FIG. 43; however, it differs from the barrel shift circuit shown in FIG. 43 with respect to that folded lines 5702 to 5705 are added to the barrel shift circuit shown in FIG. 44. Namely, in the barrel shift circuit shown in FIG. 43, a slant line 5504, which is not connected to the input line, is connected to the input line 5401c through a slant line 5507 by means of the folded line 5705. In a similar manner as above, slant lines 5503, 5501 and 5502 are connected to the input lines 5401d, 5401b and 5401a by the folded lines 5704, 5702 and 5703, respectively. In FIG. 44, when it is now assumed that the data of "$a_0$", "$a_1$", "$a_2$", and "$a_3$", for instance, are inputted from the lower significant bits onto the input lines and only the control line 5406 among the foregoing control lines is set at a high level, the data of "$a_3$", "$a_0$", "$a_1$", and "$a_2$" are outputted onto the output lines 5402a, 5402b, 5402c, and 5402d. In this way, the rotation to the left of one bit is operated. Similarly, according to the barrel shift circuit shown in FIG. 44, the rotating operation of up to every two bits to the right and left can be performed. However, the logical shift cannot be performed.

Figure 45:
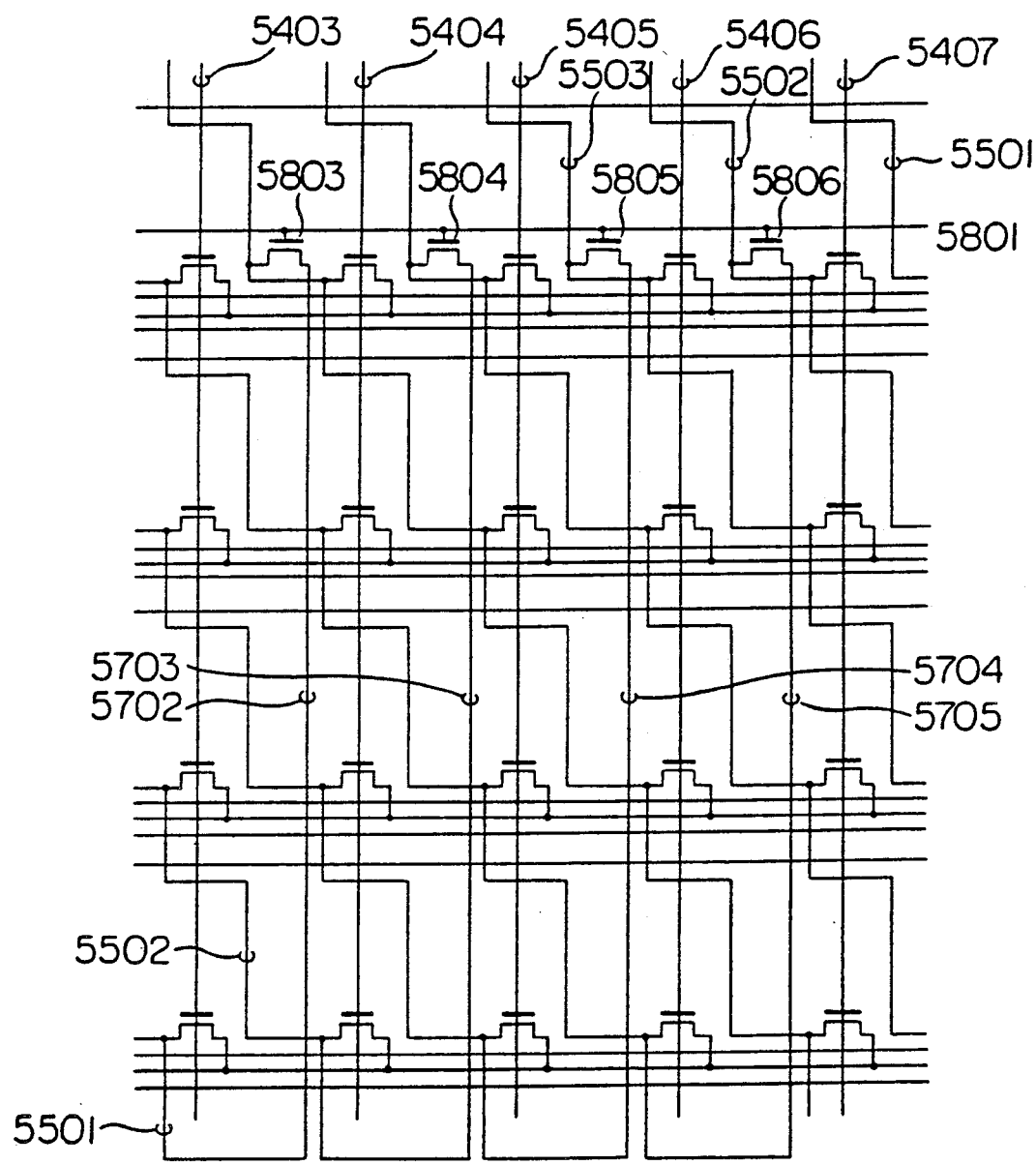

FIG. 45 shows a barrel shift circuit which can operate both instructions of the logical shift and rotation. Although the circuit arrangement is substantially the same as the barrel shift circuit shown in FIG. 44, the barrel shift circuit shown in FIG. 45 is provided with MOS transistors 5803 to 5806 between the folded lines and the slant lines and a control line 5801 to control the on and off of these MOS transistors 5803 to 5806 is added. This point is different from the barrel shift circuit shown in FIG. 44. In the barrel shift circuit shown in FIG. 45, by setting the control line 5801 at a low level and turning off the MOS transistors 5803 to 5806, the instructions for the logical shifts to the right and left can be operated. On one hand, by setting the control line 5801 at a high level and turning on the MOS transistors 5803 to 5806, the instruction for the rotatin can be operated.

Figure 46:
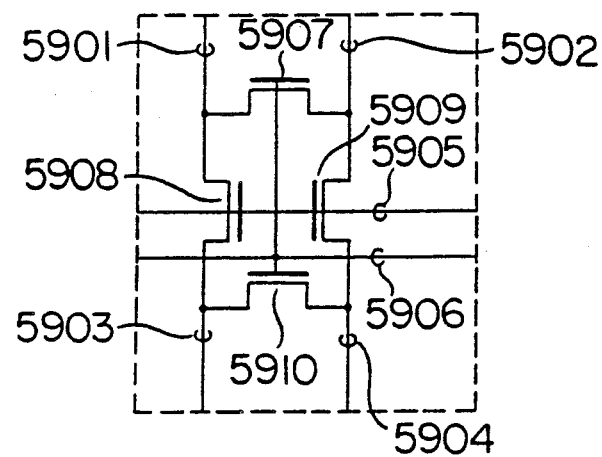

The barrel shift circuit shown in FIG. 45 has a function to rotate the data of a four-bit length. The barrel shift circuit shown in FIG. 41 has a function to rotate the four-bit and eight-bit data. The overall circuit of FIG. 41 consists of a four-bit barrel shift circuit 5109 and a four-bit barrel shift circuit 5110. The circuit arrangement of the barrel shift circuit 5109 is substantially the same as the barrel shift circuit shown in FIG. 45. The circuit arrangement of the barrel shift circuit 5110 is also almost the same as the barrel shift circuit shown in FIG. 45. Circuits 5105 to 5108 to connect the higher significant four bits with the lower significant four bits are added to the barrel shift circuit shown in FIG. 41. The circuit arrangement of the connecting circuits 5105 to 5108 is shown in FIG. 46. In the diagram, reference numerals 5901 and 5902 denote a slant line and a folded line of the barrel shift circuit which are respectively connected in the upper portion. Also, numerals 5903 and 5904 in the diagram are a slant line and a folded line of the barrel shift circuit which are respectively connected in the upper portion; and 5905 and 5906 are control lines to control MOS transistors 5907 to 5910.

Figure 47:
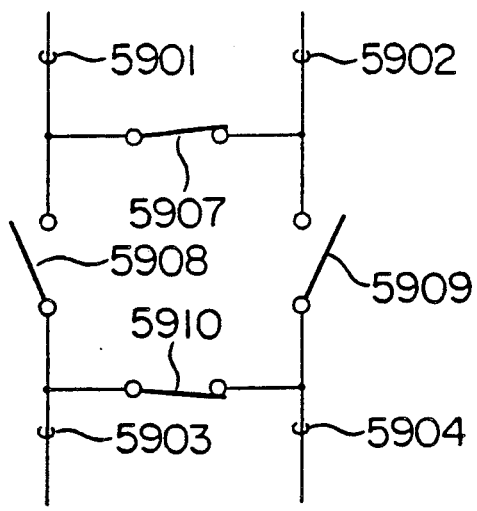

FIG. 47 shows the state of connection of each line when the control line 5905 in the barrel shift circuit shown in FIG. 46 is set at a low level and the control line 5906 is set at a high level. In the state of FIG. 47, the slant line 5901 and folded line 5902 in the upper portion shown in FIG. 46 and the slant line 5903 and folded line 5904 in the lower portion are connected, respectively. In addition, since the MOS transistors 5908 and 5909 are turned off, the upper circuit and the lower circuit are separated.

Figure 48:
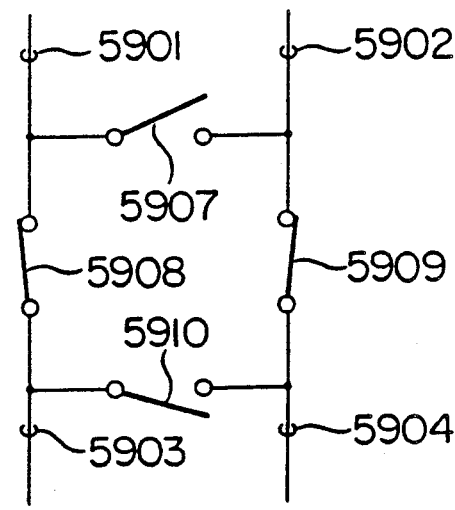

On the contrary, FIG. 48 shows the state of connection of each line when the control line 5905 is set at a high level and the control line 596 is set at a low level. In this case, the slant line 5901 in the upper portion and the slant line 5903 in the lower portion, and the folded line 5902 in the upper portion and the folded line 5904 in the lower portion are connected, respectively. The MOS transistors 5907 and 5910 are turned off and the barrel shift circuit in the upper portion and the barrel shift circuit in the lower portion are connected.

Figure 41:
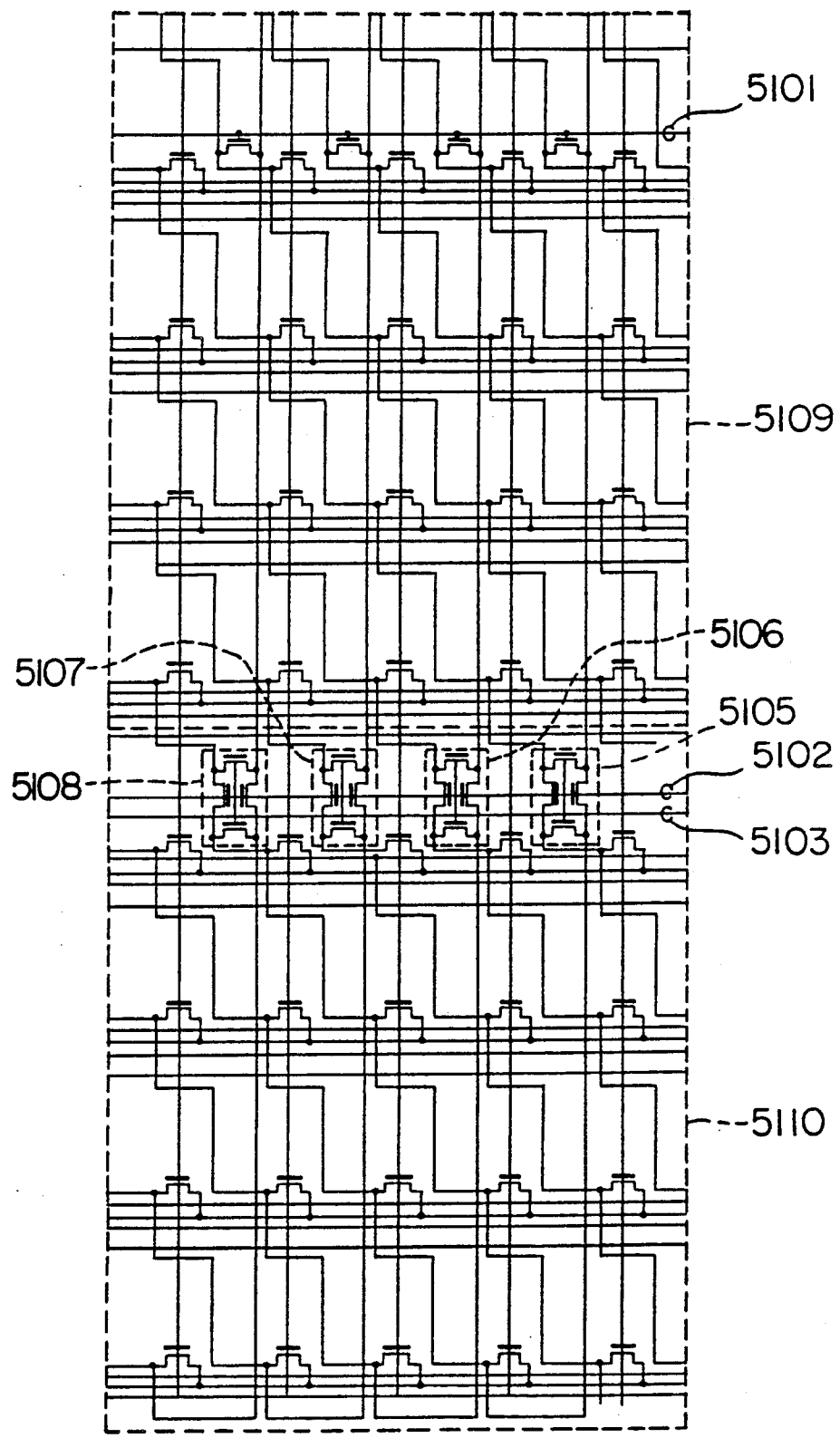

In the foregoing arrangement, the operation of the barrel shift circuit shown in FIG. 41 will then be explained. By setting the control lines 5101 and 5102 in FIG. 41 at a high level and setting the control line 5103 at a low level, the instruction for rotation of the eight-bit data can be operated. On the other hand, by setting the control lines 5101 and 5103 at a high level and setting the control line 5102 at a low level, the higher significant four-bit data and lower significant four-bit data can be respectively and independently rotated. Similarly, by setting the control line 5101 at a low level, the logical shift instructions of the 8-bit data and 4-bit data can be opeated.

As described above, in the shift circuit to shift the n-bit input data, the control lines to determine the shift amount and the control lines to determine the kind of operation between the shift and the rotation are provided, thereby enabling the input data to be simultaneously shifted or rotated by m bits and thereby making it possible to execute any shift instruction of the arithmetic shift, logical shift, rotation, and rotation including a flag at a high speed.

In addition, in the circuit which is provided with the control lines to determine the shift amount and the control lines to determine the kind of operation between the shift and the rotation and which simultaneously shifts or rotates the input data by m bits, the control lines to determine the data length of the input data are provided, thereby enabling the data length to be variable and thereby making it possible to individually execute the shift instructions for rotation and the like at a high speed with respect to the data of a predetermined data length.

Figure 51:
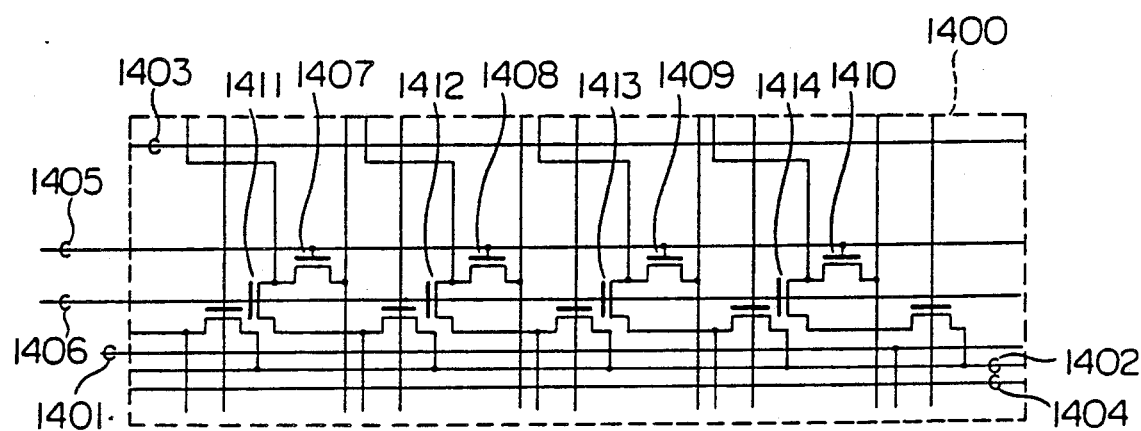
Figure 53:
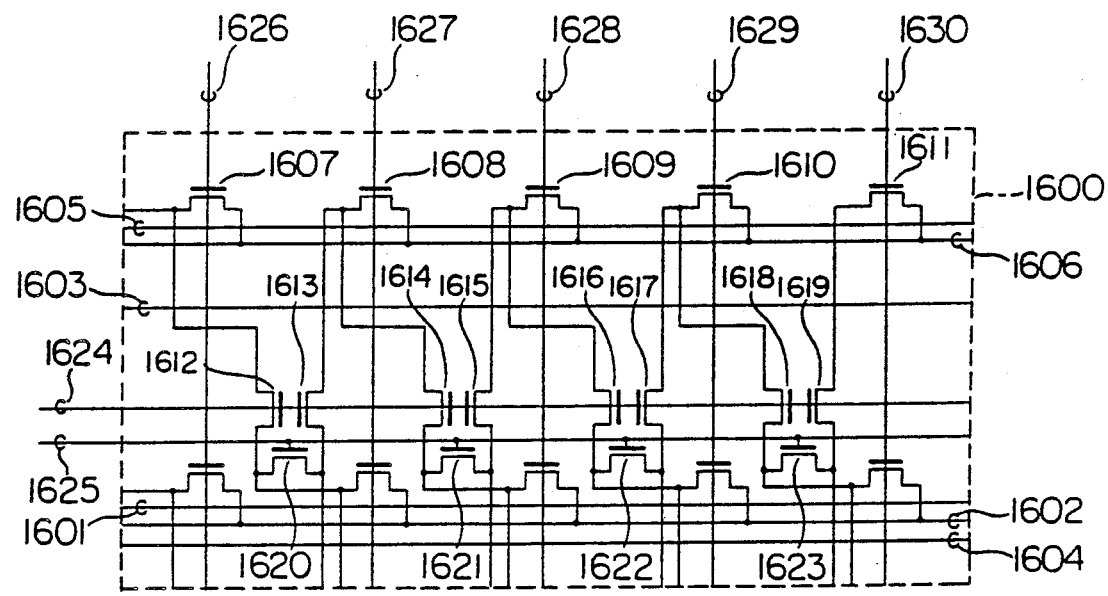
Figure 54:
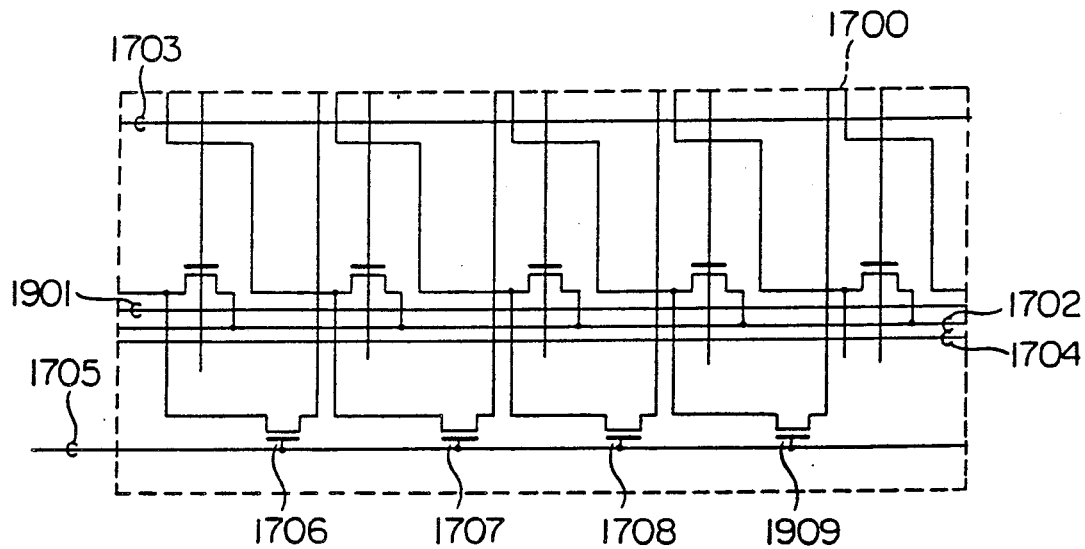

In FIG. 50, numerals 13320 to 13360 denote control lines to control the shift amount; $C_0$ to $C_6$ are control lines to control the function of the barrel shifter. The portion indicated at 13000 is shown in FIG. 53. On one hand, the portions indicated at 13080 and 13160 shown in FIG. 50 are shown in FIG. 51. The portion of 13310 shown in FIG. 50 is shown in FIG. 54. The remaining portions of 13010 to 13070, 13090 to 13150, and 13170 to 13300 are shown in FIG. 52.

Figure 52:
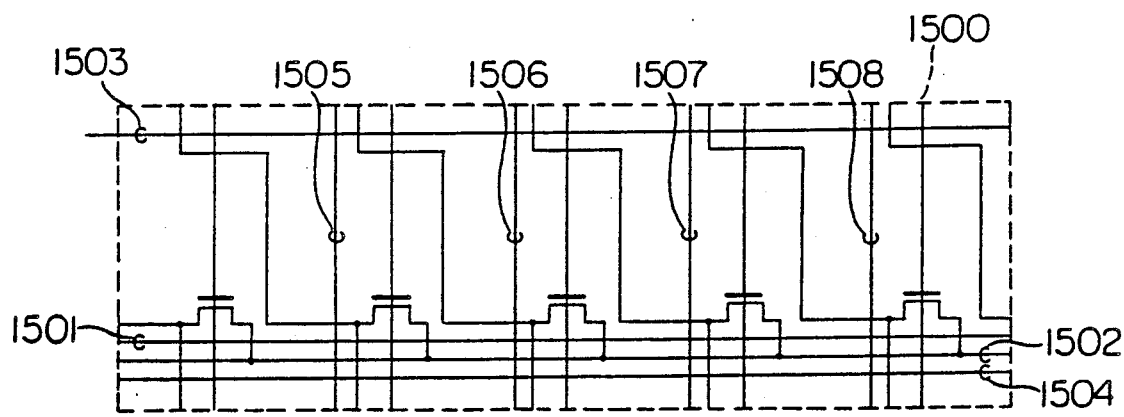

The operations of the circuits of FIGS. 52 and 54 will be apparent from the descriptions in conjunction with FIGS. 43, 44 and 45. The circuit of FIG. 51 controls the connection between the barrel shift circuit in the upper portion and the barrel shift circuit in the lower portion. Since the rotations of the 8-bit data and 16-bit data may be performed in only the lower significant bits, two transistors among the four MOS transistors for the connection shown in FIG. 46 can be omitted.

In FIG. 53, a reference numeral 1605 is an input line from a flag and 1606 is an output line to a flag. MOS transistors 1612 to 1623 serve to control whether a flag is included or not in the rotation.

FIG. 49 shows an explanatory diagram for the operations of the foregoing embodiments. For the data of the 8-bit, 16-bit and 32-bit lengths, the arithmetic shift to the right and left, logical shift to the right and left, rotation to the right and left., and rotation to the right and left including a flag are executed, respectively. However, the 8-bit operation is performed with respect to only the higher significant eight bits and the 16-bit operation is carried out for only the higher significant sixteen bits. The shift amount lies within a range of two bits to the left and two bits to the right.

FIG. 55 is a diagram showing together the logics of the control lines when each operation is executed. However, prior to operation of the arithmetic shift to the right of eight bits, it is necessary to write "0" or "1" into the higher significant bits in accordance with the sign (positive or negative) of the 8-bit data which is indicated as a complement. The same shall apply to the 16-bit arithmetic shift to the right. On the other hand, for the 32-bit arithmetic shift to the right, the slant line separated from the input line by the control line $C_6$ has to be fixed to "1" or "0" in accordance with the sign (positive or negative) of the 32-bit data. Although these points are not explained in detail, they are the operations which can be easily realized.

In the foregoing embodiments, it will be easily understood that the present invention can be also applied even if the conductivity types are reversed.

As described above, according to the present invention, a high speed arithmetic operation unit and an arithmetic operation circuit can be obtained.

Also, according to the invention, a high integrated arithmetic operation unit and an arithmetic operation circuit can be derived.

In addition, according to the invention, an arithmetic operation unit and an arithmetic operation circuit having a low electric consumption can be obtained.

Further, according to the invention, a high speed three-state circuit with a low electric power consumption can be derived.

We claim:

1. An arithmetic operation unit comprising:
   an arithmetic operation circuit;
   a group of registers for storing input data and/or output data of the arithmetic operation circuit, wherein the arithmetic operation circuit includes means for performing arithmetic operations using the input data and data read from registers comprising said group of registers;
   at least one read bus for connecting said registers and said arithmetic operation circuit; and
   a precharge and sense circuit coupling said arithmetic operation circuit to said read bus, wherein said precharge and sense circuit includes means for precharging the read bus to a first predetermined level before a read operation of said registers begins, and wherein said precharge and sense circuit further includes means for detecting that a potential level on said read bus has discharged from said first predetermined level to a second predetermined level which is lower than said first predetermined level after said read operation begins, thereby detecting slight potential variations on said read bus.

2. An arithmetic operation unit according to claim 1, wherein said read bus is connected to an address register through at least one amplifying circuit.

3. An arithmetic operation unit according to claim 1, wherein said means for precharging is comprised of at least one bipolar transistor and field-effect transistors which mixedly exist.

4. An arithmetic operation unit according to claim 3, wherein said bipolar transistor is coupled to said read bus for precharging said read bus to said first predetermined level, and wherein said field-effect transistors are coupled to said bipolar transistor for controlling a current of said bipolar transistor and determining said first predetermined level of said read bus in association with threshold values of said field-effect transistors.

5. An arithmetic operation unit according to claim 3, wherein said field effect transistors are MOS transistors.

6. An arithmetic operation unit according to claim 1, wherein said arithmetic operation unit comprises a portion of a processor which is integrated on one semiconductor substrate.

7. An arithmetic operation unit according to claim 1, wherein a plurality of read buses are provided, and wherein said registers comprise a multiport RAM which is connected to the plurality of read buses.

8. An arithmetic operation unit according to claim 7, wherein a plurality of precharge and sense circuits are provided, and wherein each of said plurality of read buses is respectively connected to said arithmetic operation circuit through one of said precharge and sense circuits.

9. An arithmetic operation unit according to claim 1, further comprising a shift circuit having a shift output circuit connected to said rad bus, wherein said shift circuit includes means for performing a shift operation on said input data to provide shifted input data to said read bus.

10. An arithmetic operation unit according to claim 1, wherein said means for precharging comprises:
a bipolar transistor having a collector-emitter path coupled to said read bus;
current supply means coupled to a base of said bipolar transistor; and
control means coupled to said current supply means and to said base of said bipolar transistor, wherein said control means includes means for controlling the application of current from said current supply means to said base of said bipolar transistor to operate said bipolar transistor to precharge said read bus to said first predetermined level, and means for controlling the application of current from said current supply means to said base of said bipolar transistor to turn off said bipolar transistor to stop the precharging of said read bus; and
wherein said means for detecting comprises sensing means coupled to said read bus for sensing a discharge of said read bus from said first predetermined level to said second predetermined level after said bipolar transistor has been turned off.

11. An arithmetic operation unit according to claim 10, wherein said current supply means comprises a first inverter coupled between said read bus and the base of said bipolar transistor.

12. An arithmetic operation unit according to claim 11, wherein said control means comprises a first field-effect transistor having a source-drain path coupled between said first inverter and said base of said bipolar transistor and a gate coupled to a control signal to control an ON-OFF state of said first field-effect transistor to control the application of current from said first inverter to said base of said bipolar transistor.

13. An arithmetic operation unit according to claim 12, further comprising a second field-effect transistor having a source-drain path coupled to said base of said bipolar transistor, and wherein said sensing means includes a second inverter coupled between said read bus and a gate of said second field-effect transistor, wherein an output of said second inverter provides an indication of the potential level of said read bus.

14. An arithmetic operation unit according to claim 13, wherein said first and second field-effect transistors have channels of opposite conductivity type to one another.

15. An arithmetic operation unit according to claim 12, wherein said first predetermined level is set in accordance with a threshold voltage of said first field-effect transistor.

16. An arithmetic operation unit according to claim 15, wherein said first predetermined level is set in accordance with threshold voltages of said first and second field-effect transistors.

17. An arithmetic operation unit according to claim 2, wherein said input and/or output data is stored in said registers as "high" and "low" voltage levels, and wherein said first predetermined level to which said read bus is precharged is higher than said "low" voltage level.

18. An arithmetic operation unit according to claim 17, further comprising at least one write bus for connecting said arithmetic operation circuit with said registers, wherein a drive level provided by said write bus to said registers from said arithmetic operation circuit is higher than said first predetermined level to which said read bus is precharged.

19. An arithmetic operation unit according to claim 18, further comprising a drive buffer coupled on said write bus between said arithmetic operation circuit and said registers for generating said drive level on said write bus for said registers.

20. An arithmetic operation unit according to claim 2, further comprising at least one write bus for connecting said arithmetic operation circuit with said registers, wherein a drive level provided by said write bus to said registers from said arithmetic operation circuit is higher than said first predetermined level to which said read bus is precharged.

21. An arithmetic operation unit according to claim 20, further comprising a drive buffer coupled on said write bus between said arithmetic operation circuit and said registers for generating said drive level on said write bus for said registers.

22. An arithmetic operation unit according to claim 1, wherein each of said registers includes a plurality of memory cells, and wherein said arithmetic operation unit further comprises:

a plurality of pairs of MOSFETs, respectively provided for each of said memory cells, wherein each of said pairs of MOSFETs includes a first MOSFET, having a gate coupled to a corresponding memory cell, and a second MOSFET, having a source-drain path coupled in series between said read bus and a source-drain path of said first MOSFET; and a plurality of control lines, wherein each of said control lines is coupled to a gate of one or more of said second MOSFETs of said pairs of MOSFETs to provide control signals for a read-out operation of said memory cells.

* * * * *